United States Patent
Nakamura et al.

(10) Patent No.: US 7,738,556 B2
(45) Date of Patent: Jun. 15, 2010

(54) APPARATUS AND METHOD FOR ESTIMATING MOTION VECTOR WITH GRADIENT METHOD

(75) Inventors: Yukihiro Nakamura, Kanagawa (JP); Yasuaki Takahashi, Kanagawa (JP); Takashi Horishi, Kanagawa (JP); Kunio Kawaguchi, Kanagawa (JP); Norifumi Yoshiwara, Tokyo (JP); Akihiko Kaino, Kanagawa (JP); Yuta Choki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1259 days.

(21) Appl. No.: 11/101,580

(22) Filed: Apr. 8, 2005

(65) Prior Publication Data

US 2005/0259739 A1   Nov. 24, 2005

(30) Foreign Application Priority Data

Apr. 9, 2004   (JP)   ............................. 2004-116010

(51) Int. Cl.
*H04N 7/12* (2006.01)
(52) U.S. Cl. ................................. 375/240.16
(58) Field of Classification Search ............. 375/240.16
See application file for complete search history.

(56) References Cited

U.S. PATENT DOCUMENTS

| 5,089,887 | A | 2/1992 | Robert et al. |
| 5,729,302 | A | 3/1998 | Yamauchi |
| 5,844,630 | A | 12/1998 | Yamauchi |
| 6,072,833 | A | 6/2000 | Yamauchi |
| 6,370,194 | B2 * | 4/2002 | Nishikawa ............. 375/240.16 |

FOREIGN PATENT DOCUMENTS

| JP | 7-135663 | 5/1995 |
| JP | 2001-61152 | 3/2001 |

* cited by examiner

*Primary Examiner*—Y. Lee
*Assistant Examiner*—Richard Torrente
(74) *Attorney, Agent, or Firm*—Oblon, Spivak, McClelland, Maier & Neustadt, L.L.P.

(57) ABSTRACT

A past frame at a past time has a motion vector in a block, and a reference frame at a reference time has a different block which is a motion-compensated block identical in position to a terminal point of a motion vector in the block. When a gradient method is used to detect a motion vector in the different block in the reference frame, a motion vector which is identical in magnitude and orientation to a motion vector and whose initial point is the different block in the reference frame is used as a candidate vector for initial vectors. The present invention is applicable to a signal processing apparatus for performing frame frequency conversion from a 24P signal to a 60P signal.

8 Claims, 57 Drawing Sheets

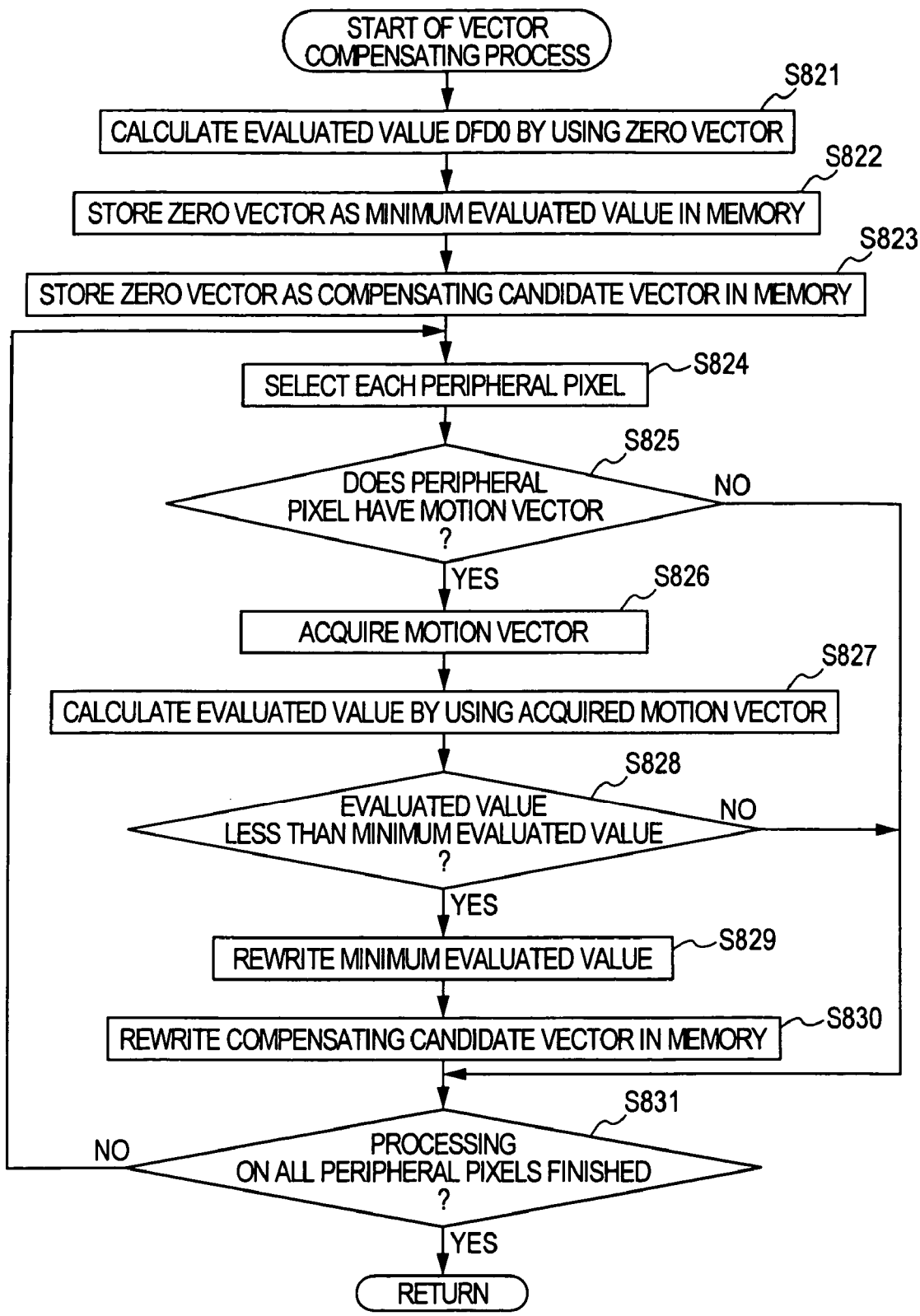

APPARATUS AND METHOD FOR ESTIMATING MOTION VECTOR WITH GRADIENT METHOD

BACKGROUND OF THE INVENTION

1. Field of the Invention

The present invention relates to image processing apparatuses and methods, and recording media and programs used therewith. In particular, the present invention relates to an image processing apparatus and method that have increased accuracy of motion vector detection, and to a recording medium and program used therewith.

2. Description of the Related Art

In an image processing apparatus for converting the frame frequency of an image, the gradient method is used as a method for detecting a motion vector of a block of interest. Although the gradient method can produce a highly accurate result of detection for a minute movement, it is not practical because, when a movement in an actual moving image is detected, such a movement is too large. Accordingly, as disclosed in Japanese Unexamined Patent Application Publication No. 60-158786, detection is achieved by recursively performing gradient operation.

However, simply recursively performing the gradient operation takes a long time in the case of performing real-time processing. Accordingly, when performing the gradient operation, from among peripheral block motion vectors detected in past frames, etc., an initial vector having a similar movement is found. By using the initial vector as an initial value for the gradient method, the number of times the gradient operation is performed is reduced. The initial vector can be found, based on spatial or temporal correlation of moving objects, from motion vectors such as a motion vector in a peripheral block around a block of interest, and a motion vector in a block having a phase identical to that of a block of interest in a previous frame.

However, in an object having a large amount of movement, or in a block in the vicinity of a boundary between different moving objects, the optimal motion vector (i.e., a motion vector similar to calculated movement) does not exist which is used as the initial vector in the gradient method. Accordingly, a problem occurs in that a false initial vector (initial vector having different movement) is selected. In addition, this results in a decrease in the accuracy of motion vector detection in the subsequent stage by the gradient method, thus causing image deterioration.

SUMMARY OF THE INVENTION

The present invention has been made in view of the above circumstances, and it is an object of the present invention to enable selection of an initial vector which increases the accuracy of motion vector detection in the gradient method.

According to an aspect of the present invention, an image processing apparatus for detecting motion vectors and generating pixel values based on the detected motion vectors is provided. The image processing apparatus includes: an initial vector selecting unit for selecting an initial vector used as an initial value for a gradient method for detecting a motion vector in a block of interest in a frame; a motion vector detecting unit for using the gradient method to detect the motion vector in the block of interest by using the initial vector selected by the initial vector selecting unit; a shifted initial vector setting unit for setting, as a shifted initial vector in a block in the frame, a shifted motion vector having an initial point at the block of interest in the present frame being identical in position to a terminal point of the motion vector detected by the motion vector detecting unit in a past frame with respect to the present frame; and a candidate vector setting unit for setting the shifted initial vectors set by the shifted initial vector setting unit as one of candidate vectors for selecting the initial vector in the block of interest by the initial vector selecting unit; and wherein the shifted motion vector is identical in magnitude and in orientation to the motion vector detected by the motion vector detecting unit.

The motion vector may be a motion vector having an initial point at the block of interest in the present frame, and the initial vector selection unit selects an initial vector having an initial point at the block of interest in the present frame.

The shifted initial vector setting unit may include: a block operation unit for finding the block in the present frame identical in position to the terminal block at the terminal point of each of the motion vectors detected by the motion vector detecting unit; a reliability comparing unit for comparing, in the block found by the block operation unit, reliabilities of the motion vector detected by the motion vector detecting unit; and a shifted initial vector selecting unit for selecting, as the shifted initial vector for a block in the present frame, a motion vector identical in magnitude and orientation to one motion vector determined by the reliability comparing unit to have a highest reliability.

In the candidate vector setting unit, the shifted initial vector set by the shifted initial vector setting unit in the block of interest, and the motion vector detected by the motion vector detecting unit, motion vectors in a predetermined peripheral block around the block of interest, detected in the present frame or the past frame, may be set as candidate vectors for selecting the initial vector.

The image processing apparatus further may include an evaluated value operation unit for calculating evaluated values representing reliabilities of the candidate vectors set by the candidate vector setting unit. The initial vector selecting unit may select the initial vector for the block of interest in the present frame based on the evaluated values in the past frame calculated by the evaluated value operation unit.

The image processing apparatus may further include: an allocating unit for allocating the motion vector detected by the motion vector detecting unit to pixels in an interpolated frame between the frames; and a pixel-value interpolation generating unit for performing interpolation to generate the values of the pixels in the interpolated frame based on the motion vectors allocated by the allocating unit.

According to another aspect of the present invention, an image processing method for an image processing apparatus for detecting a motion vector and generating pixel values based on the detected motion vectors is provided. The image processing method includes: an initial vector selecting step of selecting an initial vector used as an initial value for a gradient method for detecting a motion vector in a block of interest in a present frame; a motion vector detecting step of using the gradient method to detect the motion vector in the block of interest by using the initial vector selected in the initial vector selecting step; a shifted initial vector setting step of setting, as a shifted initial vector, a shifted motion vector having an initial point identical in position to a terminal block point of the motion vector detected in the motion vector detecting step in a past frame with respect to the present frame; and a candidate vector setting step of setting the shifted initial vector set in the shifted initial vector setting step as one of candidate vector for selecting the initial vector in the block of interest in the initial vector selecting step, wherein the shifted motion vector is identical in magnitude and in orientation to the motion vector detected in the motion vector detection step.

According to another aspect of the present invention, a recording medium having a program recorded thereon is provided. The program allows a computer to perform processing for detecting a motion vector and generating pixel values based on the detected motion vectors. The program includes: an initial vector selecting step of selecting an initial vector used as an initial value for a gradient method for detecting a motion vector in a block of interest in a present frame; a motion vector detecting step of using the gradient method to detect the motion vector in the block of interest by using the initial vector selected in the initial vector selecting step; a shifted initial vector setting step of setting, as a shifted initial vector, a shifted motion vector having an initial point of the block of interest in the present frame being identical in position to a terminal point of the motion vector detected in the motion vector detecting step in a past frame with respect to the present frame; and a candidate vector setting step of setting the shifted initial vector set in the shifted initial vector setting step as one of candidate vectors for selecting the initial vectors in the block of interest in the initial vector selecting step, wherein the shifted motion vector is identical in magnitude and in orientation to the motion vector detected by the motion vector detecting step.

According to another aspect of the present invention, a program for allowing a computer to perform processing for detecting a motion vector and generating pixel values based on the detected motion vectors is provided. The program includes: an initial vector selecting step of selecting an initial vector used as an initial value for a gradient method for detecting a motion vector in a block of interest in a present frame; a motion vector detecting step of using the gradient method to detect the motion vector in the block of interest by using the initial vector selected in the initial vector selecting step; a shifted initial vector setting step of setting, as a shifted initial vector, a shifted motion vector having an initial point at the block of interest in the present frame being identical in position to a terminal point of the motion vector detected in the motion vector detecting step in a past frame with respect to the present frame; and a candidate vector setting step of setting the shifted initial vector set in the shifted initial vector setting step as one of candidate vectors for selecting the initial vectors in the block of interest in the initial vector selecting step, wherein the shifted motion vector is identical in magnitude and in orientation to the motion vector detected by the motion vector detecting step.

According to the present invention, an initial vector that improves the accuracy of motion vector detection by the gradient method can be selected. In particular, in the vicinity of a boundary in which movement is detected, the accuracy of motion vector detection can be improved.

BRIEF DESCRIPTION OF THE DRAWINGS

FIG. 60 is a flowchart illustrating a vector compensating process.

DESCRIPTION OF THE PREFERRED EMBODIMENTS

Embodiments of the present invention are described below with reference to the accompanying drawings.

Figure 1:
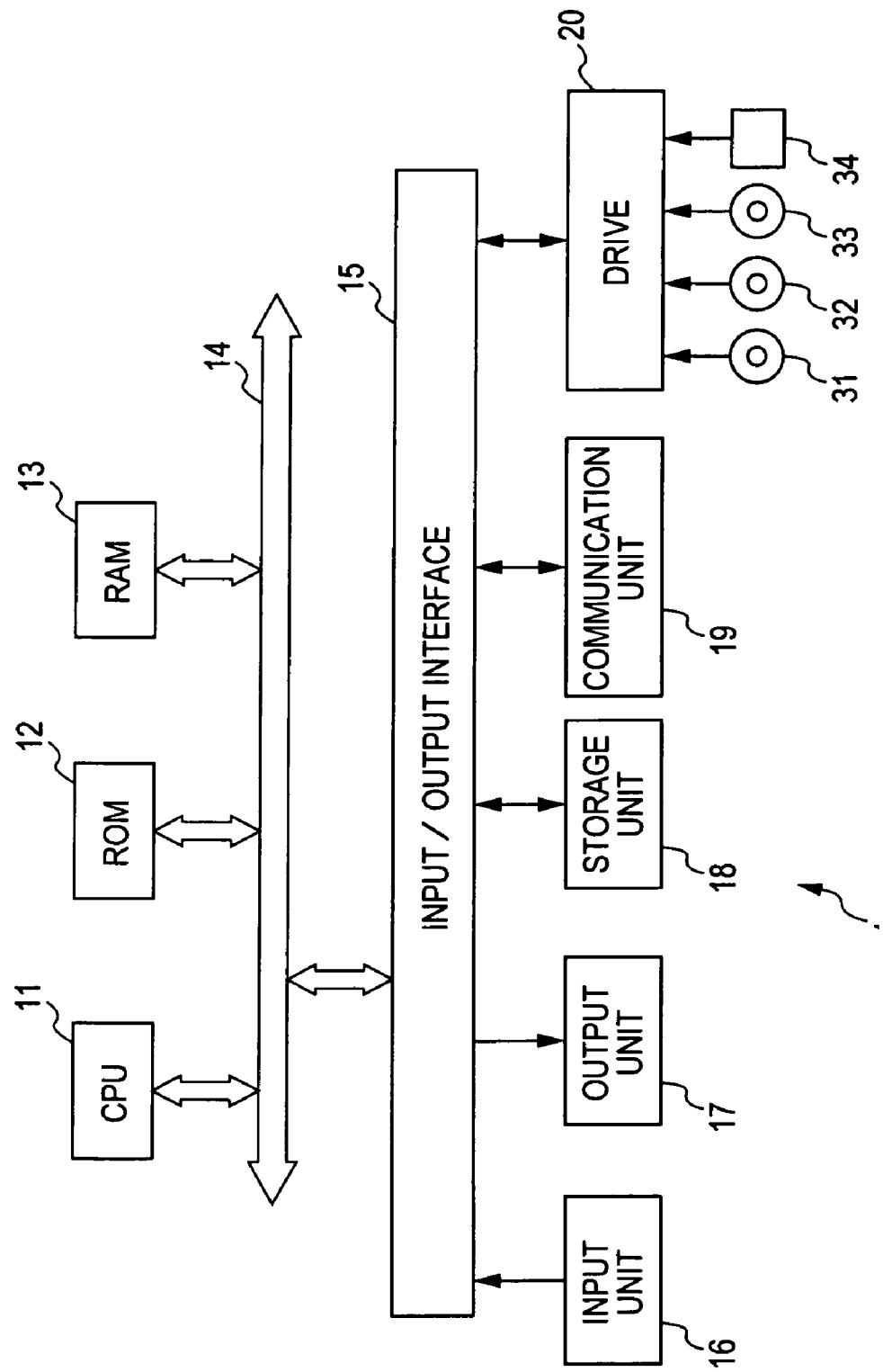
FIG. 1 is a block diagram showing an example of the configuration of a signal processing apparatus of the present invention.

FIG. 1 shows an example of the configuration of a signal processing apparatus 1 to which the present invention is applied. The signal processing apparatus 1 is formed by, for example, a personal computer or the like. In FIG. 1, a central processing unit (CPU) 11 executes various types of processing in accordance with programs stored in a read-only memory (ROM) 12 or a storage unit 18. A random access memory (RAM) 13 stores a program to be executed by the CPU 11 and data, if needed. The CPU 11, the ROM 12, and the RAM 13 are connected to one another by a bus 14.

The CPU 11 connects to an input/output interface 15 through the bus 14. The input/output interface 15 connects to an input unit 16 including a keyboard, a mouse, and a microphone, and to an output unit 17 including a display and a speaker. The CPU 11 executes various types of processing in response to instructions input from the input unit 16. The CPU 11 outputs, to the output unit 17, an image, audio, etc., obtained in the processing.

The storage unit 18 connected to the input/output interface 15 is formed by, for example, a hard disk, and stores programs to be executed by the CPU 11, and various types of data. The communication unit 19 communicates with an external apparatus through the Internet or other networks. A program may be acquired through the communication unit 19 and may be stored in the storage unit 18.

When a magnetic disk 31, an optical disk 32, a magnetooptical disk 33, or a semiconductor memory 34 is loaded, a drive 20 connected to the input/output interface 15 drives the loaded recording medium and acquires a program and data recorded thereon. The acquired program and data is transferred and stored in the storage unit 18, if needed.

As the signal processing apparatus 1, for example, a television receiver or an optical disk player, or its signal processing unit, can be used.

Figure 2:
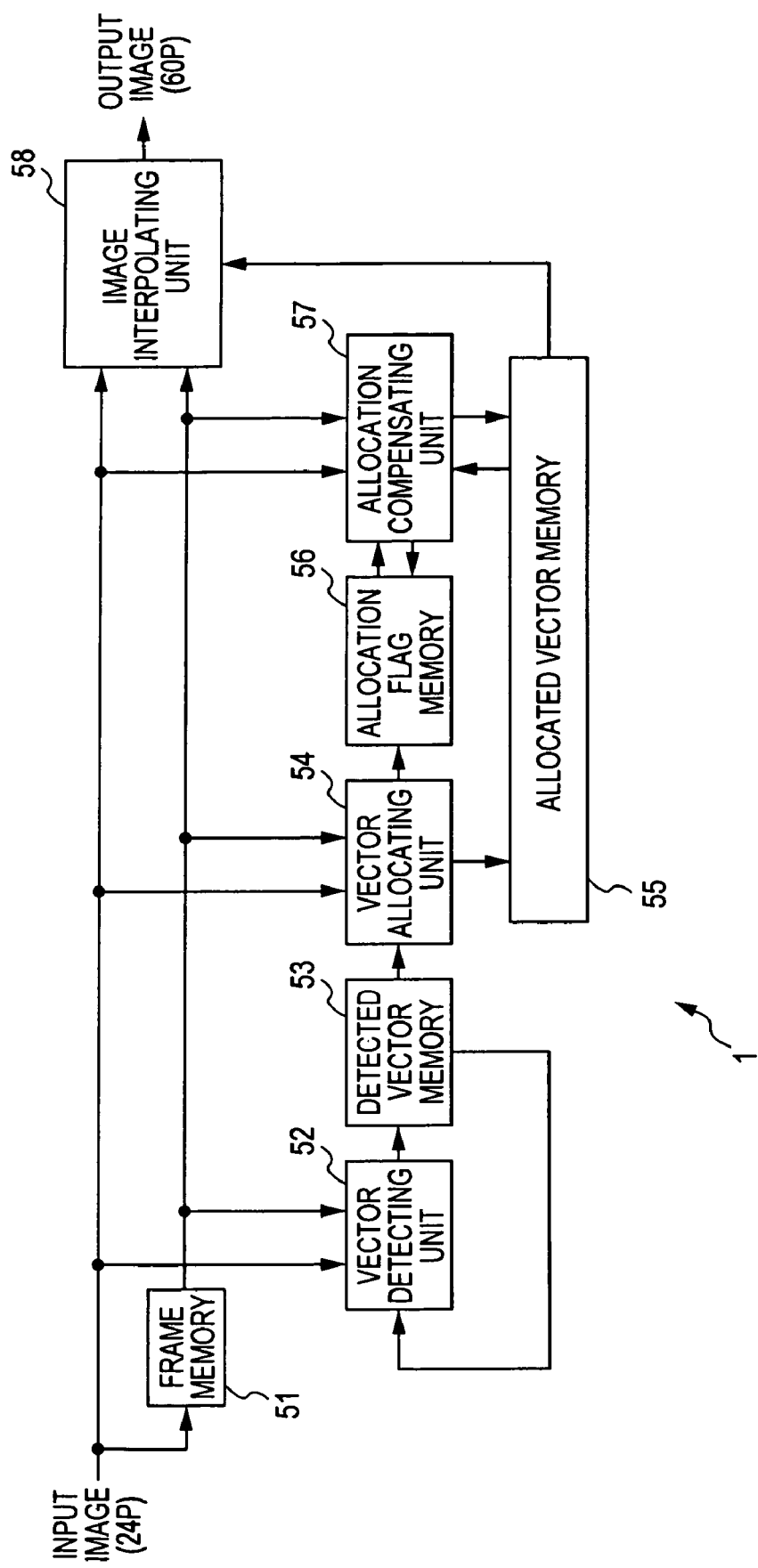
FIG. 2 is a block diagram showing the configuration of the signal processing apparatus shown in FIG. 1.

FIG. 2 is a block diagram showing the signal processing apparatus 1.

The functions of the signal processing apparatus 1 may be realized either by hardware or by software. In other words, the block diagrams in this specification may be regarded either as hardware block diagrams or as software block diagrams.

The signal processing apparatus 1 shown in FIG. 2 receives an image based on a progressive image signal (hereinafter referred to as a "24P signal") having a frame frequency of 24 Hz. The signal processing apparatus 1 converts the input image into an image based on a progressive image signal (hereinafter referred to as a "60P signal") having a frame frequency of 60 Hz, and outputs the converted image. In other words, FIG. 2 shows the configuration of the signal processing apparatus 1, which serves as an image processing apparatus.

The image based on the 24P signal input to the signal processing apparatus 1 is supplied to a frame memory 51, a vector detecting unit 52, a vector allocating unit 54, an allocation compensating unit 57, and an image interpolating unit 58. The frame memory 51 stores the input image in units of frames. The frame memory 51 stores a frame at time t which is anterior to an input image at time t+1. The frame t at time t, stored in the frame memory 51, is supplied to the vector detecting unit 52, the vector allocating unit 54, the allocation compensating unit 57, and the image interpolating unit 58. In the following description, the frame at time t in the frame memory 51 is hereinafter referred to as "frame t", and the frame at time t+1 of the input image is hereinafter referred to as "frame t+1".

The vector detecting unit 52 detects a motion vector between a block of interest in frame t in the frame memory 51 and an object block in frame t+1 of the input image, and stores the detected motion vector in the detected vector memory 53. As a method for detecting the motion vector between the above two frames, a method, such as a gradient method or block matching, is used. Details of the configuration of the vector detecting unit 52 are described later. The detected vector memory 53 stores the motion detected in frame t by the vector detecting unit 52.

The vector allocating unit 54 allocates the motion vector detected in the 24P signal frame t of to a pixel in the 60P-signal frame for interpolation in the allocated vector memory 55. In the following description, the 60P-signal frame is also hereinafter referred to as the "interpolated frame" in order to be distinguished from the 24P signal frame. The vector allocating unit 54 rewrites an allocation flag in the allocation flag memory 56 into one (true). Details of the configuration of the vector allocating unit 54 are described later.

The allocated vector memory 55 stores the motion vector allocated by the vector allocating unit 54 in a form in which the allocated motion vector is associated with each pixel of the interpolated frame. The allocation flag memory 56 stores, for each pixel of the interpolated frame, an allocation flag indicating whether there is an allocated motion vector. For example, when the allocation flag is true (one), it is indicated that a motion vector is allocated to a corresponding pixel. When the allocation flag is false (zero), it is indicated that no motion vector is allocated to a corresponding pixel.

By referring to the allocation flag in the allocation flag memory 56, the allocation compensating unit 57 compensates, to a pixel of interest to which no motion vector is allocated by the vector allocating unit 54, for the motion vectors of peripheral pixels around the pixel of interest, and allocates the compensated pixel to the interpolated frame in the allocated vector memory 55. At this time, the allocation compensating unit 57 rewrites the allocation flag in the pixel of interest to which the motion vector is allocated so that it is one (true). Details of the allocation compensating unit 57 are described later.

The image interpolating unit 58 performs interpolation to generate a pixel in the interpolated frame by using the motion vector allocated to the interpolated frame of the allocated vector memory 55 and pixels in frame t and the next frame t+1. The image interpolating unit 58 outputs a 60P-signal image to a subsequent stage (not shown) by outputting the generated interpolated frame, and subsequently outputting frame t+1, if needed. In the following description, a pixel value is also hereinafter referred to as a "luminance".

Figure 3:
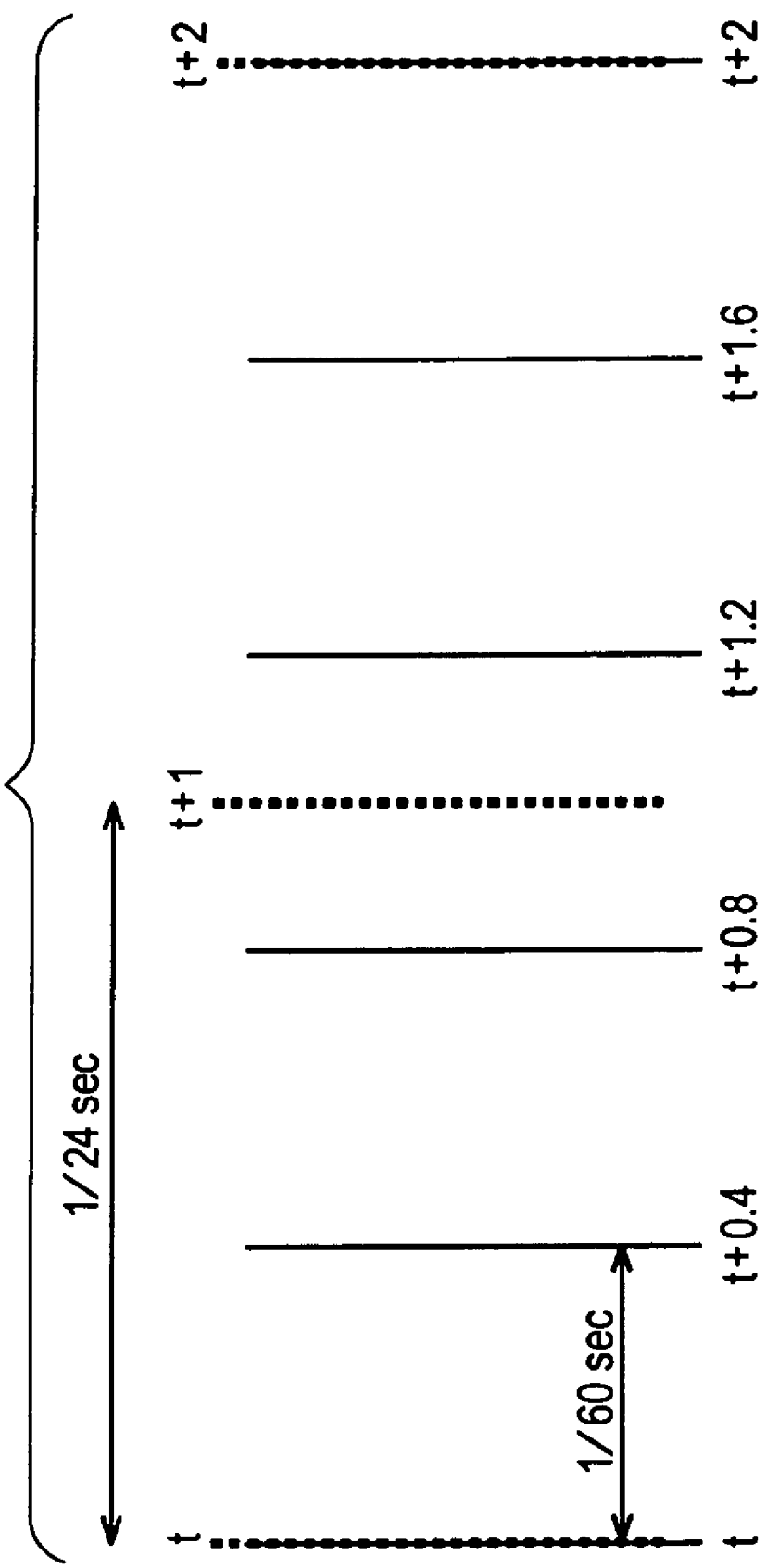
FIG. 3 is an illustration of the principle of processing of the present invention.

FIG. 3 illustrates the principle of processing performed by the signal processing apparatus 1 of the present invention. In the example shown in FIG. 3, the dotted lines indicate 24P signal frames at times t, t+1, and t+2, and the solid lines indicate generated interpolated 60P-signal frames at times t, t+0.4, t+0.8, t+1.2, t+1.6, and t+2.

In general, in order to convert a 24P signal into a 60P signal, 5/2-fold frames are required. In other words, from two 24P-signal images, five 60P-signal images must be generated. In this case, generated 60P signal interpolated frames are disposed at positions where time phases on the 24P signal are 0.0, 0.4, 0.8, 1.2, and 1.6 in order to have equal frame intervals. Among these frames, four frames (frames at times t+0.4, t+0.8, t+1.2, and t+1.6), excluding one frame at time t where the time phase is 0.0, are images that do not exist on the 24P signal. Thus, when the 24P-signal image is input, four interpolated frames are generated from two frames at times t and t+1. Therefore, the signal processing apparatus 1 outputs a 60P-signal image composed of five frames at times t, t+0.4, t+0.8, t+1.2, and t+1.6.

As described above, the signal processing apparatus 1 executes frame frequency conversion for converting a 24P-signal image to a 60P-signal image.

In principle, as described above, from two 24P signal frames at times t and t+1, five 60P-signal frames at times t, t+0.4, t+0.8, t+1.2, and t+1.6 are generated. Actually, in the example in FIG. 3, based on two 24P signal frames at times t and t+1, 60P-signal frames at times t, t+0.4, and t+0.8 are generated. Based on two 24P signal frames at times t+1 and t+2, 60P-signal frames at times t+1.2, t+1.6, and t+2 are generated.

Figure 4:
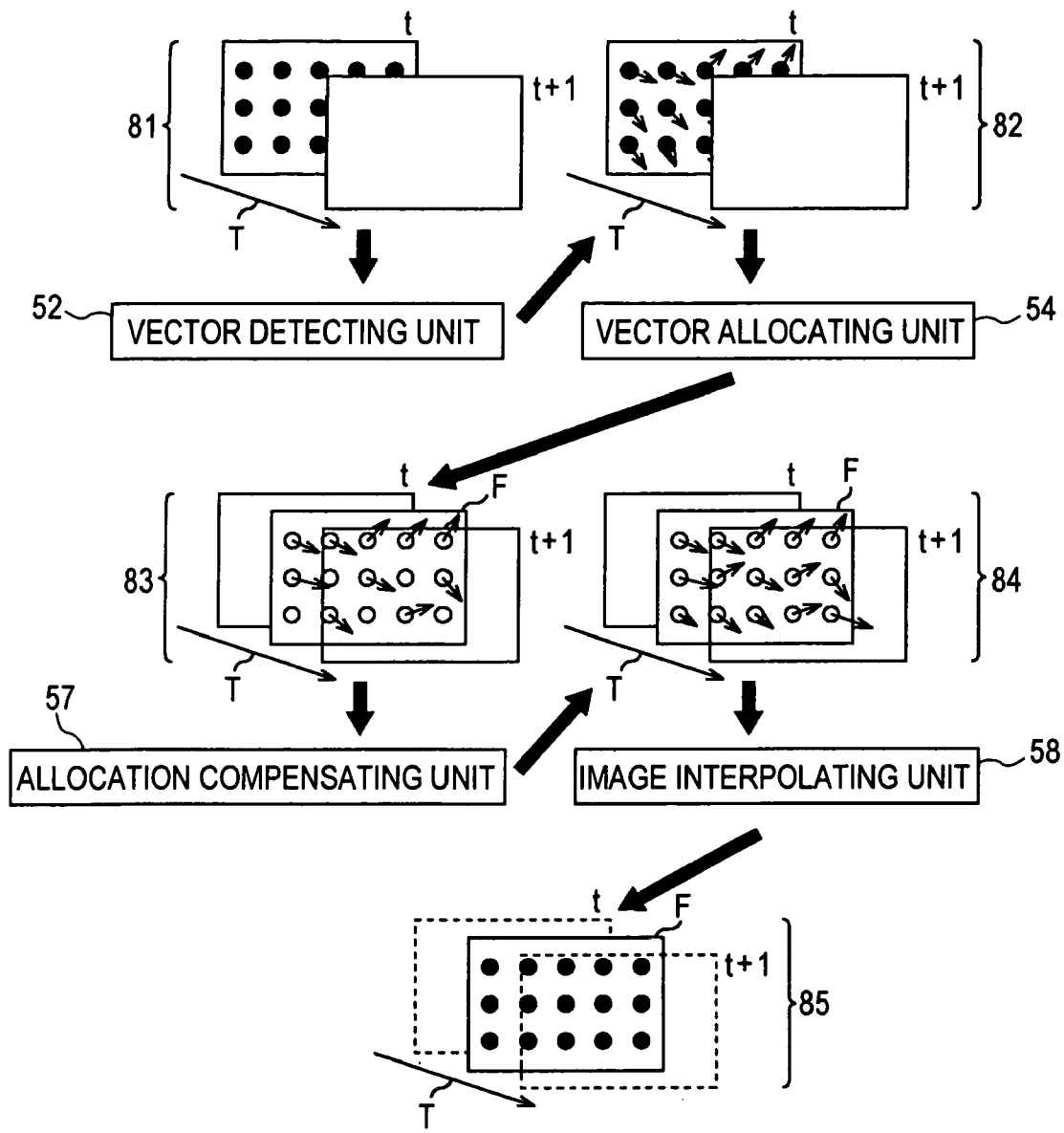
FIG. 4 is a detailed illustration of the processing of the present invention.

FIG. 4 is a more specific illustration of the processing of the present invention. In the example shown in FIG. 4, the bold arrows indicate changes of states, and the arrows T indicates directions in which time elapses in states 81 to 85. States 81 to 85 conceptually represent states of 60P signal interpolated frames F which are generated, in a mode of input/output to/from each unit constituting the signal processing apparatus 1, in frame t at time t of the 24P signal, in frame t+1 at the next time t+1, and between frame t and frame t+1. In other words, actually, a frame in which motion vectors are detected as indicated by state 82 is not input. Frames and motion vectors are separately input.

State 81 indicates each state of the 24P signal frames t and t+1 which are input to the vector detecting unit 52. The black spots in frame t in state 81 indicate pixels in frame t. The vector detecting unit 52 detects positions to which the pixels in frame t in state 81 can move in the next frame at time t+1, and outputs the movements as motion vectors corresponding to the pixels, as shown in frame t in state 82. As a method for detecting the motion vectors between two frames, block matching, the gradient method, or the like, is used. When, in this case, a plurality of motion vectors is detected for one pixel, the vector detecting unit 52 finds evaluated values of the motion vectors (described later), and selects a motion vector based on the evaluated values.

State 82 represents each state of frames t and t+1 which are input to the vector allocating unit 54. In state 82, the arrows from the pixels in frame t indicate motion vectors detected by the vector detecting unit 52.

The vector allocating unit 54 stretches the motion vectors detected for the pixels in frame t to the next frame t+1, and finds positions through which the motion vectors pass in an interpolated frame F in predetermined time phase (e.g., t+0.4 in FIG. 3). This is because, assuming that movements of the motion vectors are constant between frames t and t+1, points at which the motion vectors pass through the interpolated frame F serve as pixel positions in the interpolated frame F. Accordingly, the vector allocating unit 54 allocates one passing motion vector to four neighboring pixels in the interpolated frame F in state 83. In addition, at this time, there may be a case in which there is no motion vector depending on a pixel in the interpolated frame F, or a case in which a plurality of motion vectors will serve as compensating candidates. In the latter case, similarly to the vector detecting unit 52, the vector allocating unit 54 finds evaluated values of motion vectors, and selects, based on the evaluated values, a motion vector to be allocated.

The state 83 represents each state of frame t, frame t+1, and the interpolated frame F to which the motion vector is allocated which are input to the allocation compensating unit 57. In the interpolated frame F in state 83, motion vectors to which the motion vectors are allocated by the vector allocating unit 54, and pixels to which no motion vectors are allocated are shown.

The allocation compensating unit 57 compensates, to one pixel in state 83 to which no motion vector is allocated, by using the motion vectors allocated to peripheral pixels around the pixel to which no motion vector is allocated. This is because, if the assumption holds that a neighboring region around a pixel of interest has a similar movement, the motion vectors of peripheral pixels around the pixel of interest, and a motion vector in the pixel of interest have resemblance. This provides a motion vector, which is accurate to some extent, to even a pixel to which no motion vector is allocated, so that motion vectors are allocated to all the pixels in the interpolated frame F in state 84. Also in this case, there are the motion vectors of peripheral pixels as candidates, the allocation compensating unit 57 finds evaluated values or the motion vectors similarly to the vector allocating unit 54, and selects, based on the evaluated values, a motion vector to be allocated.

State 84 represents each state of frame t, frame t+1, and the interpolated frame F to which motion vectors are allocated to all the pixels. These frames are input to the image interpolating unit 58. Based on the motion vectors allocated to all the pixels, the image interpolating unit 58 determines positional relationships between the pixels in the interpolated frame F and the pixels in two frames t and t+1. Accordingly, by using the motion vectors allocated to the interpolated frame F and the pixels in frames t and t+1, the image interpolating unit 58 performs interpolation to generate pixels in the interpolated frame F, as indicated by the black spots in the interpolated frame F in state 85. The image interpolating unit 58 outputs the 60P-signal image to the subsequent stage (not shown) by outputting the generated interpolated frame and subsequently outputting frame t+1.

Next, evaluated values of motion vectors which are used in the signal processing apparatus 1 of the present invention are described below with reference to FIG. 5.

As described with reference to FIG. 4, in the functional units (the vector detecting unit 52, the vector allocating unit 54, and the allocation compensating unit 57) of the signal processing apparatus 1, motion vectors that are optimal for processing in the subsequent stage are selected. In this case, each of the signal processing apparatus 1 uses, as an evaluated value of a motion vector, a displaced frame difference (DFD) representing a correlation value between blocks that are shifted by vector values of interest in two frames.

Figure 5:
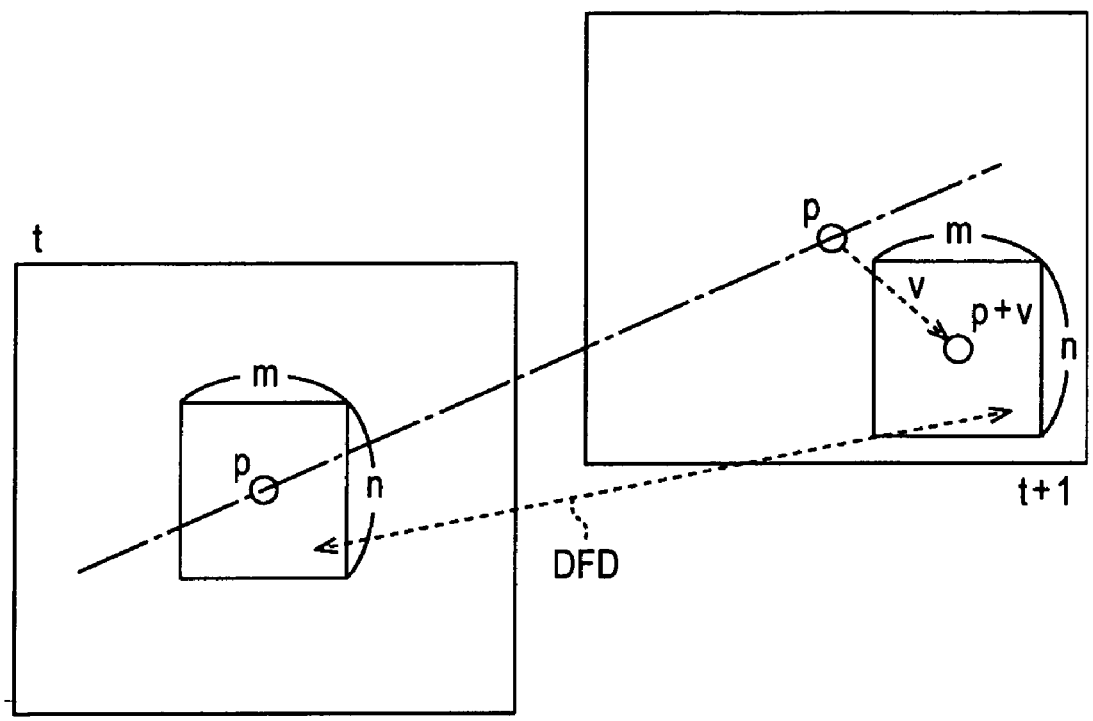
FIG. 5 is an illustration of an evaluated value used in the signal processing apparatus.

The example shown in FIG. 5 shows two blocks, that is, an m-by-n block around a pixel position p in frame t at time t, and an m-by-n block around a pixel position p+v that is shifted from a pixel position in frame t+1 at time t+1 by a vector value of motion vector v of interest. Displaced frame difference $DFD_t(p)$ calculated between the two blocks is represented by the following expression (1):

$$DFD_t(p) = \sum_{x,y}^{m \times n} |F_{t+1}(p_{x,y} + v) - F_t(p_{x,y})| \quad (1)$$

where $F_t(p)$ represents a luminance at a pixel position p at time t, and m×n represents a DFD operation range (block) for finding a displaced frame difference.

A displaced frame difference represents a correlation value between DFD operation ranges (blocks) in two frames. Thus, in general, the smaller the displaced frame difference is, the more the waveforms of the blocks between the frames coincide with each other. Therefore, it is determined that the smaller the displaced frame difference is, the higher the reliability of motion vector v is. Accordingly, the displaced frame difference is used to select a most probable motion vector from among a plurality of motion vectors.

Therefore, in the following description, in the functional units (the vector detecting unit 52, the vector allocating unit 54, and the allocation compensating unit 57) of the signal processing apparatus 1, a displaced frame difference (hereinafter also referred to as an "evaluated value DFD") is used as an evaluated value when a motion vector is selected.

Figure 6:
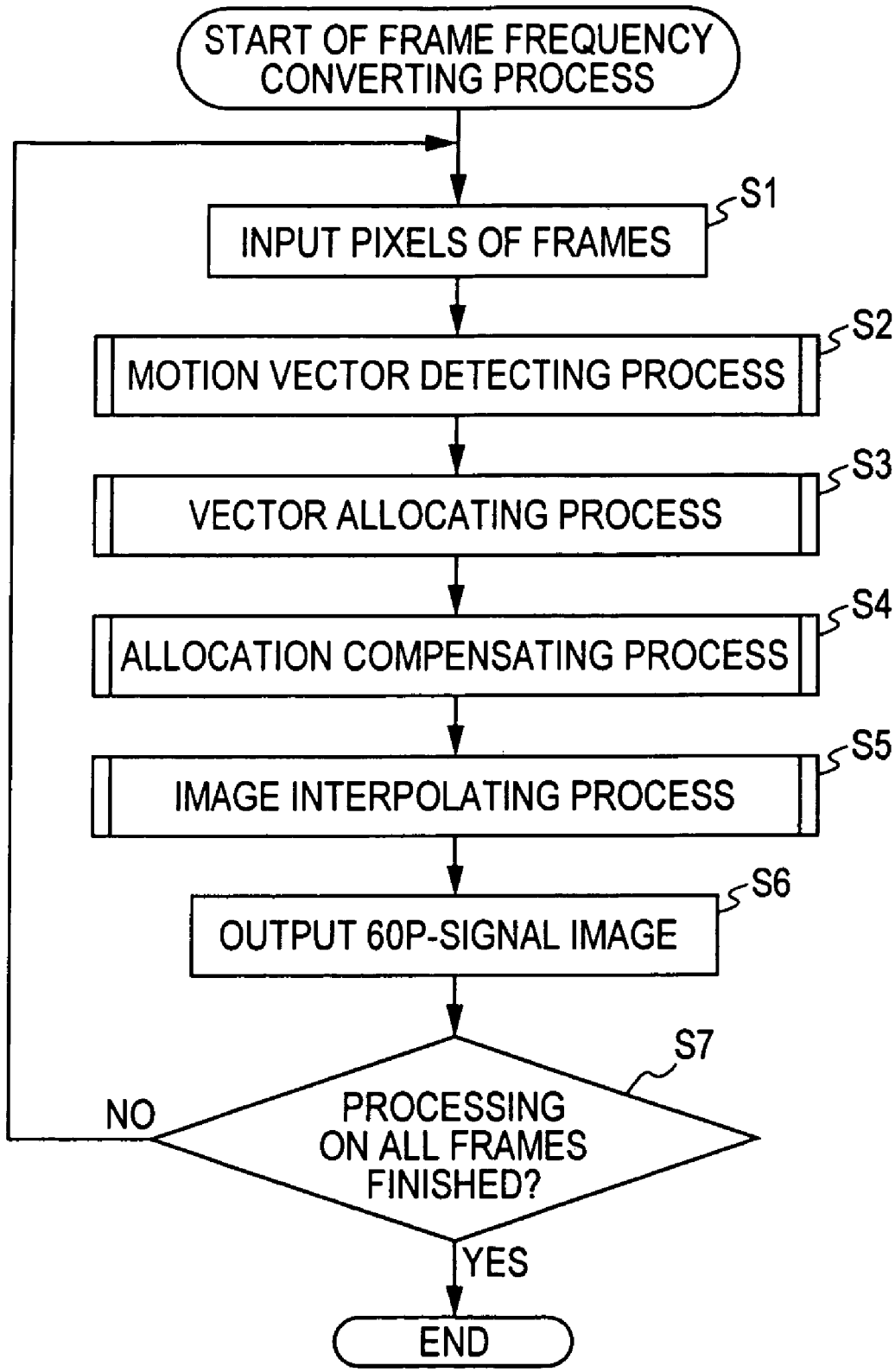
FIG. 6 is a flowchart illustrating a frame frequency converting process in the signal processing apparatus.

Next, a frame frequency converting process of the signal processing apparatus 1 is described below with reference to the flowchart shown in FIG. 6.

In step S1, a pixel value of frame t+1 at time t+1 of the input image and a pixel value in anterior frame t at time t of the input image in the frame memory 51 are input to the vector detecting unit 52. The process proceeds to step S2. At this time, the pixel value of frame t+1 at time t+1 of the input image and the pixel value in anterior frame t at time t of the input image in the frame memory 51 are input to the vector allocating unit 54, the allocation compensating unit 57, and the image interpolating unit 58.

In step S2, the vector detecting unit 52 executes a motion vector detecting process, and proceeds to step S3. In other words, the vector detecting unit 52 detects a motion vector between a block of interest in frame t in the frame memory 51, and an object block in the next frame t+1, which is an input image. The vector detecting unit 52 stores the detected motion vector in the detected vector memory 53, and proceeds to step S3. For detecting the motion vector between two frames, a gradient method, block matching, or the like, is used. In addition, when there are candidate motion vectors, evaluated values DFD of the motion vectors are found, and a highly reliable motion vector based on the found evaluated values DFD is detected. In other words, in this case, in a block of interest from which a motion vector is to be detected, a most probable motion vector is selected and detected. Details of the motion vector detecting process in step S2 are described later.

In step S3, the vector allocating unit 54 executes a vector allocating process, and proceeds to step S4. Specifically, the vector allocating unit 54 allocates the motion vector found in frame t to a pixel of interest in an interpolated frame in the allocated vector memory 55, which is subject to interpolation, and rewrites an allocation flag in the allocation flag memory 56 which corresponds to the pixel having the allocated motion vector so that it is one (true). For example, an allocation flag which is true indicates that a motion vector is allocated to a corresponding pixel, and an allocation flag which is false indicates that a motion vector is not allocated to a corresponding pixel. When each pixel has a plurality of candidate motion vectors, evaluated values are found for the motion vectors, and a highly reliable motion vector based on the evaluated values DFD is allocated. In other words, in this case, for a pixel of interest to which a motion vector is to be allocated, a highly reliable motion vector is selected and allocated. Details of the vector allocating process in step S3 are described later.

In step S4, the allocation compensating unit 57 executes an allocation compensating process, and proceeds to step S5. In other words, in step S4, by referring to the allocation flag in the allocation flag memory 56, the allocation compensating unit 57 compensates, to the pixel of interest to which no motion vector is allocated by the vector allocating unit 54, for a motion vector in a peripheral pixel around the pixel of interest, and allocates the obtained pixel to the interpolated frame in the allocated vector memory 55. At this time, the allocation compensating unit 57 compensates for the motion vector, and rewrites the allocation flag of the allocated pixel of interest so that it is one (true). When the pixel of interest has a plurality of motion vectors of peripheral pixels, evaluated values DFD are found for the motion vectors, and a highly reliable motion vector is allocated based on the obtained evaluated values DFD. In other words, in this case, for the pixel of interest to which a motion vector is to be allocated, a most probable motion vector is selected and allocated. Details of the allocation compensating process in step S4 are described later.

In step S5, the image interpolating unit 58 executes an image compensating process. In other words, in step S5, the image interpolating unit 58 performs compensation to generate a pixel value in the interpolated frame by using the motion vector allocated to the interpolated frame in the allocated vector memory 55, and pixels in frames t and t+1. The process proceeds to step S6. Details of the image compensating process in step S5 are described later. In step S6, the image interpolating unit 58 outputs a 60P-signal image to the subsequent stage (not shown) by outputting the generated interpolated frame, and subsequently outputting frame t+1, if needed. The process proceeds to step S7.

In step S7, the vector detecting unit 52 determines whether processing on all frames has finished. If it is determined that the processing on all frames has not finished, the process returns to step S1 and repeatedly performs the subsequent steps. If, in step S7, it is determined that the processing on all frames has finished, the vector detecting unit 52 finishes the frame frequency converting process.

As described above, the signal processing apparatus 1 of the present invention detects a motion vector from a frame of a 24P-signal image, allocates the detected motion vector to a pixel in a 60P-signal frame, and generates a pixel value in the 60P-signal frame based on the allocated motion vector. At this time, the signal processing apparatus 1 selects a highly reliable motion vector based on evaluated values DFD (displaced frame differences) in each time of processing, and outputs the motion vector to the subsequent stage. Accordingly, the signal processing apparatus 1 can generate a higher quality image since a defect, such as a loss of motion, is suppressed.

Next, details of the image interpolating unit 58 are described below with reference to FIG. 7.

Figure 7:
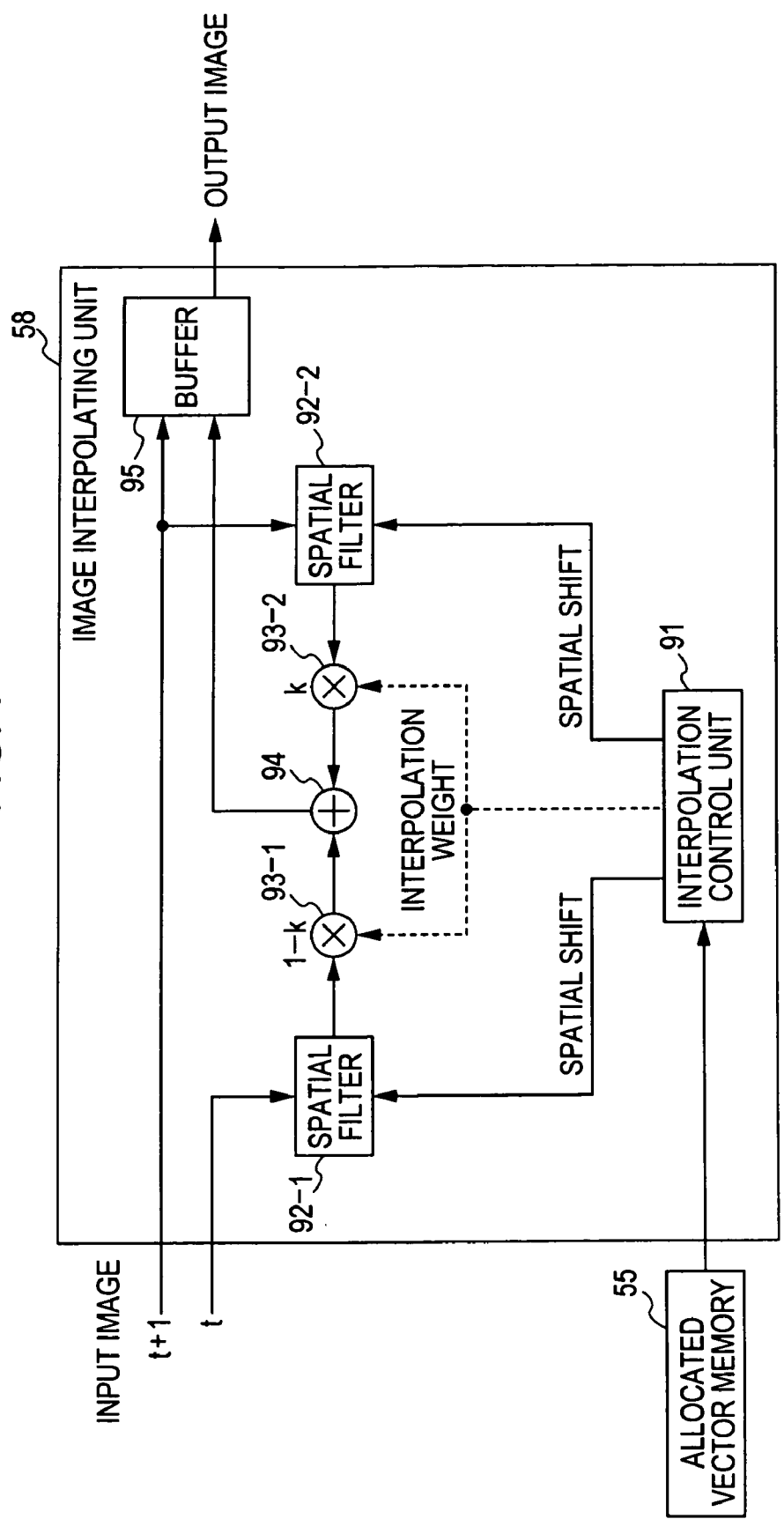
FIG. 7 is a block diagram showing the configuration of an image interpolating unit.

FIG. 7 is a block diagram showing the configuration of the image interpolating unit 58. The image interpolating unit 58, whose configuration is shown in FIG. 7, performs a process which performs interpolation to generate pixels of the interpolated frame by using motion vectors allocated to the interpolated frame in the allocated vector memory 55, and the pixels in frames t and t+1, and outputting a 60P-signal image.

In the example in FIG. 7, frame t at time t is input to a spatial filter 92-1, while frame t+1 at time t+1 is input to a spatial filter 92-2 and a buffer 95.

The interpolation control unit 91 selects a pixel in the interpolated frame in the allocated vector memory 55, and, based on a motion vector allocated to the selected pixel, finds positional relationships (spatial shifts) between the pixel in the interpolated frame and pixels in two frames t and t+1. Specifically, the interpolation control unit 91 uses a pixel in the interpolated frame as a reference, and finds, from a position in frame t which is associated by a motion vector of the pixel, and the position in frame t which corresponds to the pixel in the interpolated frame, spatial shifts concerning both frames. The interpolation control unit 91 supplies the obtained spatial shifts to the spatial filter 92-1. Similarly, the interpolation control unit 91 uses a pixel in the interpolated frame as a reference, and finds, from a position in frame t+1 which is associated by a motion vector of the pixel, and the position in frame t+1 which corresponds to the pixel in the interpolated frame, spatial shifts concerning both frames. The interpolation control unit 91 supplies the obtained spatial shifts to the spatial filter 92-2.

In addition, based on a time phase (time) in the interpolated frame which is set beforehand, the interpolation control unit 91 finds an interpolation weight between frames t and t+1, and sets the obtained interpolation weight in multipliers 93-1 and 93-2. For example, when the time in the interpolated frame is at a distance of "k" from the time t+1 of frame t+1, and is at a distance of "1−k" from the time t of frame t, that is, when the interpolated frame is generated at a time that internally divides times t and t+1 into "1−k":"k", the interpolation control unit 91 sets an interpolation weight of "1−k" in the multiplier 93-1, and sets an interpolation weight of "k" in the multiplier 93-2.

The spatial filters 92-1 and 92-2 are formed by, for example, cubic filters or the like. Based on the pixel value of a pixel in frame t, which is input, and the spatial shift supplied from the interpolation control unit 91, the spatial filter 92-1 finds a pixel value in frame t which corresponds to the pixel in the interpolated frame, and outputs the obtained pixel value to the multiplier 93-1. Based on the pixel value of a pixel in frame t+1, which is input, and the spatial shift supplied from the interpolation control unit 91, the spatial filter 92-2 finds a pixel value in frame t+1 which corresponds to the pixel in the interpolated frame, and outputs the obtained pixel value to the multiplier 93-2.

When the position of the pixel in the interpolated frame does not coincide with the position of the pixel in frame t or frame t+1, that is, when the position of the interpolated frame has a component equal to or less than the pixel value in frame t or frame t+1, by using the pixel values of four adjacent pixels around the pixel in the interpolated frame in frame t or frame t+1, the spatial filter 92-1 or 92-2 finds the sum of reciprocal ratios of distances to the adjacent pixels, whereby a pixel value in the frame which corresponds to the pixel in the interpolated frame is found. In other words, a pixel value that is equal to or less than a reference pixel value is found by linear interpolation based on the distances to the adjacent pixels.

The multiplier 93-1 multiplies the pixel value in frame t, which is input from the spatial filter 92-1, by the interpolation weight "1−k" set in the interpolation control unit 91, and outputs the weighted pixel value to an adder 94. The multiplier 93-2 multiplies the pixel value in frame t+1, which is input from the spatial filter 92-2, by the interpolation weight "k" set in the interpolation control unit 91, and outputs the weighted pixel value to the adder 94.

The adder 94 generates the pixel value of the pixel in the interpolated frame by adding the pixel value input from the multiplier 93-1 and the pixel value input from the multiplier 93-2, and outputs the generated pixel value in the interpolated frame to the buffer 95. The buffer 95 buffers the input frame t+1. The buffer 95 outputs the generated interpolated frame. Subsequently, by outputting the buffered frame t+1, if needed, based on the time phase (time) of the 60P frame, which is set beforehand, the buffer 95 outputs the 60P-signal image to the subsequent stage (not shown).

Figure 8:
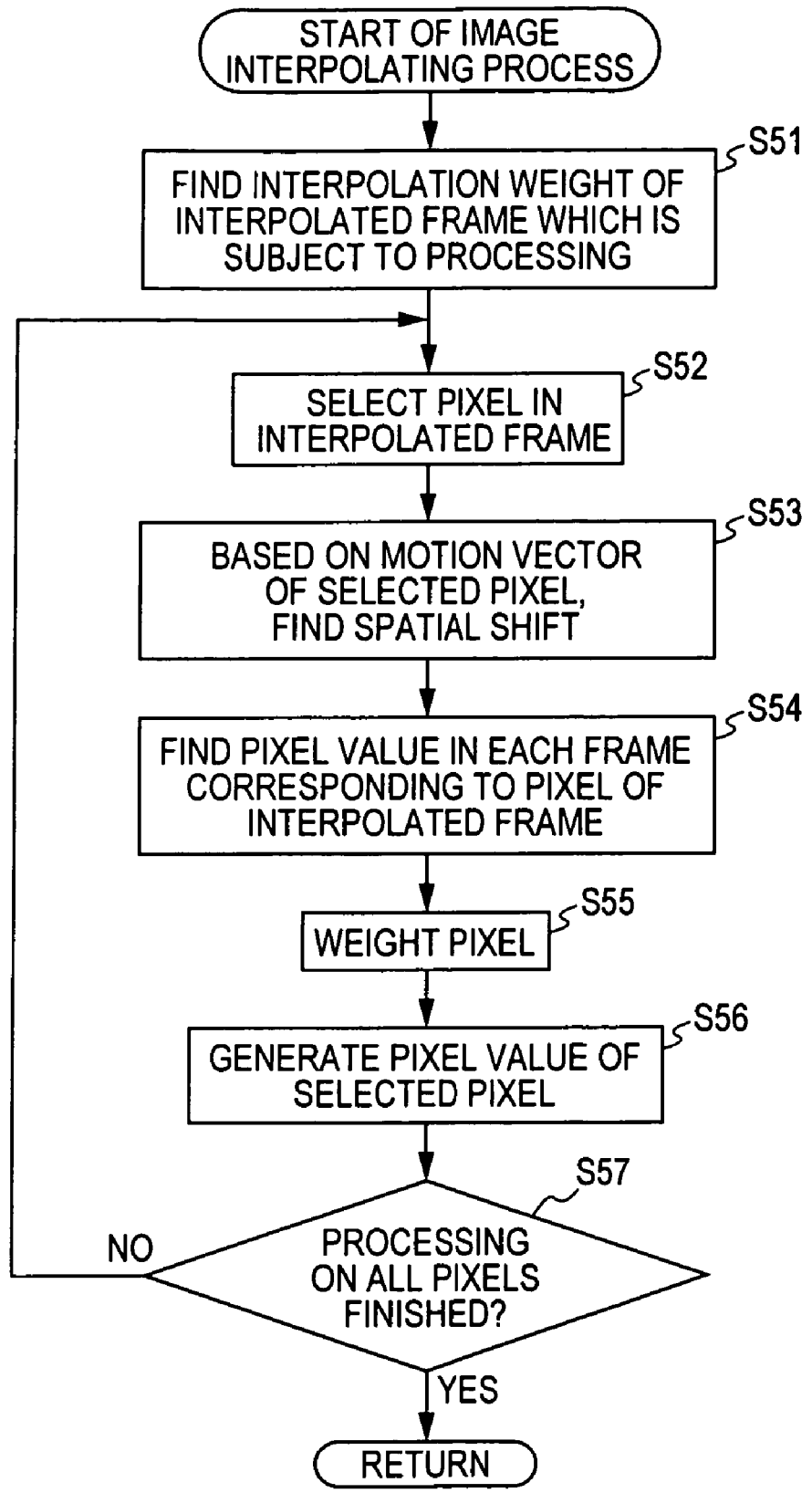
FIG. 8 is a flowchart illustrating an image interpolating process.

Details of the image interpolating process by the image interpolating unit 58 having the above configuration are described below with reference to the flowchart shown in FIG. 8.

In step S51, based on the time phase of the interpolated frame, which is to be processed, the interpolation control unit 91 finds the interpolation weights (e.g., "k" and "1−k") of the interpolated frame between frames t and t+1, and sets the obtained interpolation weights in the multipliers 93-1 and 93-2. The process proceeds to step S52. In step S52, the interpolation control unit 91 selects a pixel in the interpolated frame in the allocated vector memory 55 and proceeds to step S53. Pixels in the interpolated frame are selected in raster scanning order from a top left pixel in the frame.

In step S53, based on a motion vector allocated to the selected pixel, the interpolation control unit 91 finds positional relationships (spatial shifts) between the pixel in the interpolated frame and each of pixels in two frames t and t+1. The interpolation control unit 91 supplies the obtained spatial shifts to the spatial filters 92-1 and 92-2, and the process proceeds to step S54. Specifically, in step S53, by using the pixel in the interpolated frame as a reference, from a position in frame t which is associated by its motion vector, and the position of the pixel in frame t which corresponds to the pixel in the interpolated frame, the interpolation control unit 91 finds spatial shifts concerning both frames and supplies the obtained spatial shifts to the spatial filter 92-1. Similarly, by using the pixel in the interpolated frame, from a position in frame t+1 which is associated by its motion vector, and the position of the pixel in frame t+1 which corresponds to the pixel in the interpolated frame, the interpolation control unit 91 finds spatial shifts concerning both frames and supplies the spatial shifts to the spatial filter 92-2.

The pixel value in frame t of the image at time t is input to the spatial filter 92-1, while the pixel value in frame t+1 of the image at t+1 is input to the spatial filter 92-2. In step S54, based on the pixel values of the pixel in frames t and t+1, and the spatial shift supplied from the interpolation control unit 91, the spatial filters 92-1 and 92-2 find pixel values in the frames which correspond to the pixel in the interpolated frame, and outputs the obtained pixel values to the multipliers 93-1 and 93-2.

In step S55, the multipliers 93-1 and 93-2 use the interpolation weight set by the interpolation control unit 91 to weight the pixel values in the frames which are input from the multipliers 93-1 and 93-2, and output the weighted pixel values to the adder 94. The process proceeds to step S56. Specifically, the multiplier 93-1 multiplies the pixel value in frame t which is input from the spatial filter 92-1 by the interpolation weight "1−k" set by the interpolation control unit 91, and outputs the weighted pixel value to the adder 94. The multiplier 93-2 multiplies the pixel value in frame t+1 which is input from the spatial filter 92-2 by the interpolation weight "k" set by the interpolation control unit 91, and outputs the weighted pixel value to the adder 94.

In step S56, the adder 94 generates the pixel value of the pixel in the interpolated frame by adding the pixel value weighted by the multiplier 93-1 and the pixel value weighted by the multiplier 93-2. The adder 94 outputs the generated pixel value to the buffer 95, and the process proceeds to step S57. In step S57, the interpolation control unit 91 determines whether processing on all pixels in the interpolated frame has finished. If the interpolation control unit 91 has determined that the processing on all pixels in the interpolated frame has not finished, the process returns to step S52, and repeatedly performs the subsequent steps. If, in step S57, the interpolation control unit 91 has determined that the processing on all pixels in the interpolated frame has finished, the image interpolating process ends.

As described above, the pixel value of a pixel in an interpolated frame is generated based on a motion vector allocated to the interpolated frame. In step S6 in FIG. 6 described above, the buffer 95 outputs the interpolated frame, and subsequently outputs frame t+1, whereby a 60P-signal image is output to the subsequent stage (not shown). Therefore, a most probable motion vector is allocated to a pixel in an interpolated frame. Thus, a high quality interpolated frame can be generated.

Next, details of the configuration of the vector detecting unit 52 are described below.

Figure 9:
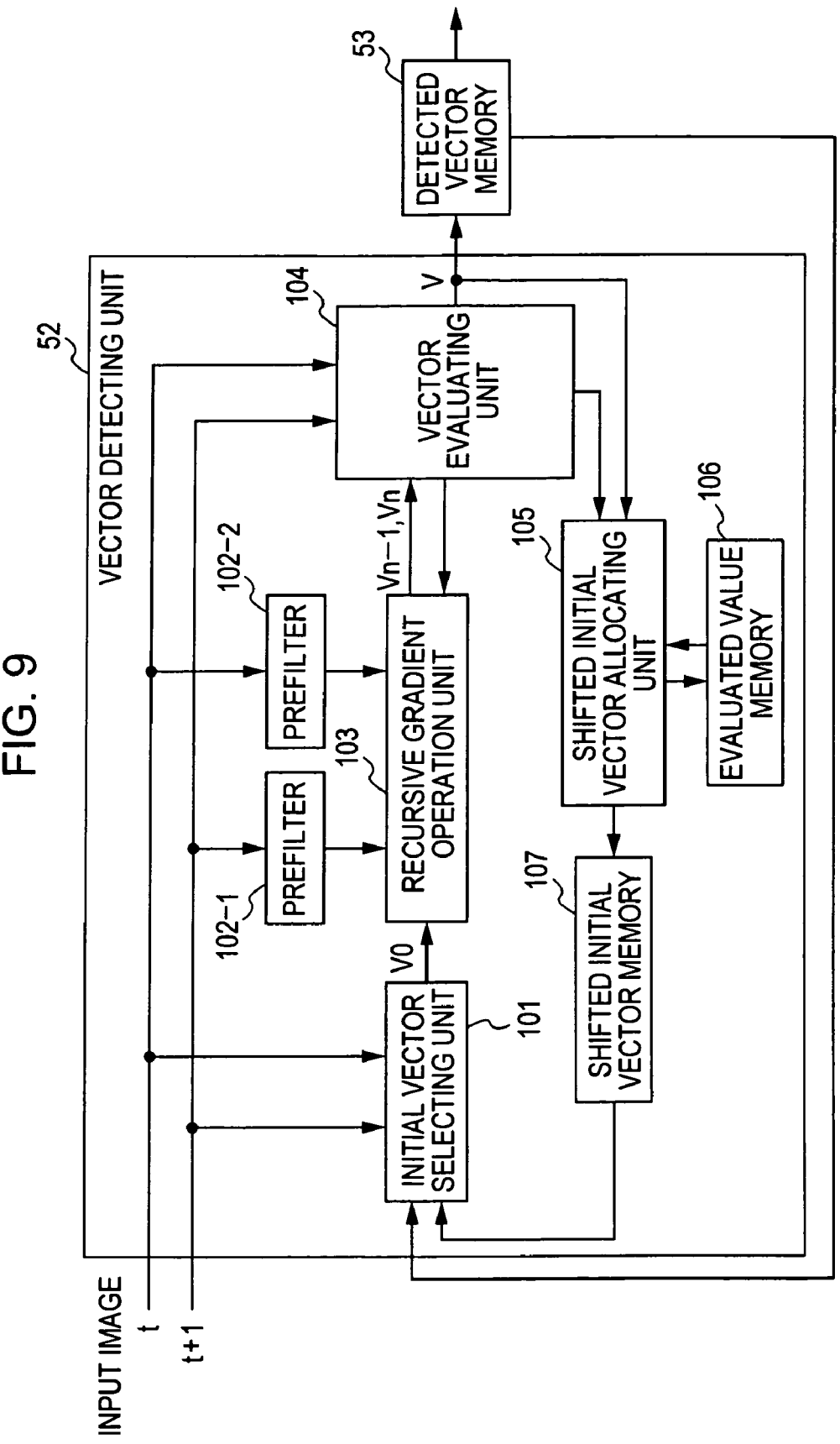
FIG. 9 is a block diagram showing the configuration of a vector detecting unit.

FIG. 9 is a block diagram showing the configuration of the vector detecting unit 52. The vector detecting unit 52, whose configuration is shown in FIG. 9, detects a motion vector in frame t by using frame t at time t of the input image, and frame t+1 at time t+1 of the input image. This detection of the motion vector is executed for each predetermined block composed of a plurality of pixels.

A highly reliable motion vector obtained from the result of detecting past motion vectors is output as an initial vector V0, which serves as an initial value for use in the gradient method, to a recursive gradient operation unit 103 for each predetermined block by an initial vector selecting unit 101. Specifically, the initial vector selecting unit 101 selects, as candidate vectors for the initial vector, motion vectors obtained in the past of peripheral blocks, which are stored in the detected vector memory 53, and shifted initial vectors stored in a shifted initial vector memory 107. The initial vector selecting unit 101 finds evaluated values DFD of the candidate vectors by using frame t and frame t+1, and selects a most reliable vector based on the obtained evaluated values DFD from among the candidate vectors. The initial vector selecting unit 101 outputs the selected vector as the initial vector V0. Details of the configuration of the initial vector selecting unit 101 are described later.

Prefilters 102-1 and 102-2 are formed by lowpass filters or Gaussian filters. The prefilters 102-1 and 102-2 eliminate noise components from frame t and frame t+1 of the input image, and output the obtained frames to the recursive gradient operation unit 103.

The recursive gradient operation unit 103 uses the gradient method to calculate motion vector Vn for each predetermined block by using the initial vector V0 input from the initial vector selecting unit 101 and frames t and t+1 input through the prefilters 102-1 and 102-2. The recursive gradient operation unit 103 outputs initial vector V0 and the calculated motion vector Vn to the vector evaluating unit 104. In addition, the recursive gradient operation unit 103 calculates the motion vector Vn by recursively performing the gradient operation based on the result of motion vector evaluation by the vector evaluating unit 104. Details of the configuration of the recursive gradient operation unit 103 are described below.

The vector evaluating unit 104 finds evaluated values DFD of the motion vector Vn−1 (or the initial vector V0) from the recursive gradient operation unit 103 and the motion vector Vn, and controls the recursive gradient operation unit 103 based on the obtained evaluated values DFD to recursively perform the gradient operation. Finally, the vector evaluating unit 104 selects a highly reliable vector based on the evaluated values DFD, and stores the selected vector as motion vector V in the detected vector memory 53. Then, the vector evaluating unit 104 supplies the shifted initial vector allocating unit 105 with the evaluated value DFD of the motion vector V together with the motion vector V.

When the shifted initial vector allocating unit 105 is supplied with the motion vector V and the evaluated value DFD therefor from the vector evaluating unit 104, in the shifted initial vector allocating unit 105, a motion vector that passes through a block of interest in the next frame is set as a shifted initial vector that is shifted to the block of interest. In other words, the shifted initial vector allocating unit 105 sets, as the shifted initial vector, a motion vector having, as an initial point, a block of interest in the next frame which is identical in position to a block at a terminal point of the motion vector V, and being identical in magnitude and orientation to the motion vector V. The shifted initial vector allocating unit 105 allocates the set shifted initial vector to the shifted initial vector memory 107 in a form associated with the block of interest.

Specifically, the shifted initial vector allocating unit 105 stores, in the evaluated value memory 106, the evaluated value DFD of the motion vector V allocated as the shifted initial vector in a form associated with the block of interest. The shifted initial vector allocating unit 105 compares the evaluated value DFD with an evaluated value DFD of another motion vector V passing through the same block of interest (i.e., a block in a past frame which is identical in position to the block of interest is used as a terminal point). Subsequently, the shifted initial vector allocating unit 105 shifts the motion vector V, which is highly reliable based on the evaluated value DFD, to the block of interest, and allocates the shifted motion vector as a shifted initial vector in the block of interest to the shifted initial vector memory 107. Details of the configuration of the shifted initial vector allocating unit 105 are described later.

Next, the principle of the gradient method used in the vector detecting unit 52 is described below.

At first, in a moving image, the luminance of a pixel at coordinates (x, y, t) is represented by g(x, y, t). When a pixel of interest at coordinates ($x_0$, $y_0$, $t_0$) is displaced by (dx, dy, dt) in a minute time, by representing horizontal, vertical, and time-base gradients (differences in difference) by gx($x_0$, $y_0$, $t_0$), gy($x_0$, $y_0$, $t_0$), gt($x_0$, $y_0$, $t_0$), respectively, the luminance of the displaced pixel is represented in Taylor expansion approximation by the following expression (2):

g($x_0$+dx, $y_0$+dy, $t_0$+dt)

g(x0, y0, t0)+gx(x0, y0, t0)dx+gy(x0, y0, t0)dy+gt(x0, y0, t0)dt    (2)

When a pixel of interest in the moving image is moved after one frame by horizontal distance vx and vertical distance vy (hereinafter referred to as "(vx, vy)"), the luminance of the pixel is represented by the following expression (3):

g($x_0$+vx, $y_0$+vy, $t_0$+1)=g(x0, y0, t0)    (3)

By substituting Expression (2) for Expression (3), Expression (3) is represented by the following expression:

gx(x0, y0, t0)vx+gy(x0, y0, t0)vy+gt(x0, y0, t0)=0    (4)

Expression (4) has two variables, vx and vy. Thus, it is impossible that a single expression for one pixel of interest is solved. Accordingly, as described below, a block that is a peripheral region around the pixel of interest is regarded as one processing unit, and assuming that all pixels in the block (peripheral region) perform the same movement (vx, vy), a similar expression is written for each pixel. By using the assumption as a condition, for the two variables, the number of expressions, which is equal to the number of peripheral pixels, can be obtained. Therefore, the obtained expressions are simultaneously solved to find a value (vx, vy) in which the sum of the squares of motion-compensated frame differences of all the pixels in the block is the least.

When the pixel (x, y, t) is moved by the value (vx, vy) during one frame, the motion-compensated interframe difference d is represented y the following expression:

$$d = g(x + vx, y + vy, t + 1) - g(x, y, t)$$
$$= \Delta x vx + \Delta y vy + \Delta t$$ (5)

where Δx=gx(x, y, t), which represents a horizontal gradient, Δy=gy(x, y, t), which represents a vertical gradient, and Δt=gt (x, y, t), which represents a temporal gradient.

By using these and representing the sum of the squares of the motion-compensated interframe difference by E, E is represented by the following expression:

$$E = \sum d^2$$ (6)
$$= \sum (\Delta x^2 vx^2 + \Delta y^2 vy^2 + 2\Delta x \Delta y vx vy + 2\Delta x \Delta t vx + 2\Delta y \Delta t vy + \Delta t^2)$$

-continued
$$= vx^2 \sum \Delta x^2 + vy^2 \sum \Delta y^2 + 2vx vy \sum \Delta x \Delta y + 2vx \sum \Delta x \Delta t + 2vy \sum \Delta y \Delta t + \sum \Delta t^2$$

In Expression (6), the value (vx, vy) in which E is the least is obtained when a partial differential value in each variable is zero, that is, when the condition ΔE/Δvx=ΔE/Δvy=0 holds. Thus, from Expression (6), the following expressions are obtained:

vxΣΔx²+vyΣΔxΔy+ΣΔxΔt=0    (7)

vyΣΔy²+vxΣΔxΔy+ΣΔyΔt=0    (8)

From Expressions (7) and (8), the value (vx, vy), which is a motion to be detected, can be calculated by solving the following expression:

$$vx = -\frac{\left(\sum \Delta y^2\right)\left(\sum \Delta t \Delta x\right) - \left(\sum \Delta x \Delta y\right)\left(\sum \Delta t \Delta y\right)}{\left(\sum \Delta x^2\right)\left(\sum \Delta y^2\right) - \left(\sum \Delta x \Delta y\right)^2}$$ (9)

$$vy = -\frac{\left(\sum \Delta x^2\right)\left(\sum \Delta t \Delta y\right) - \left(\sum \Delta x \Delta y\right)\left(\sum \Delta t \Delta x\right)}{\left(\sum \Delta x^2\right)\left(\sum \Delta y^2\right) - \left(\sum \Delta x \Delta y\right)^2}$$

Figure 10:
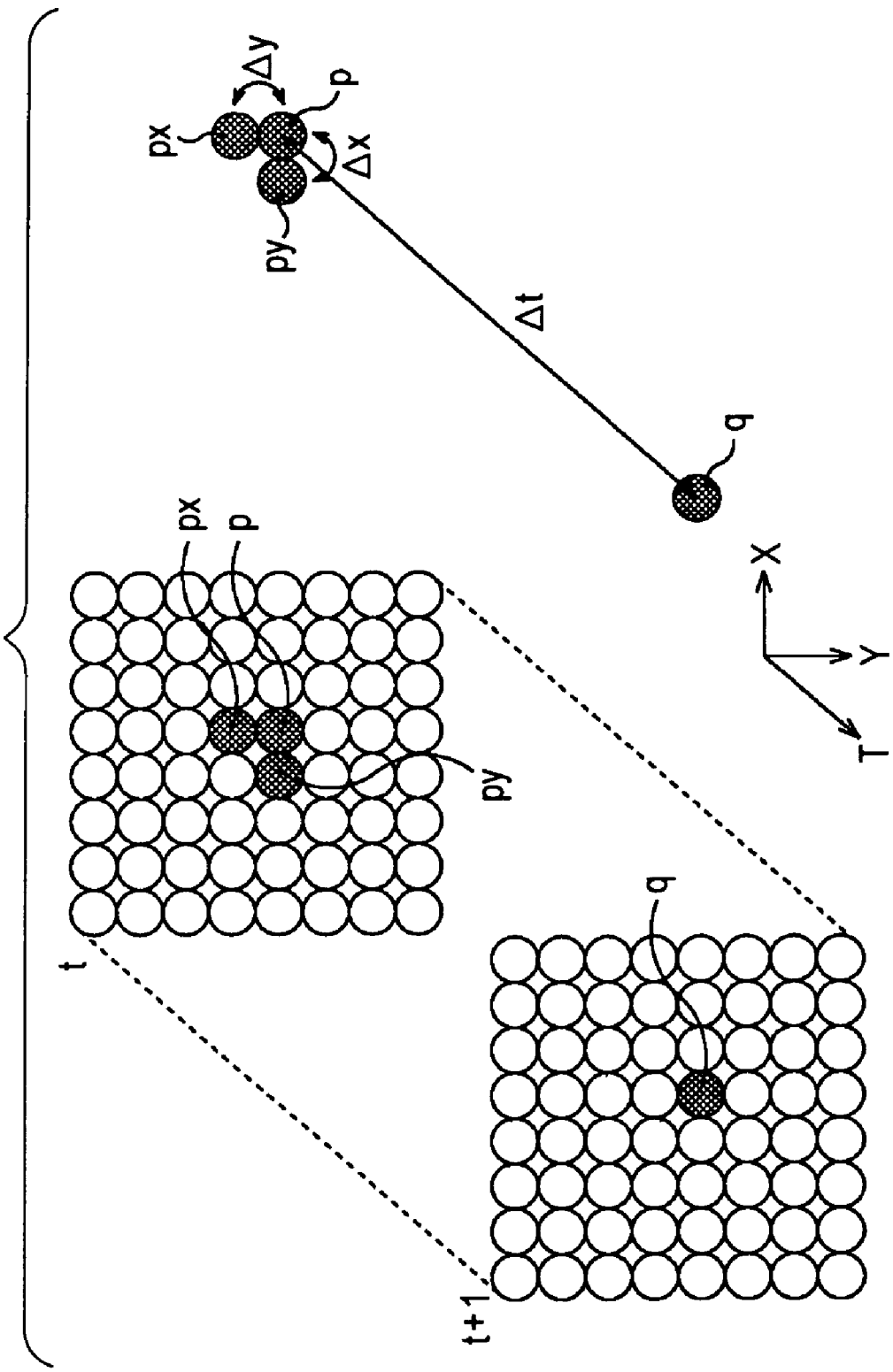
FIG. 10 is an illustration of the gradient method used in the vector detecting unit.

FIG. 10 is used for a specific description. In the example in FIG. 10, the arrow X indicates a horizontal direction, and the arrow Y indicates a vertical direction. In addition, the arrow T indicates a direction of lapse of time from frame t at time t, which is positioned on the right side of the background of FIG. 10, to frame t+1 at time t+1, which is positioned on the left side of the foreground of FIG. 10. In the example in FIG. 10, in each frame, only a region of eight pixels by eight pixels for use in the gradient operation is shown as a peripheral region (block) around a pixel of interest, denoted by reference letter p.

When, in frame t, the motion vector V(vx, vy) of the pixel p of interest, which is positioned in the fifth row downward from the top left pixel and in the fifth column from the top left pixel to the right, is found by using the gradient method, by finding differences (i.e., gradients) Δx and Δy in luminance difference between adjacent pixels px and py, which are obtained in x- and y-directions of the pixel of interest, time-base difference Δt (gradient) in luminance difference with respect to a pixel q positioned in phase with the pixel q of interest, which is obtained in frame t+1, for each of all the pixels in the peripheral region (8 by 8 pixels) around the pixel p of interest, and using Expression (9) to perform operations based on the differences in luminance difference, motion vector V(vx, vy) can be calculated.

In other words, in the gradient method, gradients Δx, Δy, and Δt between two frames are calculated, and, from the obtained Δx, Δy, and Δt, motion vector V(vx, vy) is statistically calculated by using the sum of the squares of the differences.

In general, in motion vector detection using the above gradient method, a highly accurate result is obtained for a minute movement. However, when a movement is found in an actual moving image, this gradient method is not practical since the amount of the movement in the image is too large. For eliminating this defect, it is possible that the gradient method be recursively performed a plural number of times.

By recursively executing the gradient method, the amounts of movements in operations converge. Thus, an accurate movement is gradually calculated.

Nevertheless, only recursively performing the gradient method is not practical from the aspect of operation time when realtime processing is performed. Accordingly, in the vector detecting unit 52, an initial vector found based on movement of a peripheral pixel between past and current frames is used as an initial value, thus reducing the number of times the gradient method is recursively performed. In other words, by calculating, from a pixel of interest which serves as an initial point of movement, a rough movement by adding an offset beforehand to a position represented by the initial vector, and performing operations using the gradient method from the position having the added offset, fine adjustment, including a movement within a pixel, can be performed. This enables detection of an accurate motion vector without increasing the operation time.

Figure 11:
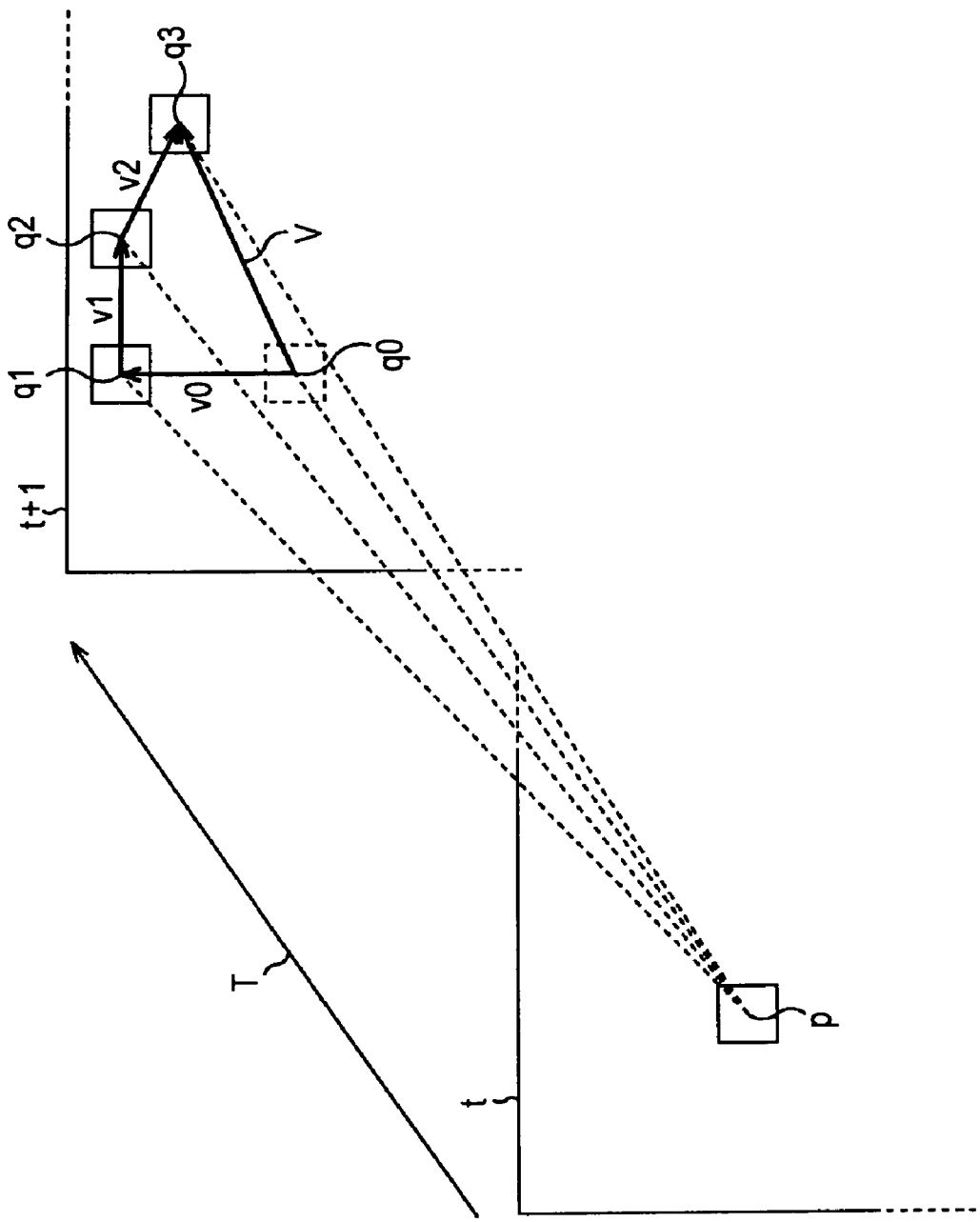
FIG. 11 is an illustration of a recursive gradient method using an initial vector.

FIG. 11 is a specific illustration of a recursive gradient method executed by using an initial vector. In the example shown in FIG. 11, the arrow T indicates lapse of time from frame t at time t, which is shown on the left side of the foreground, to frame t+1 at time t+1, which is shown on the right side of the background. Blocks whose centers are respectively pixels p, q0, q1, q2, and q3 indicate peripheral regions (blocks) for use in gradient operation for the pixels.

In the example in FIG. 11, for pixel p of interest in frame t, in frame t+1, not pixel q0 positioned in phase with pixel p of interest, but initial vector v0 found beforehand is offset (moved) to calculate position (pixel) q1. First gradient operation is performed, with the position q1 as an initial point. This produces motion vector v1.

Next, second gradient operation is performed by using, as an initial point, a position calculated by offsetting v0+v1 from pixel q0. This produces motion vector v2. Accordingly, motion vector V is found as the following expression:

$$V = v0 + v1 + v2 \quad (10)$$

As described above, by using an initial vector to execute gradient operation, a highly accurate motion vector can be calculated while reducing the required operation time.

Figure 12:
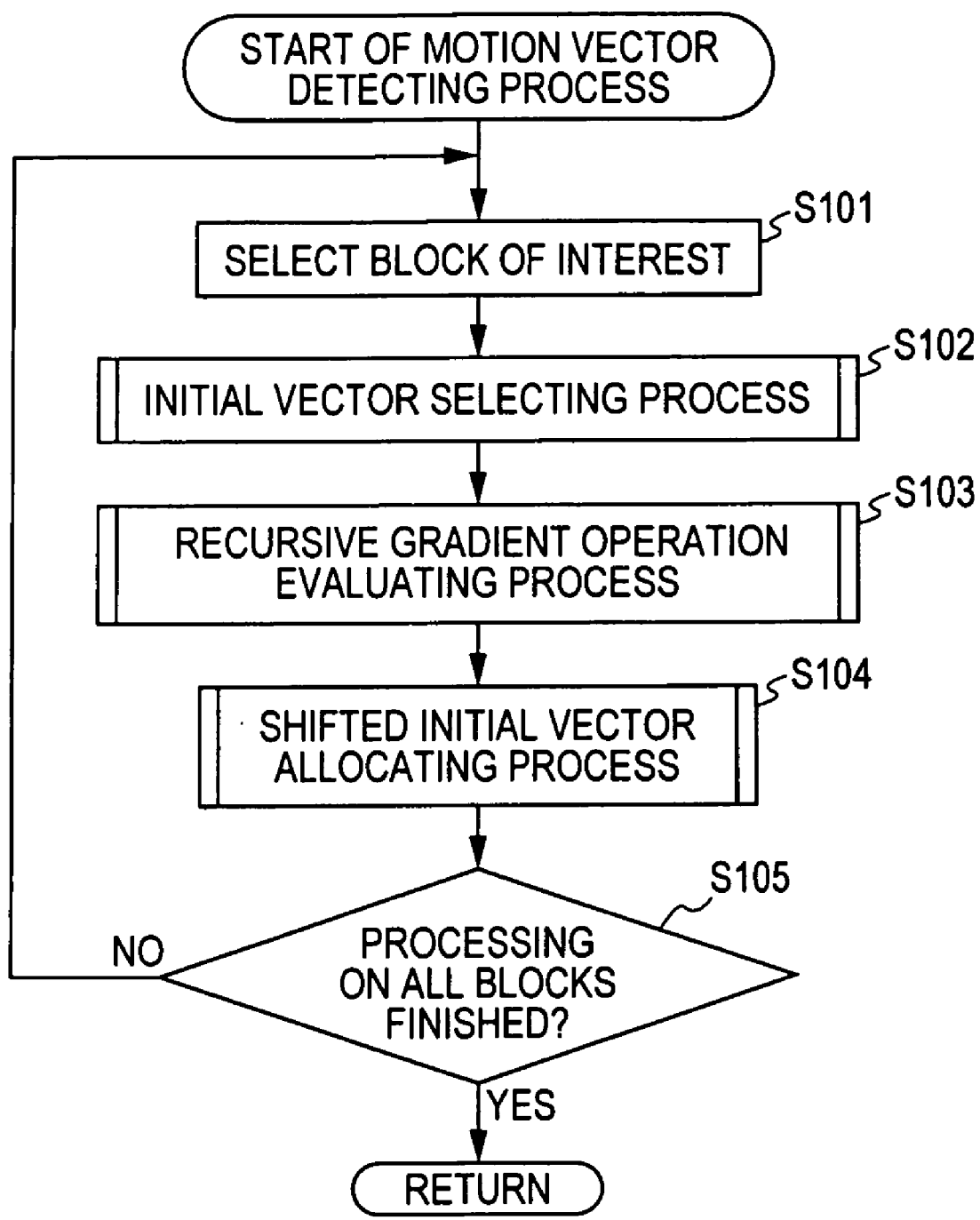
FIG. 12 is a flowchart illustrating a motion vector detecting process.

Next, details of the motion vector detecting process are described below with reference to the flowchart shown in FIG. 12.

The vector detecting unit 52 receives the input frame t at time t and the input frame t+1 at time t+1.

In step S101, the initial vector selecting unit 101 selects a block in frame t, which is subject to processing, as a block of interest, and the process proceeds to step S102. In the frame, processing is executed in raster scanning order from the top left block.

In step S102, the initial vector selecting unit 101 executes the initial vector selecting process. The initial vector selecting unit 101 selects a highly reliable motion vector from the results of detecting past motion vectors for each set of blocks in step S101, outputs the selected motion vector as initial vector V0, which serves an initial value for use in the gradient method, to the recursive gradient operation unit 103. The process proceeds to step S103.

In other words, in the initial vector selecting unit 101, the motion vectors of the peripheral blocks stored in the detected vector memory 53 after being found in a gradient operation evaluating process (step S103 described below) in the past, and the shifted initial vectors stored in the shifted initial vector memory 107 by a shifted initial vector allocating process (step S104 described below) in the past are selected as initial candidate vectors. The initial vector selecting unit 101 uses frame t and frame t+1 to find evaluated values DFD of the candidate vectors, selects from the candidate vectors a highly reliable vector based on the obtained evaluated values DFD, and outputs the selected vector as the initial vector V0. Details of the initial vector selecting process in step S102 are described below.

In step S103, the recursive gradient operation unit 103 and the vector evaluating unit 104 execute a recursive gradient operation evaluating process (hereinafter also referred to as a "recursive gradient operation process"), and proceeds to step S104. Specifically, in step S103, by using the initial vector V0 input from the initial vector selecting unit 101 and frame t and frame t+1 respectively input through the prefilters 102-1 and 102-2, the recursive gradient operation unit 103 recursively performs the gradient operation to calculate motion vector Vn based on the results of motion vector evaluation. In addition, the vector evaluating unit 104 finds evaluated values DFD of motion vector Vn−1 and motion vector Vn, selects the most reliable motion vector based on the obtained evaluated values DFD, and stores the selected motion vector as the motion vector V in the detected vector memory 53. At this time, the vector evaluating unit 104 supplies the shifted initial vector allocating unit 105 with the evaluated values DFD of the motion vector V together with the motion vector V. Details of the recursive gradient operation in step S103 are described later.

In step S104, the shifted initial vector allocating unit 105 executes the shifted initial vector allocating process, and proceeds to step S105. When the shifted initial vector allocating unit 105 is supplied with the motion vector V and the evaluated value DFD thereof from the vector evaluating unit 104, in step S104, in the shifted initial vector allocating unit 105, a motion vector that passes through a block of interest in the next frame is set as a shifted initial vector that is shifted to the block of interest. In other words, a motion vector having, as an initial point, a block of interest in the next frame which is identical in position to a block at a terminal point of motion vector V, and being identical in magnitude and orientation to motion vector V, is set as the shifted initial vector. The shifted initial vector allocating unit 105 allocates the set shifted initial vector to the shifted initial vector memory 107 in a form associated with the block of interest.

Specifically, the shifted initial vector allocating unit 105 performs storing, in the evaluated value memory 106, the evaluated value DFD of motion vector V allocated as the shifted initial vector in a form associated with the block of interest, comparing the stored evaluated value DFD with an evaluated value DFD of another motion vector V passing through the same block of interest (i.e., a block in a past frame which is identical in position to the block of interest), shifting the highly reliable motion vector V (based on the evaluated value DFD) to the block so as to be the shifted initial vector, and allocating the shifted initial vector to the shifted initial vector memory 107 in a form associated with the shifted block. Details of the configuration of the shifted initial vector allocating unit 105 are described later.

In step S105, the initial vector selecting unit 101 determines whether processing on all the blocks of frame t has finished. If it is determined that the processing on all the blocks of frame t has not finished, the process returns to step S101 and repeatedly performs the subsequent steps. If, in step S105, the initial vector selecting unit 101 has determined that the processing on all the blocks of frame t has finished, that is, if the initial vector selecting unit 101 has determined that, in each of all the blocks of frame t, motion vectors V have been detected, the motion vector detecting process ends.

As described above, an initial vector is selected from among motion vectors detected in the past, and the gradient operation is used based on the selected initial vector to repeatedly calculate a motion vector. From the calculated motion vectors, a highly reliable (i.e., most probable) motion vector based on an evaluated value DFD is detected. As a result, in the detected vector memory 53, motion vectors V for all the blocks of frame t are stored.

Next, details of the configuration of the shifted initial vector allocating unit 105 are described below.

Figure 13:
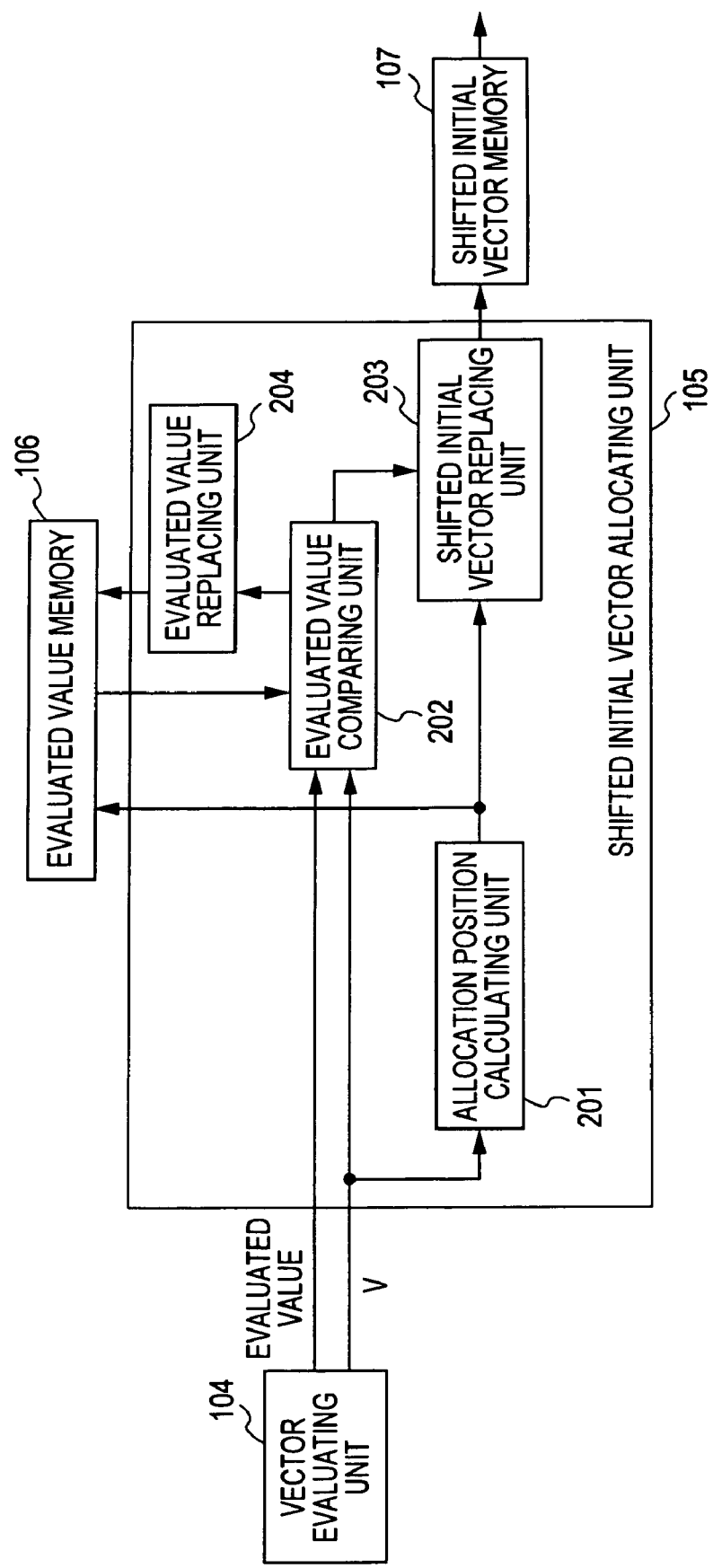
FIG. 13 is a block diagram showing the configuration of a shifted initial vector allocating unit.

FIG. 13 is a block diagram showing the configuration of the shifted initial vector allocating unit 105. The shifted initial vector allocating unit 105, whose configuration is shown in FIG. 13, performs setting a shifted initial vector, which serves as an initial candidate vector, based on the motion vector V detected by the vector evaluating unit 104, and allocating the set shifted initial vector to the shifted initial vector memory 107. The motion vector V detected by the vector evaluating unit 104 and the evaluated value DFD of the motion vector V are input to the shifted initial vector allocating unit 105.

The allocation position calculating unit 201 performs operation to find the position of a block through which the motion vector V detected by the vector evaluating unit 104 passes in a frame at the next time, that is, the position of a block in the next frame which is identical in position to a block at the terminal point of motion vector V detected in the current frame, and supplies the calculated position of the block to the evaluated value memory 106 and the shifted initial vector replacing unit 203.

When motion vector V and the evaluated value DFD of the motion vector V are input, the evaluated value comparing unit 202 reads, from the evaluated value memory 106, the evaluated value DFD at the position of the block from the allocation position calculating unit 201. The evaluated value comparing unit 202 compares the evaluated value DFD read from the evaluated value memory 106 and the evaluated value DFD of the motion vector V detected by the vector evaluating unit 104. When determining that the evaluated value DFD of the detected motion vector V is less, the evaluated value comparing unit 202 controls the shifted initial vector replacing unit 203 to rewrite the shifted initial vector, in the shifted initial vector memory 107, at the position of the block supplied by the shifted initial vector allocating unit 105 by motion vector V determined to be highly reliable, which is based on the evaluated value DFD. At the same time, the evaluated value comparing unit 202 controls the evaluated value replacing unit 204 to rewrite the evaluated value DFD of the position of the block selected by the allocation position calculating unit 201 by the evaluated value DFD of motion vector V.

The shifted initial vector replacing unit 203 rewrites the shifted initial vector, in the shifted initial vector memory 107, at the position of the block supplied by the allocation position calculating unit 201 by the motion vector V supplied from the evaluated value comparing unit 202, that is, a motion vector identical in magnitude and orientation to the motion vector V. Under the control of the evaluated value comparing unit 202, the evaluated value replacing unit 204 rewrites the evaluated value DFD of the position of the block selected by the allocation position calculating unit 201 by the evaluated value DFD of motion vector V.

The evaluated value memory 106 stores, in units of blocks, the evaluated values DFD in the next frame for initial candidate vectors allocated to the blocks. In the shifted initial vector memory 107, a motion vector whose evaluated value DFD is the smallest in each block in the next frame is stored as a shifted initial vector so as to be associated with the block.

Figure 14:
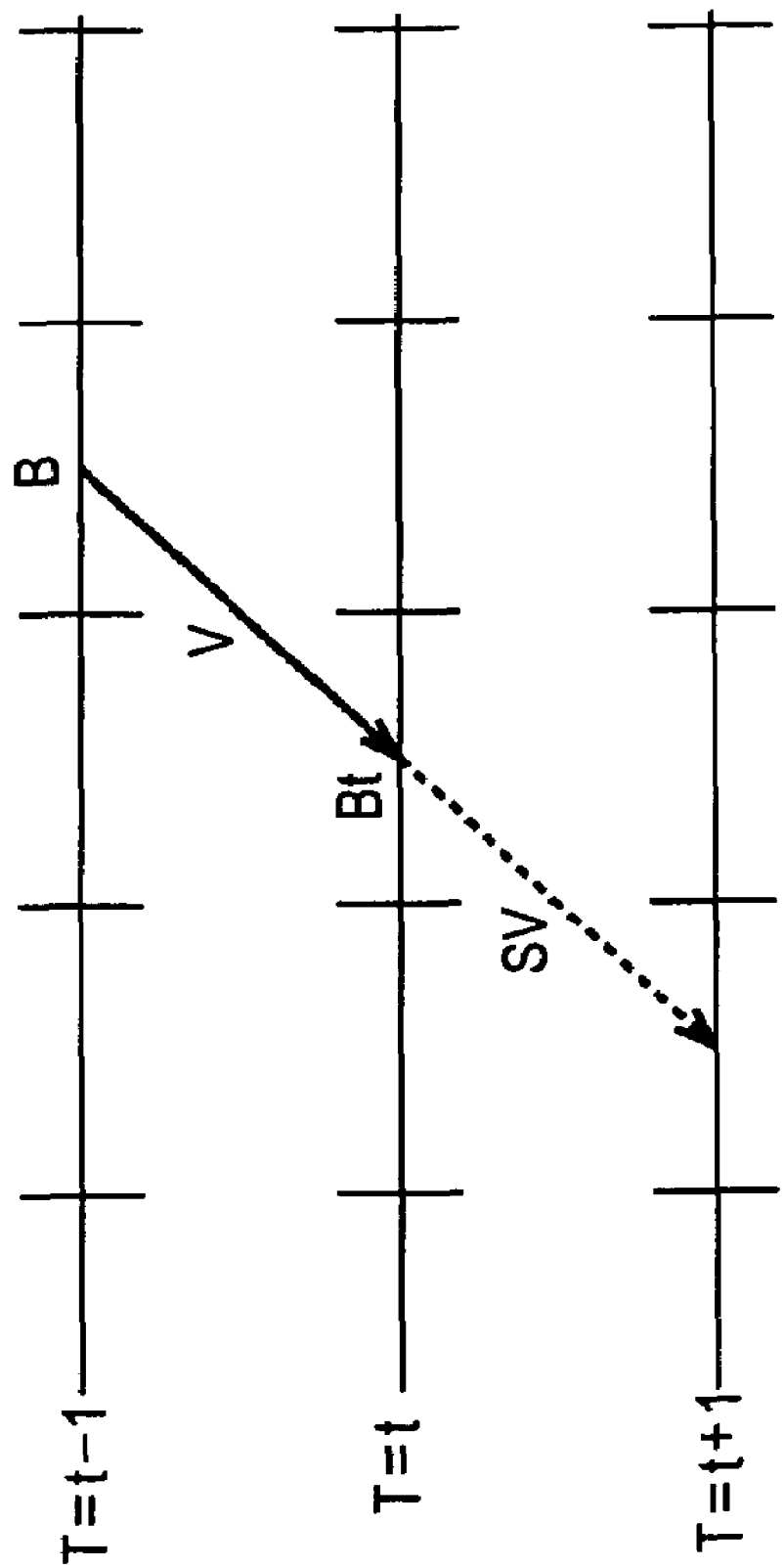
FIG. 14 is an illustration of the concept of a shifted initial vector.

FIG. 14 is a one-dimensional illustration of the shifted initial vector allocated by the shifted initial vector allocating unit 105. In the example shown in FIG. 14, frame t−1 at time T=t−1, frame t at time T=t, and frame t+1 at time T=t+1 are shown in order from the top. Partitions in the frames indicate block boundaries in the frames.

In the example in FIG. 14, a motion vector detected in block B in frame t−1 is represented by motion vector V (the solid line arrow in FIG. 14), and a motion-compensated block (hereinafter referred to as an "offset block") in frame t based on the motion vector V, whose initial point is block B, is represented by block Bt. In addition, a motion vector obtained by shifting the motion vector V in frame t−1 to block Bt is represented by shifted initial vector SV (the dotted line arrow in FIG. 14). In this case, the offset block represents block Bt, which is identical in position to a block at the terminal point of the motion vector V detected in frame t−1. The term "shift" means that the initial point of a motion vector identical in orientation to the motion vector V detected in frame t−1 is used as block Bt in frame t, which is identical in position to a block at the terminal point of the motion vector V in frame t−1. In other words, the shifted initial vector SV is a motion vector having, as an initial point, the block Bt in frame t which is identical in position to the block at the terminal point of the motion vector V detected in frame t−1.

In general, between sequential frames, the amount of movement of a moving object has a certain level of continuity and slightly changes. Thus, in the example in FIG. 14, when an object on block B moves at constant speed or speed close thereto, in many cases, also the motion vector in the block Bt serves as the motion vector V or a motion vector close thereto.

Therefore, in the case of detecting the motion vector of the block Bt of interest, by using this shifted initial vector SV as an initial candidate vector to be given for the gradient operation, a more appropriate initial vector can be obtained in motion vector detection by the gradient operation, compared with the case of using only the motion vector of a peripheral block as an initial candidate vector.

Figure 15:
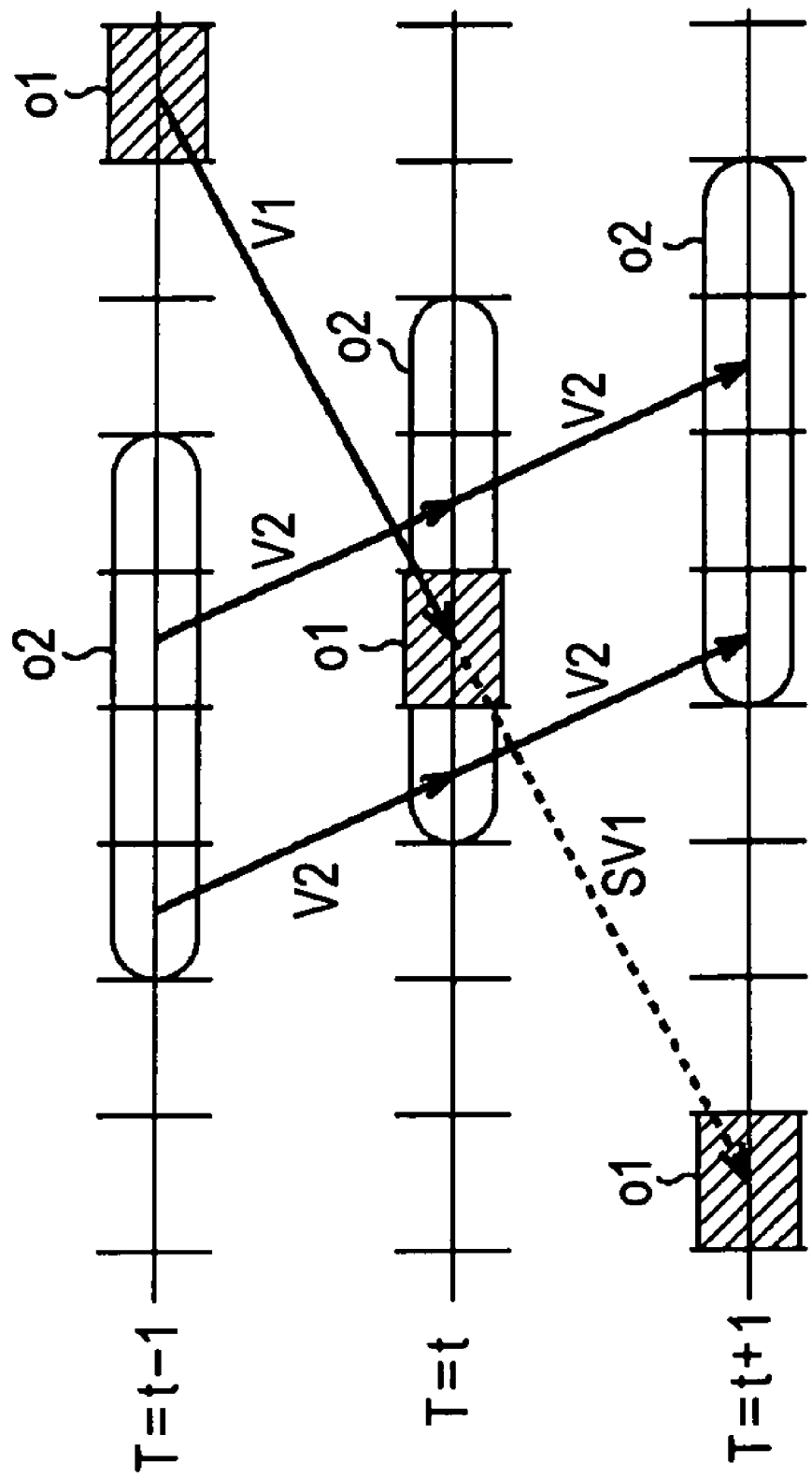
FIG. 15 is a specific illustration of a shifted initial vector.
Figure 16:
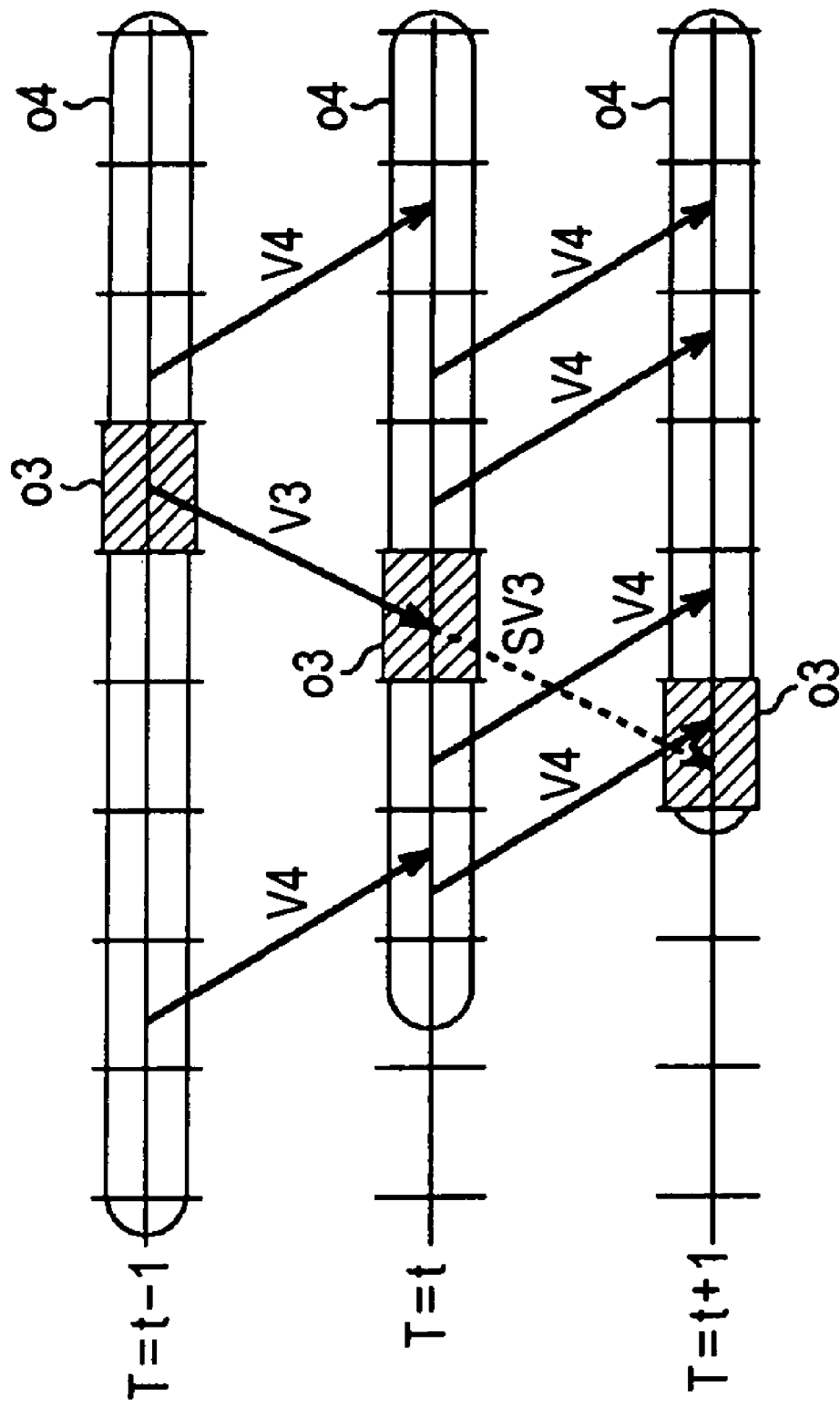
FIG. 16 is a specific illustration of a shifted initial vector.

The foregoing is specifically described below with reference to FIGS. 15 and 16. In FIGS. 15 and 16, in each frame, nine blocks are shown.

FIG. 15 shows examples of a block through which an object having large movement passes, and the motion vectors of peripheral blocks. In the case of FIG. 15, an image object of an object O1 formed by one block has motion vector V1 having a large movement, and moves from the rightmost end block (the ninth block from the left) in frame t−1 to the leftmost block in frame t+1 via the fifth block from the left in frame t. In addition, object O2 formed by four blocks has motion vector V2, which has a movement less than that of motion vector V1, moves from the third to sixth (four) blocks from the left in frame t−1 to the fifth to eighth (four) blocks from the left in frame t+1 via the fourth to seventh (four) blocks from the left in frame t+1. In other words, in the fifth block from the left in frame t, the image object of object O1 and the image object of object O2 cross each other, with the image object of object O1 positioned anteriorly.

At this time, in order to detect, in frame t, the motion vector of the fifth block from the left, in which the image object of object O1 passes as motion vector V1, if an initial vector is extracted from movement of a peripheral block, no appropriate motion vector exists since the image object of object O2 passes in the peripheral block (the fourth or sixth block) in the form of vector V2, which differs from that of the image object of object O1. Even in such a case, shifted initial vector SV1 (indicated by the dotted line arrow in FIG. 15) is a motion vector (i.e., a motion vector which is identical in magnitude and orientation to the motion vector V1, and whose initial point is a block (in frame t) identical in position to a block at the terminal point of the motion vector V1 detected in frame t−1) obtained by shifting the motion vector V1 detected in past frame T−1 to the fifth block from the left in frame t. Thus, it is ensured that the shifted initial vector SV1 can be acquired.

FIG. 16 shows examples of blocks on the boundaries of moving objects, and the motion vectors of peripheral blocks. In the case shown in FIG. 16, the image object of object O3 formed by one block has motion vector V3, and moves from the sixth block from the left at frame t−1 to the fourth block from the left in frame t+1 via the fifth block from the left in frame t. In addition, the image object of object O4 formed by at least nine blocks has motion vector V4, which differs from motion vector V1, moves from all the nine blocks in frame t−1 to the third to ninth (seven) blocks from the left in frame t+1 via the second to ninth (eight) blocks from the left in frame t. In other words, the image object of the object O3 passes in front of the image object of the object O4 in the sixth block from the left in frame t−1, the fifth block from the left in frame t, and the fourth block from the left in frame t+1.

At this time, if the initial vector is extracted from movement of the peripheral block in order to detect the motion vector of the fifth block from the left, in which the image object of the object O3 passes in the form of the motion vector V3, no appropriate motion vector exists since, in the peripheral block (fourth or sixth block from the left), the image object of an object O4 passes in the form of the motion vector V4, which differs from the image object of object O3. However, also in this case, similarly to the case in FIG. 15, the shifted initial vector SV3 (indicated by the dotted line arrow) is a vector obtained by shifting the motion vector V3 detected in past frame t−1 to the fifth block from the right in frame t, that is, the obtained vector is identical in magnitude and orientation to the motion vector V3, and having, as an initial point, a block in frame t which is identical in position to a block at the terminal point of the motion vector V3 detected in frame t−1. Thus, it is ensured that the shifted initial vector SV3 is acquired.

As described above, regarding the object having large movement, as shown in FIG. 15, and a boundary of the moving object, as shown in FIG. 16, in many cases, a peripheral block, which can serve as an initial candidate vector in a block of interest from which a motion vector is to be detected, has no optimal motion vector as the initial vector in the block of interest. Conversely, the shifted initial vector does not depend on the spatial distance between blocks since the shifted initial vector is a motion vector that is identical in magnitude and orientation to a motion vector whose initial point is a block in frame t which is identical in position to a block at the terminal point of the motion vector detected in past frame t−1. Thus, even if, in the peripheral block, no appropriate motion vector exist as the initial vector in the block of interest, it is ensured that the shifted initial vector is obtained, and the shifted initial vector can be used as an optical initial candidate vector.

Referring back to FIG. 14, a method for determining the shifted initial vector is described below.

In the case shown in FIG. 14, in the case of searching for a motion vector that passes in the block Bt of interest while using, as a reference, the block Bt of interest in frame t, which is subject to the motion vector detecting process, the motion vectors of all the blocks in frame t−1 must be searched for. This requires a large amount of processing. Therefore, in this case, when motion vector detection is performed, the huge number of operations required for the large amount of processing must be performed. Thus, it is difficult to implement (in the form of hardware) the large amount of processing.

Accordingly, when performing motion vector detection in frame t−1, the shifted initial vector allocating unit 105 finds the position of a block (i.e., a block in frame t which is identical in position to a block at the terminal point of motion vector V) in which the motion vector V detected in block Bt of interest passes in frame t at the next time, and allocates motion vector V beforehand as shifted initial vector SV for block Bt. This reduces the number of operations for searching for the shifted initial vector that is required for motion vector detection in frame t, and establishes the hardware required therefor. Therefore, actually the shifted initial vector can be used as an initial candidate vector.

The method for determining the shifted initial vector by the shifted initial vector allocating unit 105 is specifically described below with reference to FIG. 17.

Figure 17:
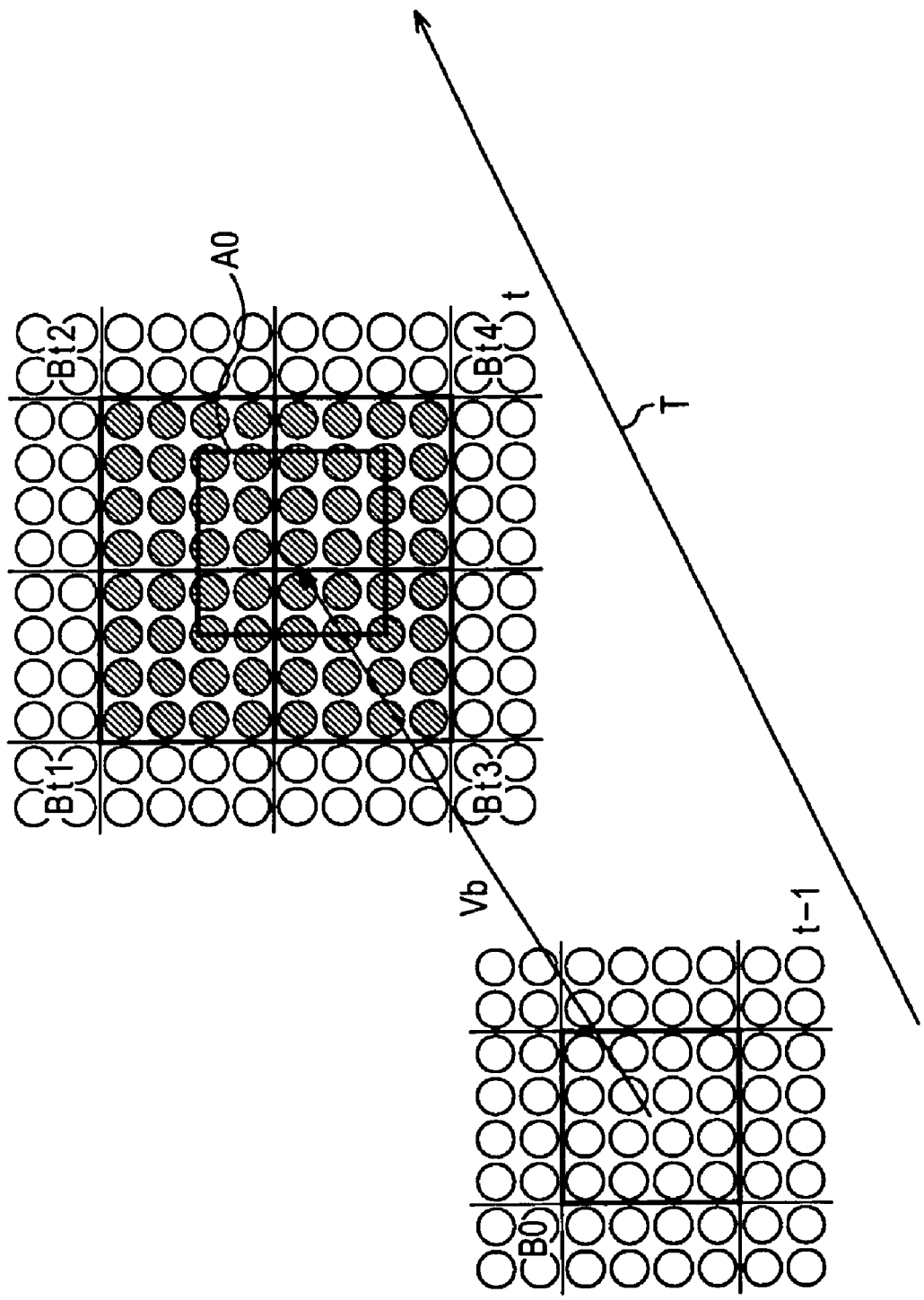
FIG. 17 is an illustration of a method for determining a shifted initial vector.

In the example shown in FIG. 17, the arrow T indicates lapse of time from the anterior left frame t−1 at time t−1 to the background right frame t at time t. The circles in the frames indicate pixels.

In frame t−1, block B0 consists of four by four pixels. When a motion vector detected in block B0 is represented by Vb, an offset block (block in frame t which is identical in position to a block at the terminal point of motion vector Vb of block B0) A0 that is obtained by offsetting (performing motion compensation on) block B0 so as to be in frame t, in general, overlaps with four blocks Bt1 to Bt4 in frame t, each consisting of four by four pixels. Accordingly, in the case in FIG. 17, all the four blocks in blocks Bt1 to Bt4 that overlaps with the offset block A0 serve as blocks to which the motion vector Vb is to be allocated.

As described above, the motion vector detected in the previous frame is allocated as a shifted initial vector. In this case, the position of block to be allocated depends on the magnitude and orientation of the motion vector. Accordingly, as shown in FIG. 18, depending on the distribution of motion vectors detected in frame t−1, in frame t, plural shifted initial vectors are subject to allocation, so that conflicting blocks and, conversely, blocks to which no shifted initial vectors are allocated are generated.

Figure 18:
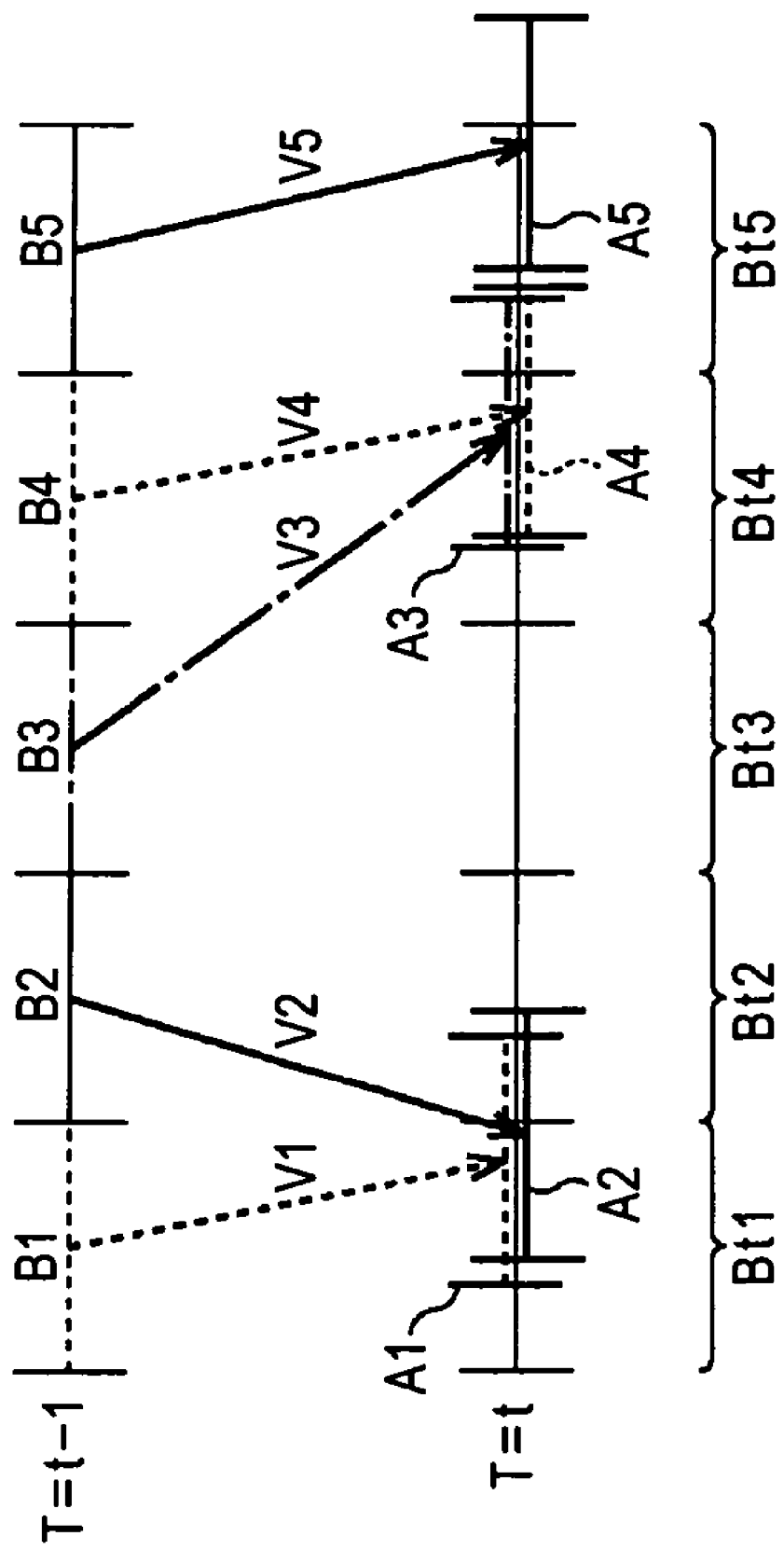
FIG. 18 is an illustration of an example of shifted initial vector allocation.

FIG. 18 shows an example of shifted initial vector allocation. In the example shown in FIG. 18, each partition between frames indicates a block boundary. In frame t−1, blocks B1 to B5 are shown from the left in FIG. 18, and, in frame t, blocks Bt1 to Bt5 are shown from the left in FIG. 18.

In block B1, motion vector V1 is detected, and offset block A1 for block B1 overlaps with blocks Bt1 and Bt2 in frame t. In block B2, motion vector V2 is detected, offset block A2 for block B2 overlaps with blocks Bt1 and Bt2 in frame t. In block B3, motion vector V3 is detected, and offset block A3 for block B3 overlaps with blocks Bt4 and Bt5 in frame t. In block B4, motion vector V4 is detected, and offset block A4 for block B4 overlaps with blocks Bt4 and Bt5. In block B5, motion vector V5 is detected, and offset block A5 for block B5 overlaps with block Bt5 and an adjacent block (not shown) in frame t.

In other words, in the case in FIG. 18, one of the motion vectors V1 and V2 is allocated as a shifted initial vector to blocks Bt1 and Bt2. One of the motion vectors V3 and V4 is allocated as a shifted initial vector to block Bt4 in frame t. One of the motion vectors V3, V4, and V5 is allocated as a shifted initial vector to block Bt5 in frame t. However, in block Bt3 in frame t, a motion vector to be used as a candidate shifted initial vector does not exist. Accordingly, no shifted initial vector is allocated.

Therefore, the shifted initial vector allocating unit 105 allocates a zero vector as a shifted initial vector to a block to which no shifted initial vector is allocated, such as block Bt3. In addition, the shifted initial vector allocating unit 105 selects a highly reliable motion vector based on the above-described evaluated value evaluated value DFD of a block in which plural motion vectors conflict mutually, such as blocks Bt1, Bt2, Bt4, and Bt5, and allocates the selected motion vector as a shifted initial vector to each block.

In the case in FIG. 18, for brevity of description, the offset blocks A are shown in a form slightly shifted from frame t.

Figure 19:
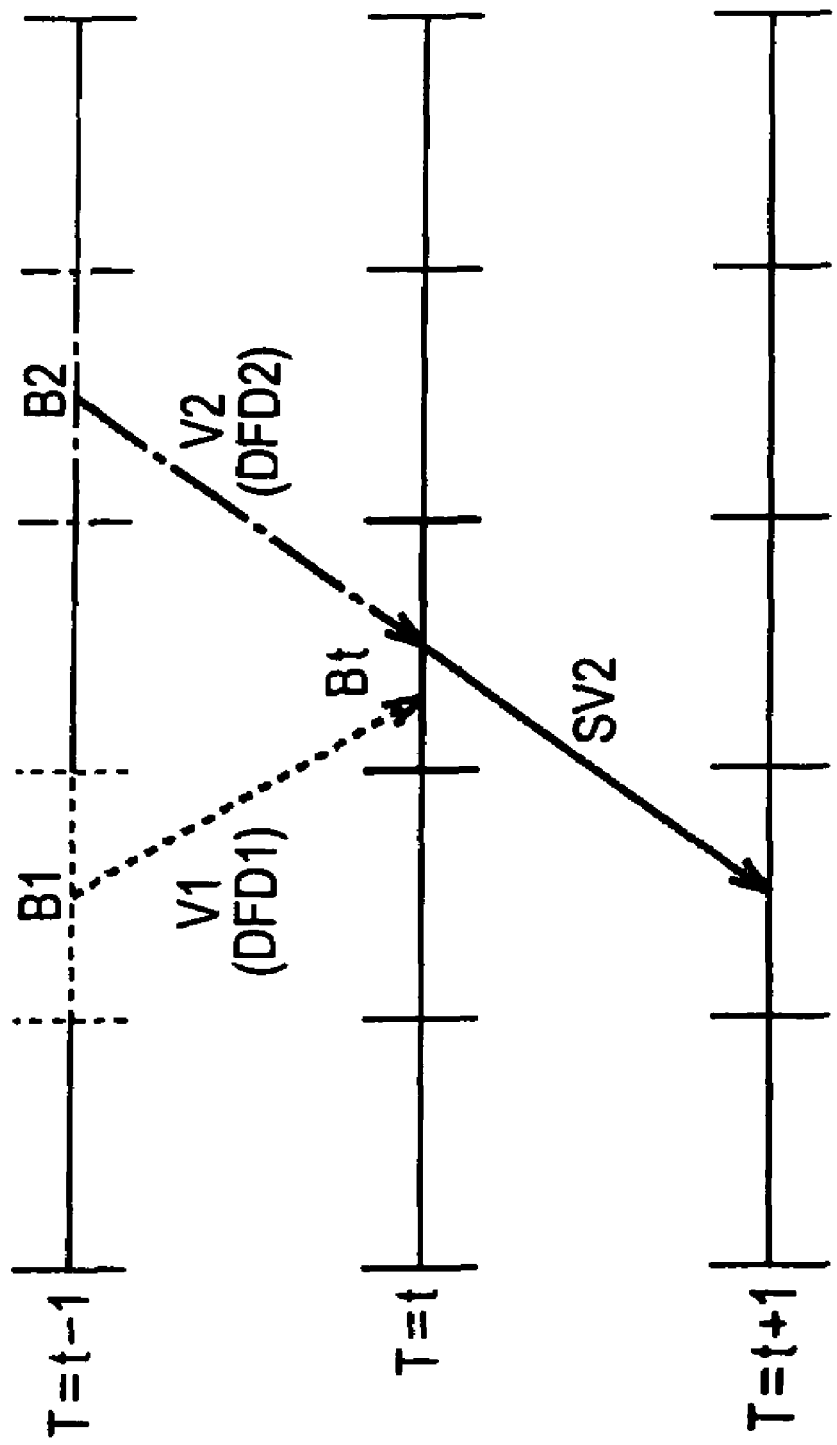
FIG. 19 is an illustration of an example of conflicting motion vectors.

FIG. 19 is an illustration of examples of conflicting motion vectors. In the case shown in FIG. 19, from blocks B1 and B2 in frame t−1, motion vectors V1 and V2 detected therein pass in block Bt in frame t. In other words, block Bt is a block in frame t that is identical in position to the terminal point of the motion vector V1 in frame t−1, and is a block in frame t that is identical in position to the terminal point of the vector V2 in frame t−1. As described above, when plural motion vectors conflict mutually for the same block, an evaluated value DFD1 for the motion vector V1 and an evaluated value DFD2 for the vector V2 are compared, and one motion vector whose evaluated value DFD is less, that is, a higher reliable motion vector, is selected as shifted initial vector SV2 for block Bt. This makes it possible to obtain a highly reliable shifted initial vector based on evaluated value DFD.

Figure 20:
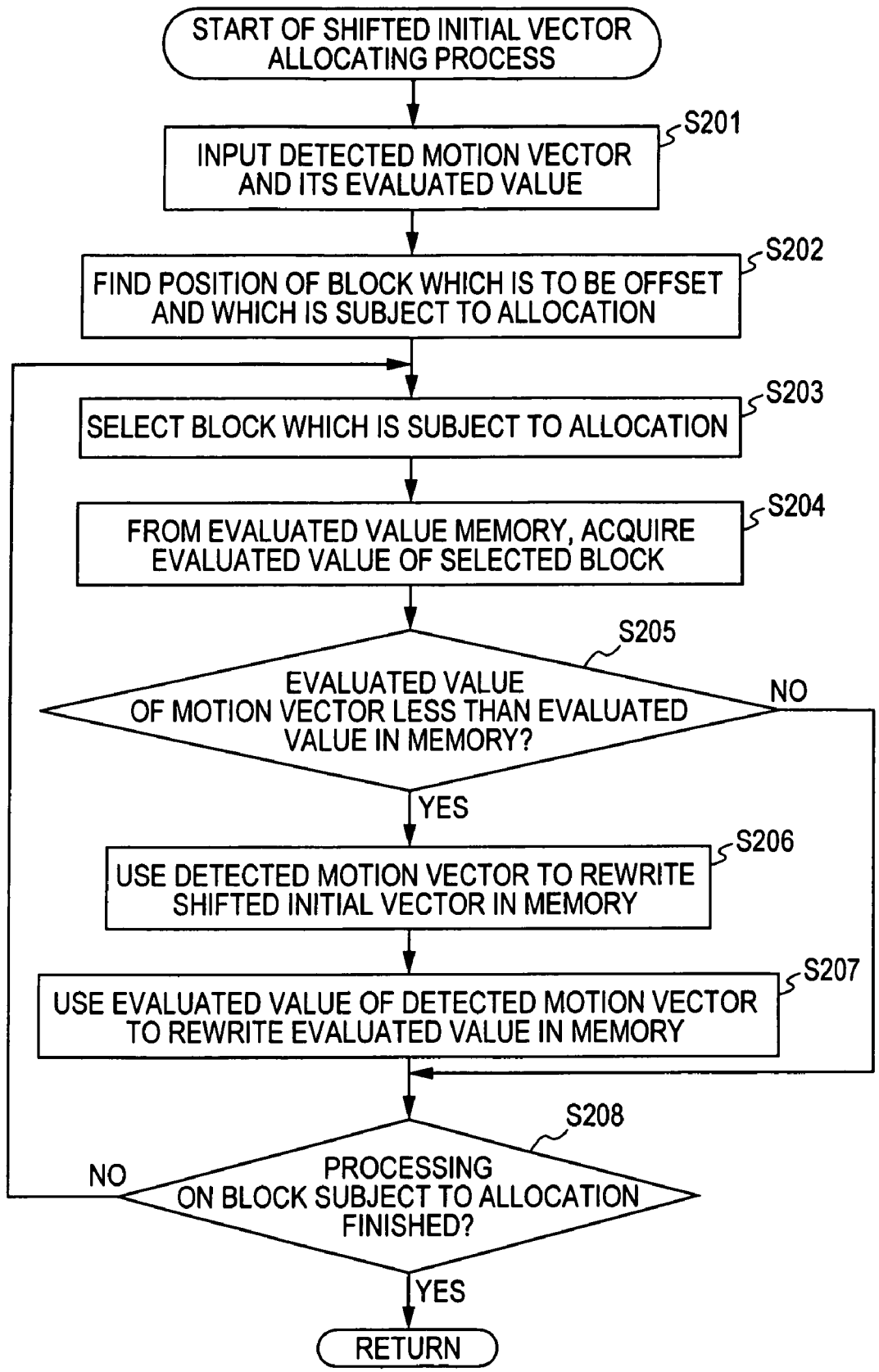
FIG. 20 is a flowchart illustrating a shifted initial vector allocating process.

Next, details of a shifted initial vector allocating process are described below with reference to the flowchart shown in FIG. 20.

When, in the previous stage, the vector evaluating unit 104 detects the motion vector V of the block of interest in frame t−1, the vector evaluating unit 104 supplies the shifted initial vector allocating unit 105 with the evaluated value DFD obtained for the detected motion vector V as well as the motion vector V.

In step S201, the motion vector V and the evaluated value DFD therefor are input from the vector evaluating unit 104 to the evaluated value comparing unit 202. In addition, at this time, the motion vector V is input to the allocation position calculating unit 201, and the process proceeds to step S202. In step S202, the evaluated value comparing unit 202 finds the position of a block in frame t which is to be offset (motion-compensated) and which is subject to allocation. In other words, the allocation position calculating unit 201 finds the position of each block in frame t which is identical in position to a block at the terminal point of the motion vector V detected in frame t−1. The process proceeds to step S203. In step S203, the allocation position calculating unit 201 selects one allocation block (which is subject to allocation) from among the obtained allocation blocks. The allocation position calculating unit 201 supplies the selected allocation block to the evaluated value memory 106 and the shifted initial vector replacing unit 203. The process proceeds to step S204. In step S203, the allocation blocks are sequentially selected from the top left block in frame t.

In step S204, the evaluated value comparing unit 202 acquires an evaluated value DFD of the selected allocation block from the evaluated value memory 106. The process proceeds to step S205. In step S205, it is determined whether or not the evaluated value DFD of the motion vector V input in step S201 is less than the evaluated value DFD in the evaluated value memory 106, that is, whether or not the evaluated value DFD of the motion vector V is higher in reliability than the evaluated value DFD in the evaluated value memory 106. If it is determined that the evaluated value DFD of the motion vector V is less than the evaluated value DFD in the evaluated value memory 106, the process proceeds to step S206.

In step S206, the evaluated value comparing unit 202 controls the shifted initial vector replacing unit 203 to rewrite the shifted initial vector of the allocation block (in the shifted initial vector memory 107) selected by the allocation position calculating unit 201 by the motion vector V, that is, a motion vector identical in magnitude and orientation to the motion vector V. Proceeding to step S207, the evaluated value comparing unit 202 controls the evaluated value replacing unit 204 to rewrite the evaluated value DFD of the allocation block selected by the allocation position calculating unit 201 by the evaluated value DFD of the motion vector V. The process proceeds to step S208.

If, in step S205, it is determined that the evaluated value DFD of the motion vector V input in step S201 is not less than the evaluated value DFD stored in the evaluated value memory 106, steps S206 and S207 are skipped over, and the process proceeds to step S208. In other words, in this case, it is determined that the evaluated value DFD in the evaluated value memory 106 is higher reliable than the evaluated value DFD of the motion vector V, the values in the evaluated value memory 106 and the shifted initial vector memory 107 are not rewritten.

In step S208, the allocation position calculating unit 201 determines whether or not processing on all allocation blocks to which the motion vector V is to be allocated has finished. If, in step S208, it is determined that the processing on all the allocation blocks has not finished, the process proceeds to step S203 and repeatedly performs the subsequent steps. If, in step S208, the allocation position calculating unit 201 has determined that the processing on all the allocation blocks has finished, the shifted initial vector allocating process ends.

In the first processing, a shifted initial vector for the selected allocation block has not been stored in the shifted initial vector memory 107 yet. Accordingly, when an evaluated value DFD of the shifted initial vector has not been stored in a corresponding allocation block in the evaluated value memory 106, in step S201, no evaluated value DFD is acquired from the selected allocation block. Thus, the result of the determination in step S205 is affirmative, thus executing steps S206 and S207.

As described above, in the case of detecting the motion vector of a block of interest, based on the fact that the amount of movement of a moving object has a certain level of continuity between sequential frames and the amount of movement slightly changes, by using, as an initial candidate vector, the shifted initial vector, which is a motion vector passing from a previous time (past) frame through a block of interest in a frame at the next time, that is, a motion vector which is identical in magnitude and orientation to motion vector V and whose initial point is a block in the next frame which is identical in position to a block at the terminal point of motion vector V detected in the past frame, a more appropriate motion vector can be given as an initial value for the gradient operation, compared with a case in which, as in the related art, only a motion vector previously obtained in a peripheral block is used as an initial candidate vector, in particular, in a boundary of a moving object. This enables an increase in accuracy of motion vector detection by the gradient operation.

In the case of fining the shifted initial vector, a block detected in a frame at the previous time, which passes in a frame at the next time, that is, a block in frame t which is identical in position to a block at the terminal point of the motion vector V detected in frame t−1, is found, and a motion vector in the obtained block is allocated as a shifted initial vector in a block of interest in the frame at the next time. Thus, the number of operations required for processing is reduced compared with the case of searching for a motion vector that passes through a block of interest from all motion vectors in all blocks in a frame at a previous time. Accordingly, the establishment of hardware, whose realization has been difficult due to a huge number of operations, is realized.

Thereby, with the above-noted operation in the present invention a real-time processing can be realized as all the processing for calculating evaluated values, which are needed at frame t for determining a shifted initial vector, takes place between the past frame t−1 and the current frame t. That is, the evaluated values needed for determining a shifted initial vector at frame t are obtained before processing for frame t is started. More particularly, as shown in FIG. 19 and FIG. 20, even if confliction of plural candidates occurs, only a selecting operation is required, based on the already-calculated evaluated values, from motion vectors detected from the past frame t−1 to the current frame t, to thereby obtain a shifted initial vector SV. As only a selecting operation based on the already-calculated evaluated values between the time t−1 for the past frame and a time t for the current frame is needed, a real-time processing can be realized.

Next, details of the configuration of the evaluated value comparing unit 202 are described below.

Figure 21:
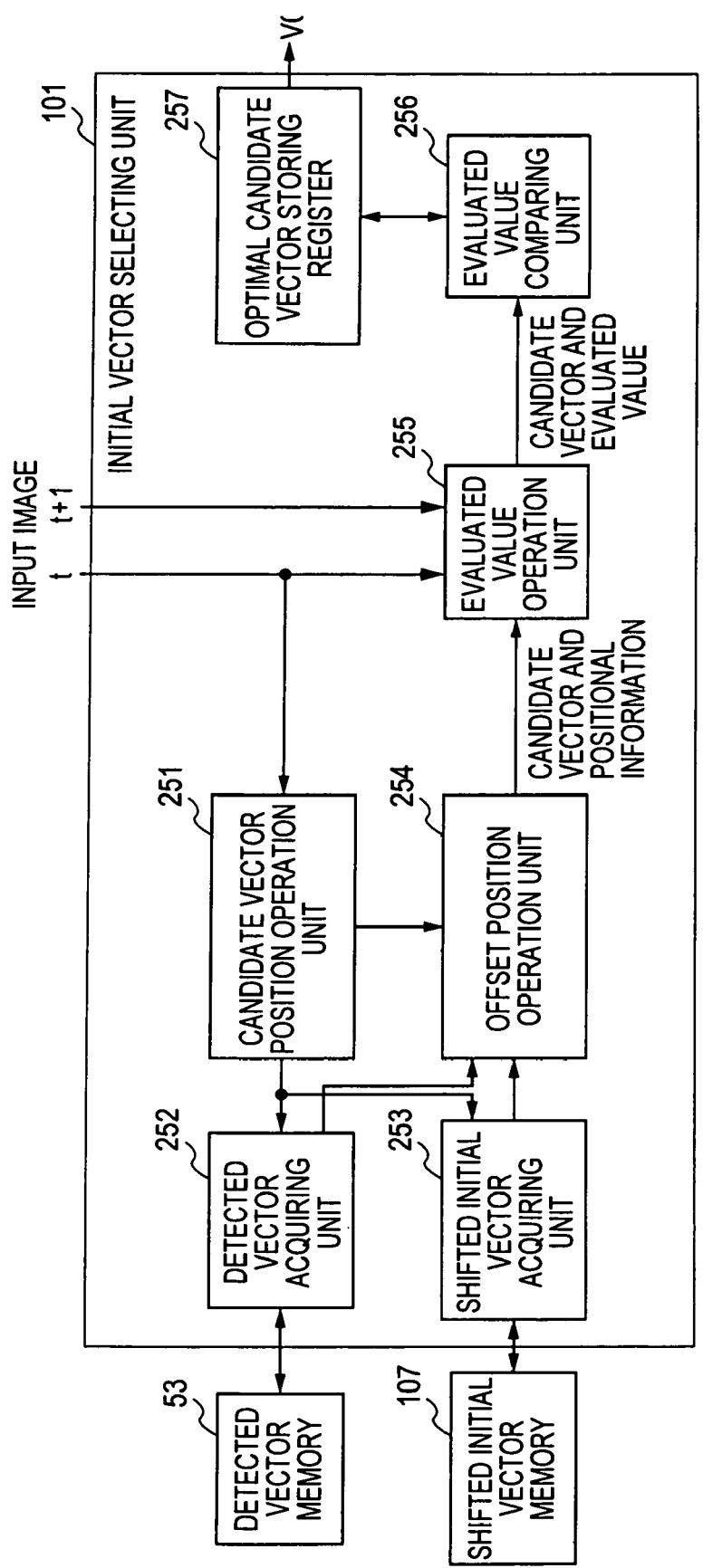
FIG. 21 is a block diagram showing the configuration of a shifted initial vector selecting unit.

FIG. 21 is a block diagram showing the configuration of the initial vector selecting unit 101. In the initial vector selecting unit 101, whose configuration is shown in FIG. 21, from among candidate vectors (hereinafter also referred to as "initial candidate vectors") such as the motion vector detected in the previous (past) frame and the shifted initial vector, a highly reliable motion vector is selected as an initial vector. Frame t at time t and frame t+1 at time t+1 are input to the initial vector selecting unit 101.

When receiving the input frame t, the candidate vector position operation unit 251 selects a block of interest which is to be processed in frame t, finds, from a peripheral region of the block of interest, the position of a candidate block/candidate blocks from which initial candidate vectors for the block of interest are to be acquired, the types and priority levels of motion vectors to be used as the initial candidate vectors, and supplies a detected vector acquiring unit 252 and a shifted initial vector acquiring unit 253 with positional information of the candidate block and type information of the initial candidate vectors in the order of the obtained priority levels. In addition, the candidate vector position operation unit 251 supplies the positional information the candidate block/blocks also to an offset position operation unit 254.

In the signal processing apparatus 1, the number of initial candidate vectors is set to a predetermined number based on balance between initial vector accuracy and hardware performance. In addition, the position of the candidate block, and the types and priority levels of initial candidate vectors are set beforehand as described with reference to FIG. 23. The types of initial candidate vectors include shifted initial vector SV that is a motion vector obtained by shifting a motion vector that passes through a predetermined block to the predetermined block, that is, a motion vector which is identical in magnitude and orientation to the motion vector V and whose initial point is a block in the next frame which is identical in position to a block at the terminal point of a motion vector detected in the past frame, a motion vector (hereinafter referred to as a "past vector PV") detected in the past frame, a motion vector (hereinafter also referred to as the "current vector CV") detected in a block anterior to a block of interest in the current frame, a zero vector.

Therefore, when the type information of initial candidate vectors set beforehand represents the past vector or the present vector, the candidate vector position operation unit 251 supplies the positional information of the candidate block and the type information of initial candidate vectors to the detected vector acquiring unit 252. When the type information of initial candidate vectors set beforehand represents the shifted initial vector, the candidate vector position operation unit 251 supplies the positional information of the candidate block and the type information of initial candidate vectors to the shifted initial vector acquiring unit 253. In another case, for example, when the type information of initial candidate vectors set beforehand represents a zero vector, the candidate vector position operation unit 251 sets a zero vector and supplies the zero vector to the offset position operation unit 254 together with the positional information of the candidate block.

The detected vector acquiring unit 252 acquires, from the detected vector memory 53, motion vectors in accordance with the positional information of the candidate block and the type information of initial candidate vectors which are supplied from the candidate vector position operation unit 251. The detected vector acquiring unit 252 outputs the acquired motion vectors as initial candidate vectors to the offset position operation unit 254.

In accordance with the positional information of the candidate block and the type information of initial candidate vectors which are supplied from the candidate vector position operation unit 251, the shifted initial vector acquiring unit 253 acquires a shifted initial vector corresponding to the positional information of the candidate block from the shifted initial vector memory 107, and outputs the acquired shifted initial vector as an initial candidate vector to the offset position operation unit 254. In addition, when no shifted initial vector is allocated at the block position designated by the candidate vector position operation unit 251, the shifted initial vector acquiring unit 253 outputs a zero vector to the offset position operation unit 254. When no shifted initial vector is allocated, the zero vector may be stored in the shifted initial vector memory 107 beforehand.

When the initial candidate vector (or the zero vector from the candidate vector position operation unit 251) is input from the detected vector acquiring unit 252 or the shifted initial vector acquiring unit 253, the offset position operation unit 254 performs arithmetic operation, based on the positional information of the candidate block supplied from the candidate vector position operation unit 251, to find the block position of an offset block obtained such that, for each initial candidate vector, the block of interest in frame t is offset (motion-compensated) so as to be in frame t+1. The offset position operation unit 254 outputs the positional information of the candidate block and information of the offset block position to an evaluated value operation unit 255 together with the initial candidate vector.

When receiving the positional information of the candidate block and information of the offset block position as well as the initial candidate vector, the evaluated value operation unit 255 finds an evaluated value DFD of the initial candidate vector by using frame t and frame t+1. The evaluated value operation unit 255 outputs the obtained evaluated value DFD to the evaluated value comparing unit 256 together with the initial candidate vector.

The evaluated value comparing unit 256 compares the evaluated value DFD input by the evaluated value operation unit 255 and an evaluated value DFD of an optimal candidate vector stored in an optimal candidate vector storing register 257. When the evaluated value comparing unit 256 determines that the evaluated value DFD of the initial candidate vector is less than the evaluated value DFD of the optimal candidate vector, that is, the initial candidate vector is higher reliable than the optimal candidate vector, the evaluated value comparing unit 256 replaces the optimal candidate vector and its evaluated value DFD by the initial candidate vector and its evaluated value DFD, which are determined to be higher reliable. Finally, the evaluated value comparing unit 256 controls the optimal candidate vector storing register 257 to output the optimal candidate vector, which has been determined to be most reliable from among all the candidate vectors, as the initial vector V0, to the recursive gradient operation unit 103.

The optimal candidate vector storing register 257 stores the initial candidate vector, which has been determined by the evaluated value comparing unit 256 to have a small evaluated value DFD (highly reliable), as the optimal candidate vector, together with its evaluated value DFD. Under the control of the evaluated value comparing unit 256, the optimal candidate vector storing register 257 outputs the finally stored optimal candidate vector as the initial vector V0 to the recursive gradient operation unit 103.

Figure 22:
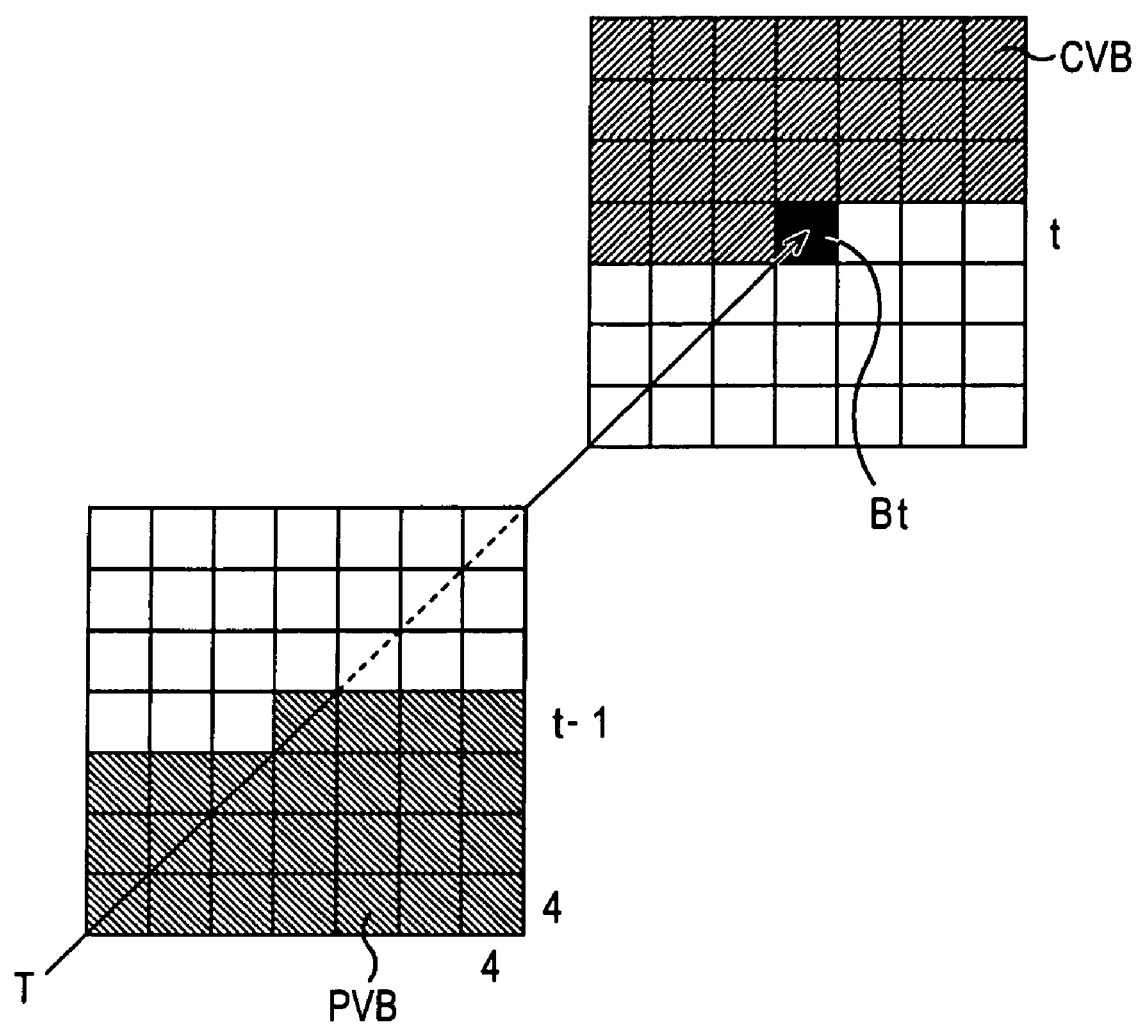
FIG. 22 is an illustration of a peripheral region around an initial vector.

FIG. 22 shows a peripheral region that can be used as a candidate block for an initial vector. In the example shown in FIG. 22, the arrow T indicates a direction of lapse of time from past (previous) frame t−1 at time t−1, which is positioned on the left side of the foreground in FIG. 22, to the current frame t at time t, which is positioned on the right side of the background. In the example shown in FIG. 22, the peripheral region that can be used for the initial candidate vector is formed by seven by seven blocks around block Bt of interest, and each block consists of four by pixels.

The motion vector detecting process is executed in raster scanning order from the top left block of the frame. Accordingly, in motion vector detection on the block Bt of interest in the current frame t, in the initial vector selecting unit 101, the results of detecting motion vectors up to the last block can be used as initial candidate vectors.

In other words, the peripheral region around the block Bt of interest consists of block CVB that is processed before the block Bt of interest is processed, and block PVB that is processed after block Bt of interest is processed. Therefore, when an initial vector for block Bt of interest is found, an initial candidate vector can be selected from among a motion vector (the current vector CV) detected in the current frame t in block CVB, and a motion vector (past vector) detected in the past frame t−1 in block PVB. In this case, also a shifted initial vector that is allocated to a block in the same peripheral region can be used as an initial candidate vector.

Figure 23:
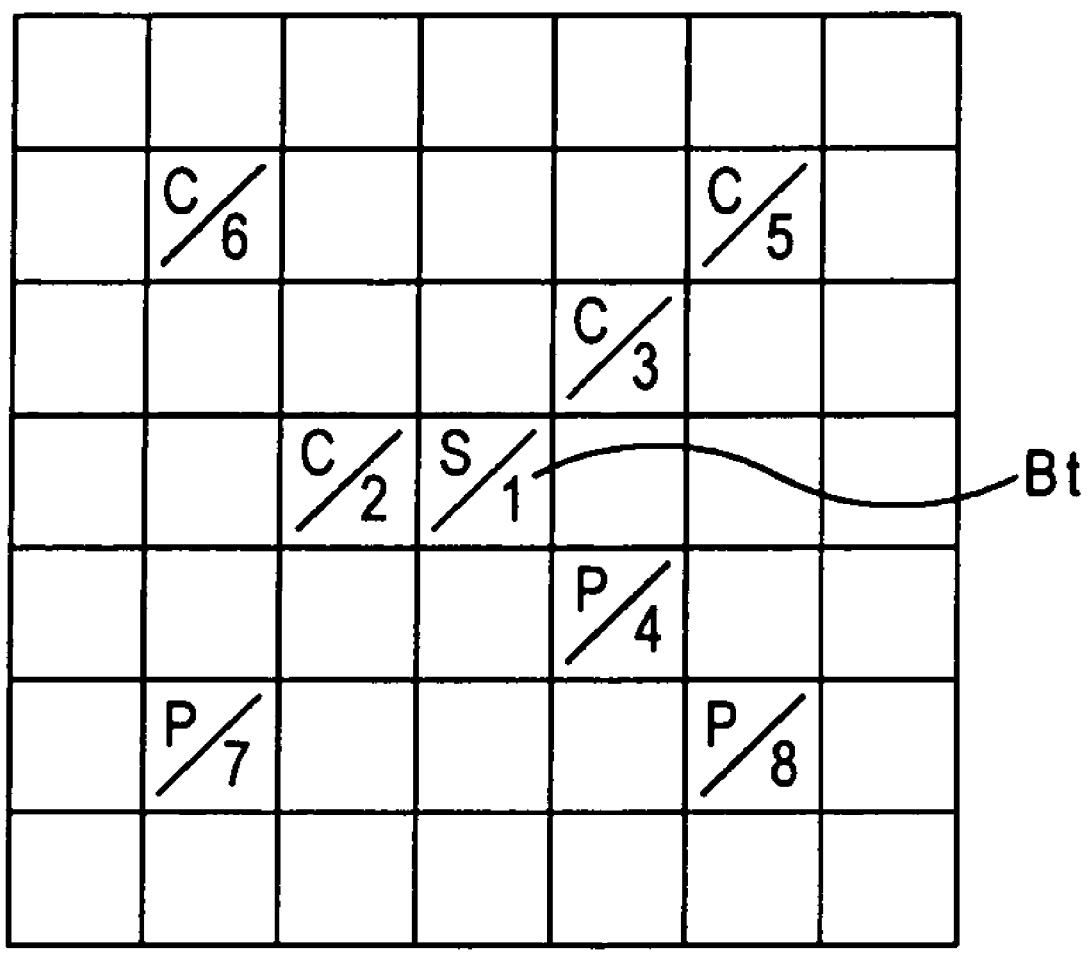
FIG. 23 is an illustration of a candidate block for an initial vector.

FIG. 23 shows examples of candidate blocks for the initial vector set in the candidate vector position operation unit 251. In the example shown in FIG. 23, in the peripheral region around the block Bt of interest, eight predetermined blocks bearing alphanumeric symbols are set as candidate blocks from which initial candidate vectors are acquired. In each of the eight predetermined blocks, the symbols with the slash mark therebetween represent a "initial candidate vector type" and "priority", respectively. Among initial candidate vector types, the letter P represents a past vector PV detected in the past frame t−1, the letter C represents the present vector detected in the current frame t, and the letter S represents shifted initial vector SV.

The representation "S/1" of the block Bt of interest indicates that the shifted initial vector SV allocated to the block Bt of interest is used as an initial candidate vector with "first" priority. The representation "C/2" of a block left adjacent to the block Bt of interest indicates that the current vector CV of the block detected in the current frame t is used as an initial candidate vector with "second" priority. The representation "C/3" of an upper right block from the block Bt of interest indicates that the current vector CV of the block detected in the current frame t is used as an initial candidate vector with "third" priority. The representation "P/4" of a lower right block from the block Bt of interest indicates that the past vector PV of the block detected in the past frame t−1 is used as an initial candidate vector with "fourth" priority.

The representation "C/6" of a lower right block from the top left corner of the peripheral region of seven by seven pixels indicates that the current vector CV of the block detected in the current frame t is used as an initial candidate vector with sixth priority. The representation "C/5" of a lower left block from the top right corner of the peripheral region of seven by seven pixels indicates that the current vector CV of the block detected in the current frame t is used as an initial candidate vector with fifth priority. The representation "P/7" of an upper right block from the bottom left corner of the peripheral region of seven by seven pixels indicates that the past vector PV of the block detected in the past frame t−1 is used an initial candidate vector with seventh priority. The representation "P/8" of an upper left block from the bottom right corner of the peripheral region of seven by seven pixels indicates that the past vector PV of the block detected in the past frame t−1 is used as an initial candidate vector with eighth priority.

As described above, in the example shown in FIG. 23, among the block Bt of interest and blocks adjacent thereto, the vectors of the block Bt of interest, and left adjacent, upper right, and lower right blocks from the block Bt of interest are used as initial candidate vectors. Among blocks that are not adjacent to the block Bt of interest, the vectors of blocks at positions internally shifted by one block from the corners of the peripheral region of seven by seven pixels are selected.

In other words, in the example shown in FIG. 23, priority is set so that a block adjacent to (spatially and temporally close to) the block Bt of interest has higher priority than that of a block at some distance and that the current vector detected in current frame t has higher priority than that of the past vector detected in past frame t−1. The positions, types, and priority of the above initial candidate vectors are set based on spatial correlation, temporal correlation, etc., including not only blocks in the vicinity of the block Bt of interest but also blocks at some distance, in order that probable initial candidate vectors may be obtained from the least number of candidate vectors. Accordingly, in such a manner, by using the motion vectors of predetermined blocks set beforehand as initial candidate vectors, a huge number of arithmetic operations due to an increase in the number of initial candidate vectors can be reduced.

The types and positions of candidate blocks are not limited to the example in FIG. 23. Other types of blocks and other positions of blocks may be used. In addition, when considering a case in which no optimal vector exists, a zero vector that suppresses deterioration in such a case may be used. Also the number of candidate blocks may be either more or less than eight.

Figure 24:
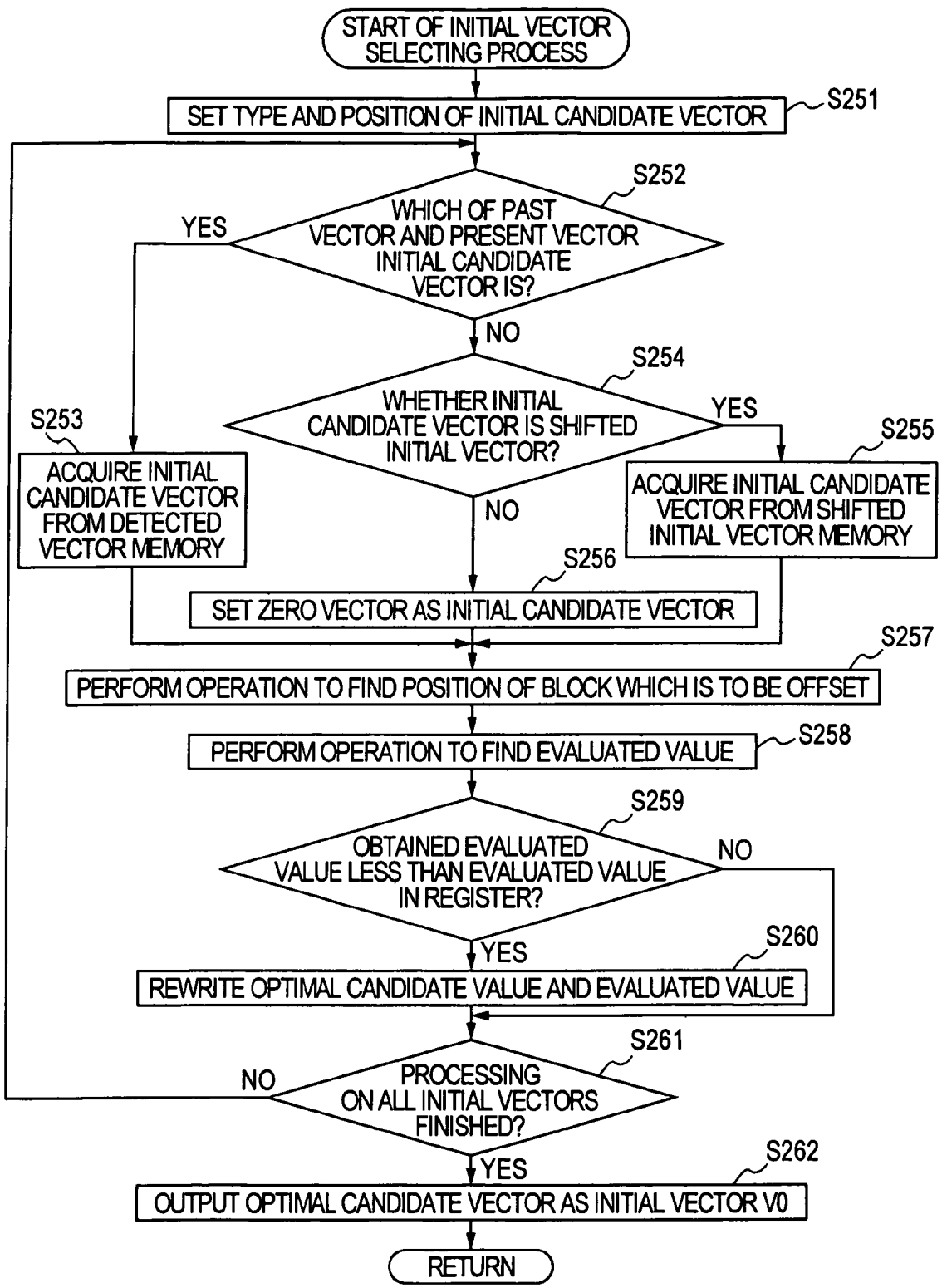
FIG. 24 is a flowchart illustrating an initial vector selecting process.

Next, details of the initial vector selecting process are described below with reference to the flowchart shown in FIG. 24.

In step S251, the candidate vector position operation unit 251 finds, from a peripheral region around a selected block of interest, the position of a candidate block from which an initial candidate vector is to be acquired, and the type and priority of the initial candidate vector, the position, type, and priority being set beforehand. In step S252, the candidate vector position operation unit 251 determines which of a past vector and a current vector the type of the initial candidate vector in the candidate block is. If, in step S252, the candidate vector position operation unit 251 has determined that the type of the initial candidate vector in the candidate block is one of the past and current vectors, the process proceeds to step S253. In step S253, the candidate vector position operation unit 251 supplies the detected vector acquiring unit 252 with positional information of the candidate block and type information of the initial candidate vector. Under the control of the candidate vector position operation unit 251, the detected vector acquiring unit 252 acquires, from the detected vector memory 53, a motion vector (the past vector PV or the current vector CV) in accordance with the positional information of the candidate block and the type information of the initial candidate vector, and outputs the acquired motion vector to the offset position operation unit 254. The process proceeds to step S257.

If, in step S252, the candidate vector position operation unit 251 has determined that the type of the initial candidate vector in the candidate block is not one of the past and current vectors, the process proceeds to step S254. In step S254, the candidate vector position operation unit 251 determines whether the type of the initial candidate vector in the candidate block is a shifted initial vector. If, in step S254, the candidate vector position operation unit 251 has determined that the type of the initial candidate vector in the candidate block is a shifted initial vector, the process proceeds to step S255. In step S255, the candidate vector position operation unit 251 supplies the shifted initial vector acquiring unit 253 with the positional information of the candidate block and the type information of the initial candidate vector. In addition, under the control of the candidate vector position operation unit 251, the shifted initial vector acquiring unit 253 acquires, from the shifted initial vector memory 107, a shifted initial vector corresponding to the positional information of the candidate block, and outputs the acquired shifted initial vector to the offset position operation unit 254. The process proceeds to step S257.

If, in step S254, the candidate vector position operation unit 251 has determined that the type of the initial candidate vector in the candidate block is not a shifted initial vector, that is, it is determined that the type of the initial candidate vector in the candidate block is a zero vector, the process proceeds to step S256. The candidate vector position operation unit 251 sets a zero vector as the initial candidate vector, and supplies the offset position operation unit 254 with the positional information of the candidate vector together with the zero vector. The process proceeds to step S257. Also in steps S253 and S255, the candidate vector position operation unit 251 supplies the positional information of the candidate block to the offset position operation unit 254.

In step S257, when receiving the initial candidate vector input y the detected vector acquiring unit 252 or the shifted initial vector acquiring unit 253, based on the positional information of the candidate block supplied by the candidate vector position operation unit 251, the offset position operation unit 254 performs arithmetic operation to find the block position of an offset block obtained by offsetting the block of interest in frame t on frame t+1. The offset position operation unit 254 outputs the positional information of the candidate block and positional information of the offset block as well as the initial candidate vector to the evaluated value operation unit 255, and the process proceeds to step S258.

When the evaluated value operation unit 255 receives the positional information of the candidate block and the positional information of the offset block from the offset position operation unit 254 together with the initial candidate vector, in step S258, the evaluated value operation unit 255 finds an evaluated value DFD of the initial candidate vector by using frame t and frame t+1, and outputs the obtained evaluated value DFD to the evaluated value comparing unit 256 together with the initial candidate vector. The process proceeds to step S259.

In step S259, the evaluated value comparing unit 256 determines whether the evaluated value DFD obtained by the evaluated value operation unit 255 is less than the evaluated value DFD of the optimal candidate vector stored in the optimal candidate vector storing register 257. If the evaluated value comparing unit 256 has determined that the evaluated value DFD obtained by the evaluated value operation unit 255 is less than the evaluated value DFD of the optimal candidate vector stored in the optimal candidate vector storing register 257, that is, that the initial candidate vector is higher reliable than the optimal candidate vector, In step S260, the evaluated value comparing unit 256 rewrites the optimal candidate vector and its evaluated value DFD in the optimal candidate vector storing register 257 by the initial candidate vector determined to be higher reliable and its evaluated value DFD. The process proceeds to step S261.

If, in step S259, the evaluated value comparing unit 256 has determined that the evaluated value DFD obtained by the evaluated value operation unit 255 is less than the evaluated value DFD of the optimal candidate vector stored in the optimal candidate vector storing register 257, step S260 is skipped over and the process proceeds to step S261.

In step S261, the candidate vector position operation unit 251 determines whether processing on all initial candidate vectors (eight vectors in the example shown in FIG. 23) has finished. If the candidate vector position operation unit 251 has determined that the processing on all the initial candidate vectors has not finished, the process returns to step S252 and repeatedly performs the subsequent steps.

If, in step S261, the candidate vector position operation unit 251 has determined that the processing on all the initial candidate vectors has finished, the process proceeds to step S262. The evaluated value comparing unit 256 controls the optimal candidate vector storing register 257 to output, to the recursive gradient operation unit 103, the optimal candidate vector, among the all the initial candidate vectors, determined to have the highest reliability, as the initial vector V0. The initial vector selecting process ends.

As described above, after, in a block of interest, evaluated values DFD of plural initial candidate vectors are found, an initial candidate vector, which has the least evaluated value DFD, that is, the highest reliability, can be selected as an initial vector. Thus, the optimal initial vector for motion vector detection in the subsequent stage can be given. This results in an increase in accuracy of motion vector detection in the subsequent stage. In step, by using the motion vectors of predetermined blocks set beforehand as initial candidate vectors, a huge number of arithmetic operations due to an increase in the number of initial candidate vectors can be reduced.

Based on the fact that the amount of movement of a moving object has a certain level of continuity between sequential frames and the amount of movement slightly changes, a shifted initial vector that is a motion vector passing from a previous frame through a block of interest is used as an initial candidate vector. Thus, as in the related art, higher accurate motion detection can be performed compared with the case of using only past motion vectors obtained in peripheral blocks as initial candidate vectors. This is particularly effective in a boundary of a moving object.

Next, details of the configuration of the recursive gradient operation unit 103 are described below.

Figure 25:
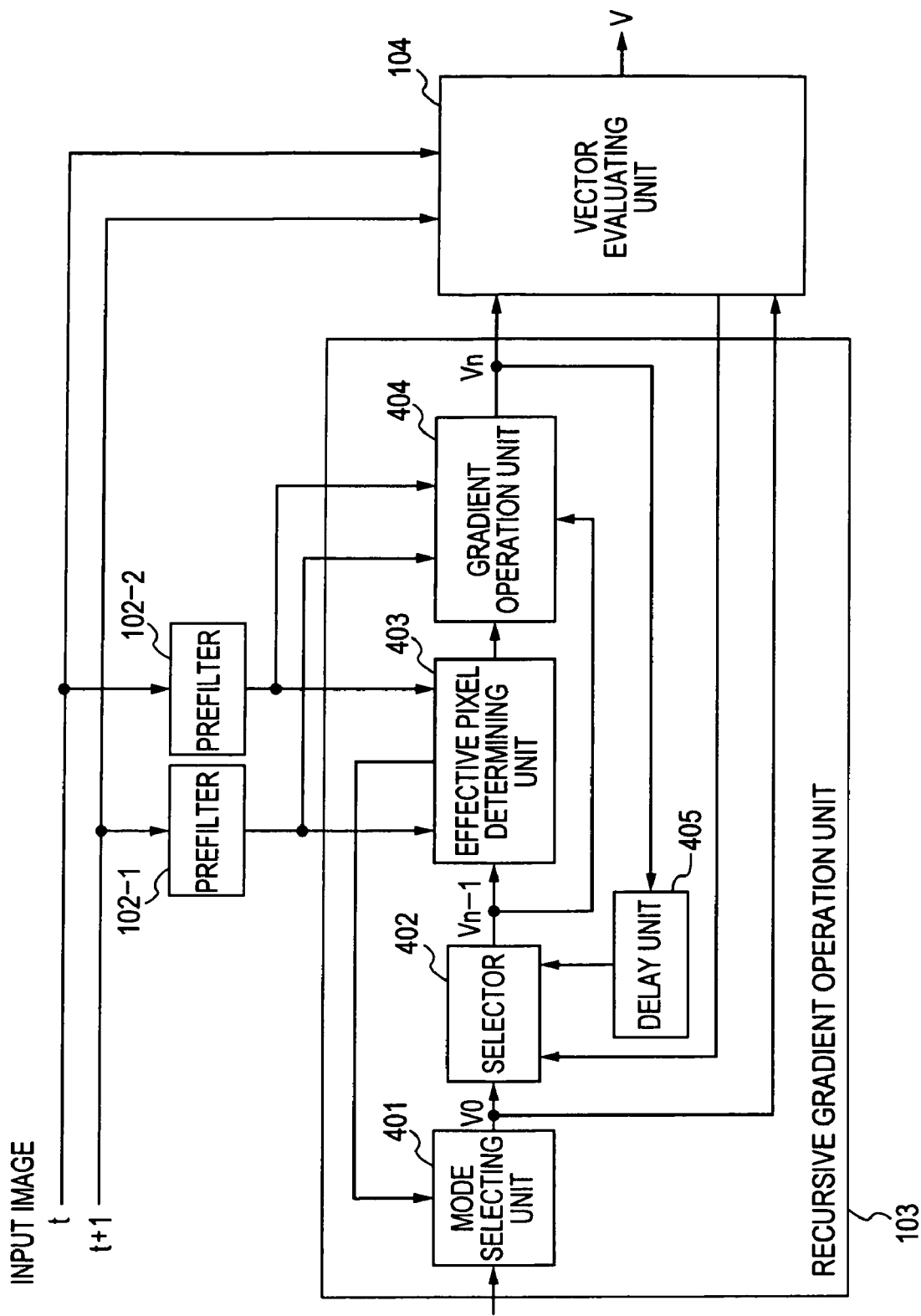
FIG. 25 is a block diagram showing the configuration of a recursive gradient operation unit.

FIG. 25 is a block diagram showing the configuration of the recursive gradient operation unit 103. The recursive gradient operation unit 103 performs an optimal motion vector detecting process by using frame t at time t and frame t+1 at time t+1, which are input. This motion vector detecting process is executed for each predetermined block consisting of a plurality of pixels. In each block, the recursive gradient operation unit 103 outputs the optimal motion vector, which is highly reliable, based on an evaluated value DFD by repeatedly executing the gradient operation in units of blocks or in units of pixels.

Frame t at time t and frame t+1 at time t+1 are input to the recursive gradient operation unit 103 through the prefilters 102-1 and 102-2, and the initial vector V0 is input from the initial vector selecting unit 101 to the recursive gradient operation unit 103.

Under the control of the effective pixel determining unit 403, for each predetermined block, the mode selecting unit 401 selects a processing mode for the gradient operation, and outputs the initial vector V0 from the initial vector selecting unit 101 to a selector 402 and the vector evaluating unit 104. Processing modes for the gradient operation consist of a block-unit processing mode that uses a block as one from which a motion vector is detected, and a pixel-unit processing mode that uses a pixel as one from which a motion vector is detected. The block-unit processing mode is selected as an initial value. Under the control of the vector evaluating unit 104, the selector 402 outputs one of the initial vector V0 from the mode selecting unit 401 and the motion vector Vn output from the gradient operation unit 404, as a motion vector (hereinafter referred to as an "offset vector") used as an initial value for the gradient operation, to the effective pixel determining unit 403 and the gradient operation unit 404.

When receiving the offset vector selected by the selector 402, by using frame t at time and frame t+1 at time t+1 which are respectively input through the prefilters 102-2 and 102-1, while using, as a start point, a position calculated by offsetting the offset vector, the effective pixel determining unit 403 determines whether, in an operation block in either unit processing mode, the number of effective pixels in the gradient operation is greater than a threshold value. The effective pixel determining unit 403 switches between processing methods depending on the result of determination. In other words, if the effective pixel determining unit 403 has determined that the number of effective pixels in the gradient operation is equal to or less than the threshold value, the effective pixel determining unit 403 controls the mode selecting unit 401 to change the processing mode or the predetermined block to the pixel-unit processing mode and to stop the gradient operation. If the effective pixel determining unit 403 has determined that the number of effective pixels in the gradient operation is greater than the threshold value, the effective pixel determining unit 403 controls the gradient operation unit 404 to execute the gradient operation in either processing unit.

When receiving the offset vector input from the selector 402, by using frame t at time t and frame t+1 at time t+1 which respectively input through the prefilters 102-2 and 102-1, while using, as a start point, a position calculated by offsetting the offset vector from the selector 402, the gradient operation unit 404 executes the gradient operation in either unit processing mode, and outputs calculated motion vector Vn to the delay unit 405 and the vector evaluating unit 104.

The delay unit 405 stores the motion vector Vn output from the gradient operation unit 404 until the next processing cycle of the effective pixel determining unit 403 and the gradient operation unit 404, and outputs the stored motion vector Vn to the effective pixel determining unit 403 in response to the control of the selector 402.

Figure 26:
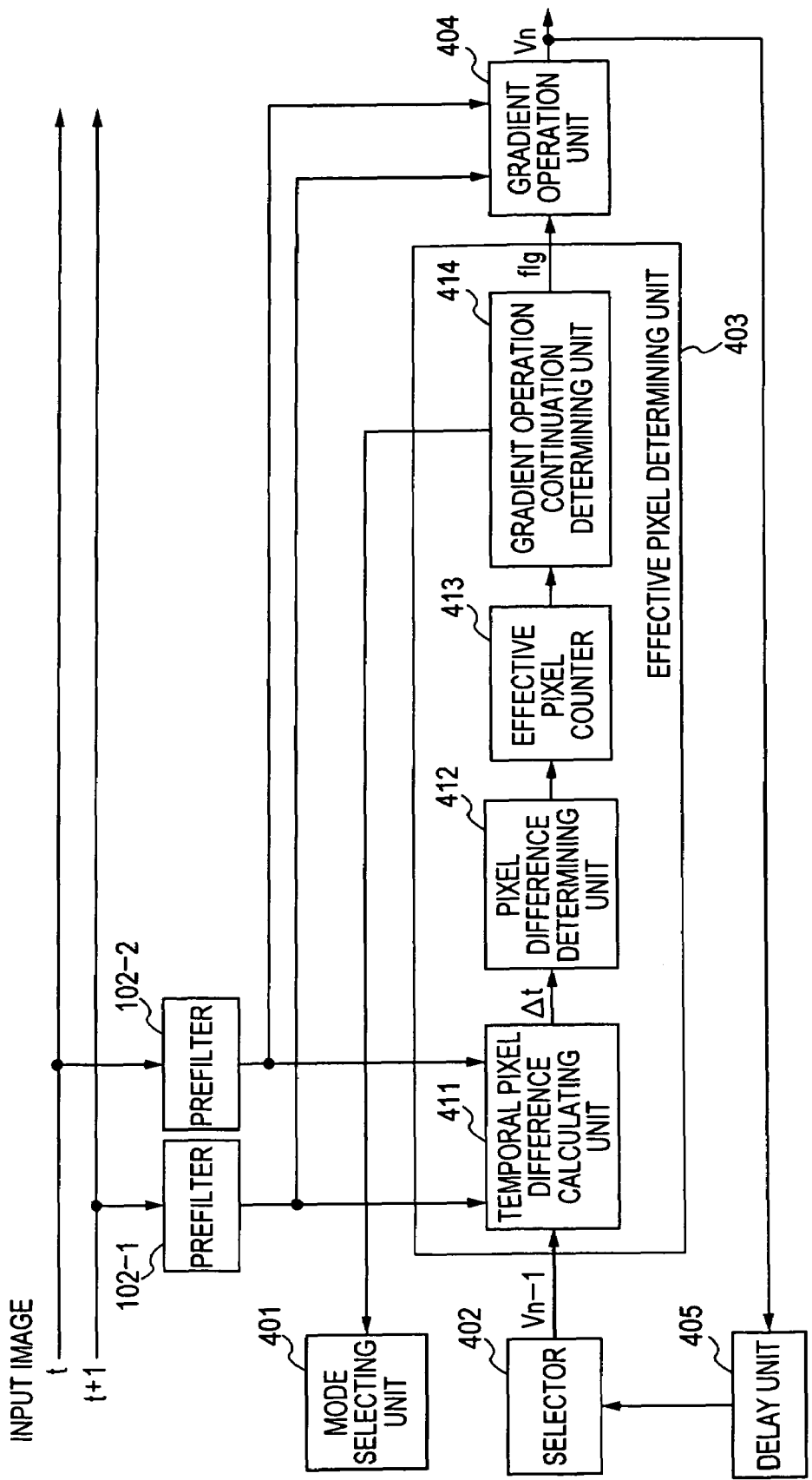
FIG. 26 is a block diagram showing the configuration of an effective pixel determining unit.

FIG. 26 is a detailed block diagram showing the configuration of the effective pixel determining unit 403. In the example shown in FIG. 26, the effective pixel determining unit 403 includes a temporal pixel difference calculating unit 411, a pixel difference determining unit 412, an effective pixel counter 413, and a gradient operation continuation determining unit 414.

When receiving the offset vector selected by the selector 402, the temporal pixel difference calculating unit 411 selects a pixel in a block-unit operation block, calculates time-base pixel difference Δt of the selected pixel by using the offset vector, and frame t at time t and frame t+1 at time t+1 which are respectively input through the prefilters 102-2 and 102-1, and outputs the calculated time-base pixel difference Δt to the pixel difference determining unit 412.

The pixel difference determining unit 412 determines whether the time-base pixel difference Δt calculated by the temporal pixel difference calculating unit 411 is less than a predetermined threshold value (hereinafter referred to as a "pixel difference"). If the pixel difference determining unit 412 has determined that the time-base pixel difference Δt is less than the predetermined pixel difference, the pixel difference determining unit 412 increments the number of effective pixels of the effective pixel counter 413 by one. The effective pixel counter 413 counts the number of pixels which are determined as effective pixels in each operation block by the pixel difference determining unit 412. The effective pixel counter 413 is reset in each operation block.

The gradient operation continuation determining unit 414 determines whether, in the operation block in either unit processing mode, the number of effective pixels for the gradient operation is less than a threshold value. If the gradient operation continuation determining unit 414 has determined that, in the operation block in either unit processing mode, the number of effective pixels for the gradient operation is greater than the threshold value, the gradient operation continuation determining unit 414 outputs a flag (flg=1) that allows the gradient operation unit 404 to execute the gradient operation in either unit processing mode. If the gradient operation continuation determining unit 414 has determined that, in the operation block in either unit processing mode, the number of effective pixels for the gradient operation is less than the threshold value, the gradient operation continuation determining unit 414 controls the mode selecting unit 401 to select the other unit processing mode and to output, to the gradient operation unit 404, a flag (flg=0) that aborts the gradient operation.

Figure 27:
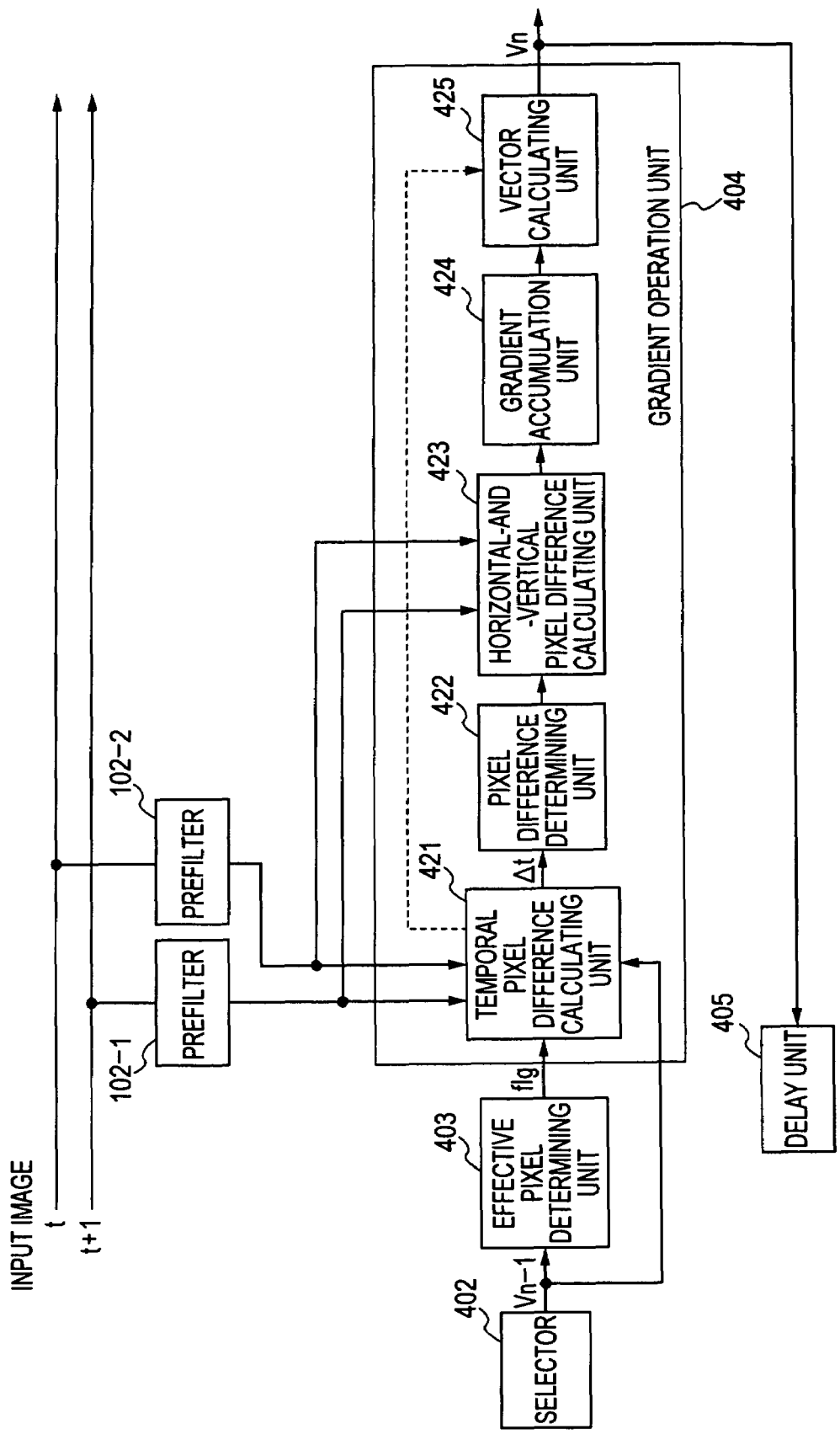
FIG. 27 is a block diagram showing the configuration of a gradient operation unit.

FIG. 27 is a detailed block diagram showing the configuration of the gradient operation unit 404. In the example shown in FIG. 27, the gradient operation unit 404 includes a temporal pixel difference calculating unit 421, a pixel difference determining unit 422, a horizontal-and-vertical pixel difference calculating unit 423, a gradient accumulation unit 424, and a vector calculating unit 425.

The temporal pixel difference calculating unit 421 controls portions of the gradient operation unit 404 based on the flag input from the effective pixel determining unit 403. In other words, when the flag indicates one (flg=1), the temporal pixel difference calculating unit 421 allows the portions of the gradient operation unit 404 to execute the gradient operation. Specifically, when receiving the flag from the effective pixel determining unit 403, by using frame t at time t and frame t+1 at time t+1 which are respectively input through the prefilters 102-2 and 102-1, the temporal pixel difference calculating unit 421 selects pixels in the operation block in either unit processing mode around the pixel calculated by offsetting the offset vector from the selector 402, calculates the a time-base pixel difference Δt of the selected pixels, and outputs the calculated time-base pixel difference Δt and the offset vector to the pixel difference determining unit 422. In addition, when processing on the pixels in the operation block finishes, the temporal pixel difference calculating unit 421 outputs the offset vector to the vector calculating unit 425, and controls the vector calculating unit 425 to calculate a motion vector in a block which is subject to detection.

Alternatively, when the flag indicates zero (flg=0), the temporal pixel difference calculating unit 421 does not calculate the time-base pixel difference Δt of the pixels in the operation block. Each portion of the gradient operation unit 404 does not execute the gradient operation to abort processing. At this time, the temporal pixel difference calculating unit 421 controls the vector calculating unit 425 to set the motion vector V as a zero vector.

The pixel difference determining unit 422 determines whether the time-base pixel difference Δt calculated by the temporal pixel difference calculating unit 421 is less than a predetermined threshold value (hereinafter referred to as a "pixel difference"). If the pixel difference determining unit 422 has determined that the time-base pixel difference Δt calculated by the temporal pixel difference calculating unit 421 is less than the predetermined threshold value, the pixel difference determining unit 422 uses the pixels as what is subject to the gradient operation, and outputs the time-base pixel difference Δt and the offset vector to the horizontal-and-vertical pixel difference calculating unit 423. In other words, the pixels having the pixel difference Δt, which has been determined to be less than the predetermined pixel difference, are subject to arithmetic operation in the horizontal-and-vertical pixel difference calculating unit 423 and the gradient accumulation unit 424. In addition, if the pixel difference determining unit 422 has determined that the time-base pixel difference Δt is not less than the predetermined pixel difference, the pixel difference determining unit 422 allows the horizontal-and-vertical pixel difference calculating unit 423 and the gradient accumulation unit 424 to inhibit the pixel processing.

When receiving the offset vector from the pixel difference determining unit 422, by using frame t at time t and frame t+1 at time t+1 which are respectively input through the prefilters 102-2 and 102-1, the horizontal-and-vertical pixel difference calculating unit 423 calculates horizontal pixel difference Δx and vertical pixel difference Δy of the pixels, whose time-base pixel difference Δt has been determined to be less than the predetermined pixel difference in the operation block in either unit processing mode around the pixel calculated by offsetting the offset vector. In addition, the horizontal-and-vertical pixel difference calculating unit 423 outputs time-base pixel difference Δt, horizontal pixel difference Δx, and vertical pixel difference Δy to the gradient accumulation unit 424. The gradient accumulation unit 424 accumulates the gradient of the pixels, whose time-base pixel difference Δt has been determined to have a value less than the predetermined pixel difference. In other words, the gradient accumulation unit 424 accumulates the time-base pixel difference Δt calculated by the temporal pixel difference calculating unit 421, the horizontal pixel difference Δx and vertical pixel difference Δy calculated by the horizontal-and-vertical pixel difference calculating unit 423, and outputs the accumulated gradient to the vector calculating unit 425.

When receiving the offset vector from the temporal pixel difference calculating unit 421, the vector calculating unit 425 calculates motion vector vn by using the gradient accumulated by the gradient accumulation unit 424 and the least square addition in Expression (9). In addition, the vector calculating unit 425 finds motion vector Vn by adding the offset vector from the temporal pixel difference calculating unit 421 to the calculated motion vector vn, and outputs the obtained motion vector Vn to the vector evaluating unit 104 and the delay unit 405.

Next, a block from which a motion vector is to be detected and an operation block for motion vector are described below.

When considering movement of objects in an image, in many cases, in general, the objects move identically if the objects are identical. Therefore, regarding units of a detecting process for detecting a motion vector, as shown in FIG. 28, it is common that the process is performed in units of blocks.

Figure 28:
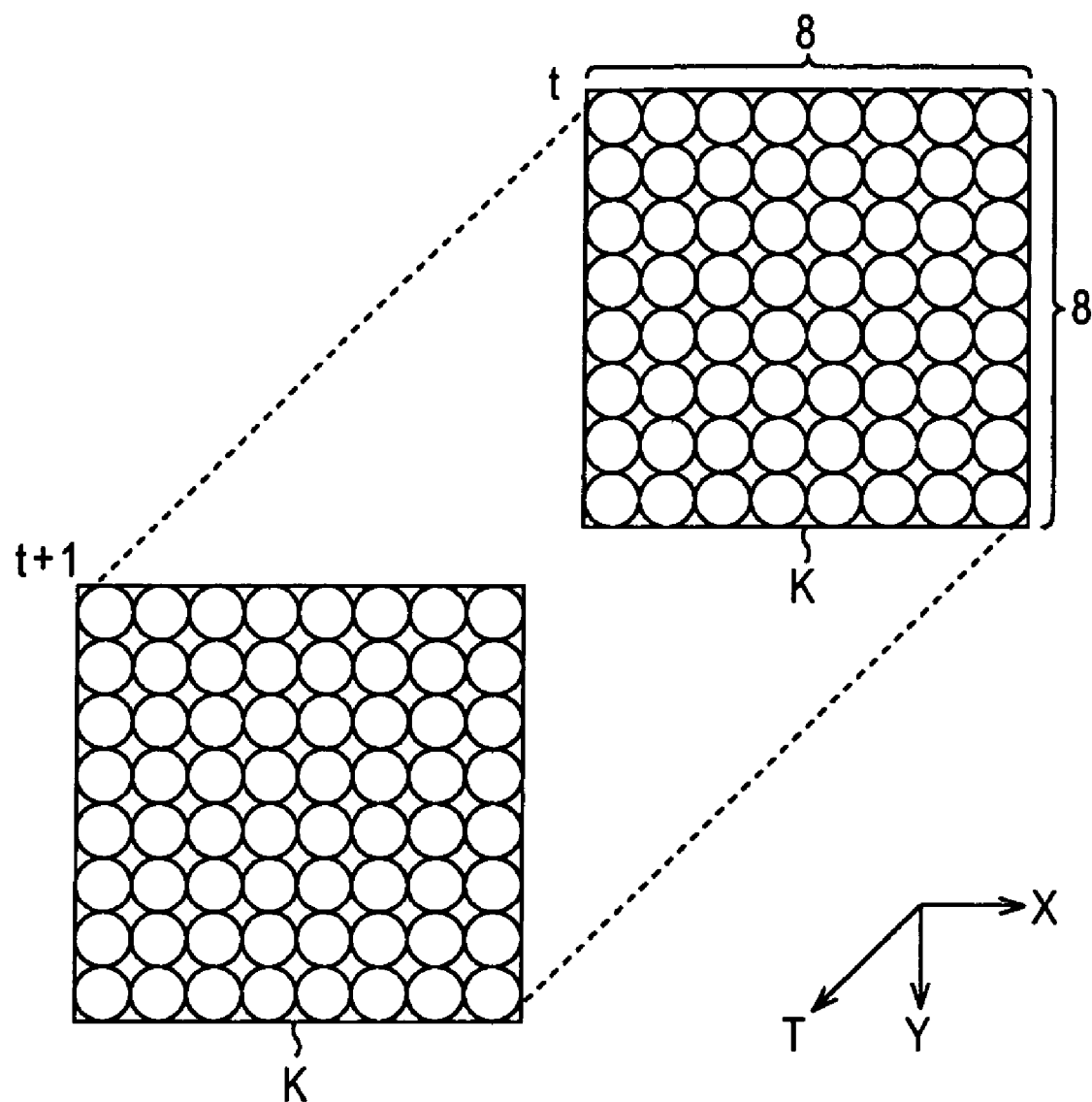
FIG. 28 is an illustration of a detection block and operation block concerning a motion vector.

In the example shown in FIG. 28, the arrow X indicates a horizontal direction, and the arrow Y indicates a vertical direction. The arrow T also indicates a direction of lapse of time from frame t at time t, which is positioned on the right side of the foreground, to frame t+1 at time t+1, which are positioned on the left side of the background.

In the example in FIG. 28, a block (hereinafter referred to as a "8-by-8-pixel block") composed of eight by eight pixels is shown as detection block K in each frame which is subject to detection. The detection block K represents a block in which, when motion vector detection on an 8-by-8-pixel block is performed, identical movement is found for the 8-by-8-pixel block.

In addition, the motion vector detection (or operation) by the gradient method has a feature capable of detecting a motion vector for each pixel. However, in the case of performing motion vector operation in units of pixels, a gradient method that uses a statistical solution of the least square method has a defect in that detection accuracy considerably decreases. Therefore, ordinarily, not only for each block but also for each pixel for processing, when motion vector operation is performed, it is common that pixels for use in the gradient operation are configured in units of blocks (operation blocks).

As described above, the pixels for use in the gradient operation are pixels in an 8-by-8 operation block. In other words, in the example in FIG. 28, it may be said that a motion vector, obtained by using the operation block (8 by 8 pixels) to perform the gradient operation, corresponds to all the pixels in the detection block K (8 by 8 pixels).

Figure 29:
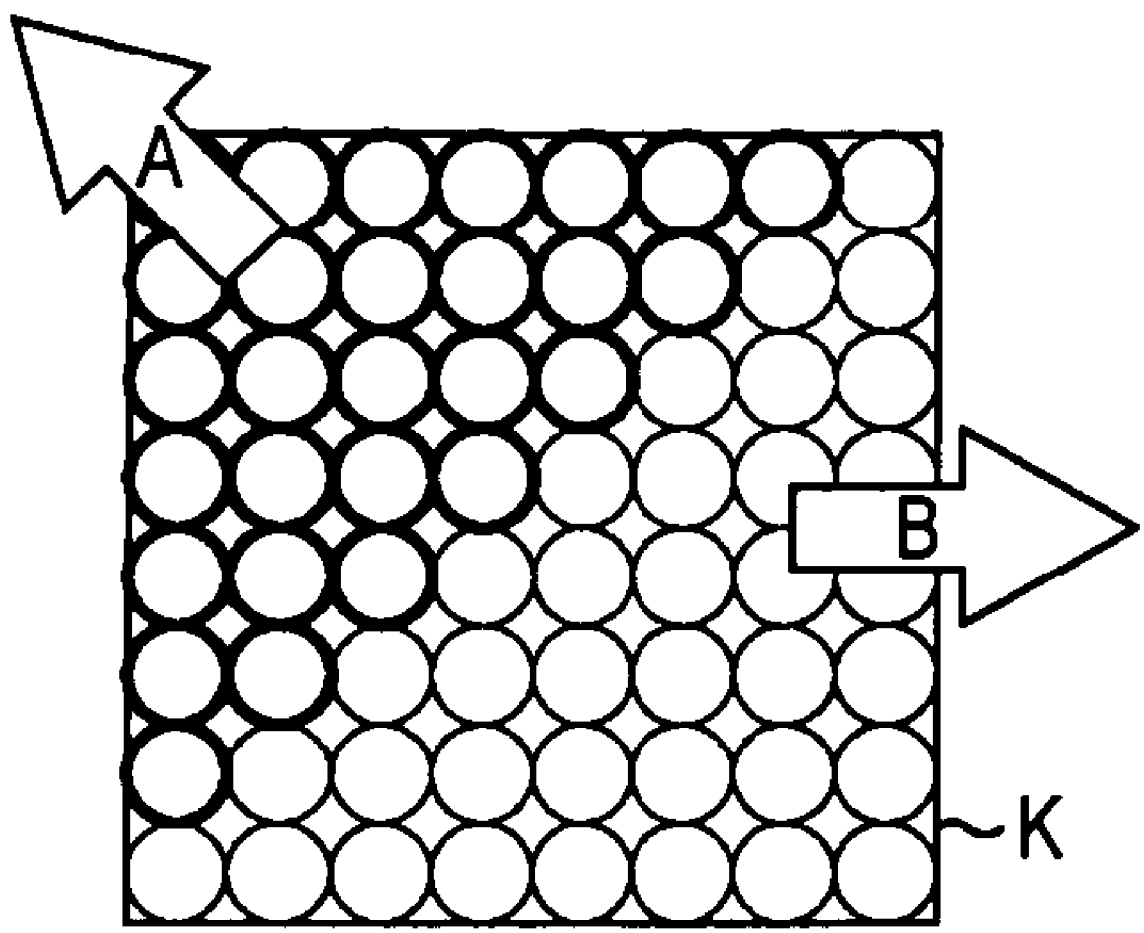
FIG. 29 is an illustration of movement of an object in a detection block.

However, regarding one problem that occurs when, as described above, pixels for use in the gradient operation are treated in units of operation blocks, as shown in FIG. 29, there is a case in which pixels constituting detection block K include pixels of an object having a different movement.

In the example shown in FIG. 29, in detection block K (or an operation block), which consists of eight by eight pixels (64 pixels), 28 pixels (indicated by the thick circles) with the top left end pixel as a reference have the slanting left upward movement indicated by the arrow A. In the detection block K consisting of eight by eight pixels, 36 pixels with the bottom right end pixel have the horizontal right movement indicated by the arrow B.

Accordingly, in the detection block K, the above assumption that pixels have identical movements does not hold. In the case of performing the gradient operation by using an operation block including pixels having a different movement, motion vector detection accuracy decreases. In other words, this is a problem of detection accuracy decrease concerning an object annihilation region (covered background region) and an object generation region (uncovered background region) that are generated on a boundary between objects having different movements. The annihilation region is a mixed region for a foreground region that is positioned to correspond to the anterior end of a traveling direction of an object in the foreground, and represents a region whose background component becomes covered by the foreground in accordance with lapse of time. Conversely, the generation region is a mixed region for the foreground region that is positioned to correspond to the posterior end of the traveling direction of the object in the foreground, and represents a region whose background component becomes uncovered in accordance with lapse of time.

Figure 30:
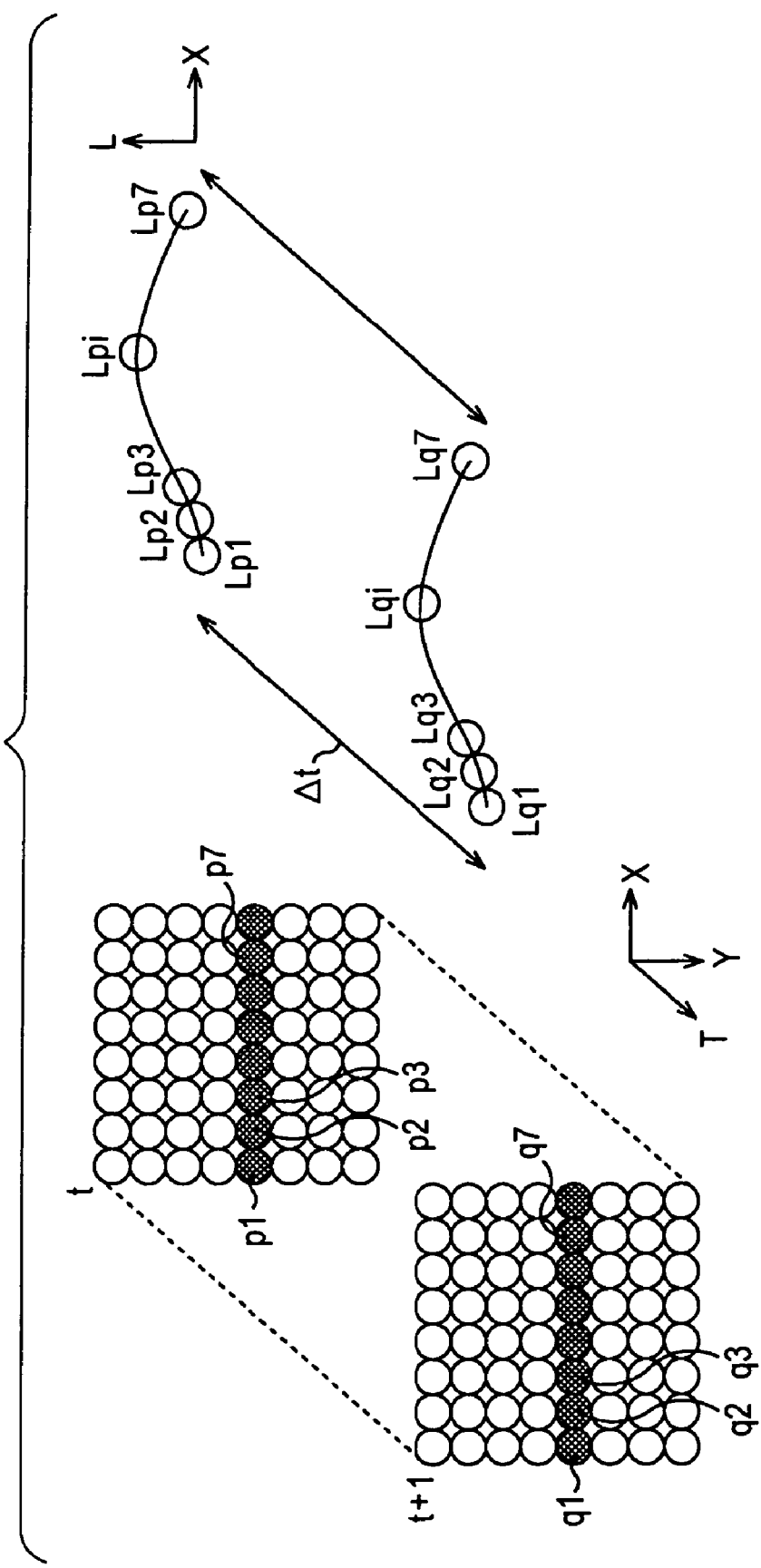
FIG. 30 is an illustration of a luminance state in a detection block having objects having the same movement.

FIG. 30 is an illustration of the luminance state of a detection block having identical objects. On the left side of FIG. 30, the arrow X indicates a horizontal direction, and the arrow Y indicates a vertical direction. The arrow T indicates a direction of lapse of time from frame t at time t, which is positioned on the right side of the background of FIG. 30, to frame t+1 at time t+1, which is positioned on the left side of the foreground of FIG. 30. On the right side of FIG. 30, the arrow X indicates a horizontal direction, and the arrow L indicates a luminance. In other words, the luminances $Lp1$, $Lp2$, $Lp3$, ..., $Lpi$ ($3<i<7$), ..., $Lp7$, on the right side of FIG. 30, represent, in the 8-by-8-pixel detection block in frame t, on the left side of FIG. 30, the luminances of pixels $p1$, $p2$, $p3$, ..., $pi$ ($3<i<7$), ..., $p7$, ... in the lower fifth row from the top. Similarly, the luminances $Lq1$, $Lq2$, $Lq3$, ..., $Lqi$ ($3<i<7$), ..., $Lq7$ represent, in the 8-by-8-pixel detection block in frame t+1 on the left side of FIG. 30, the luminances of pixels $q1$, $q2$, $q3$, ..., $qi$ ($3<i<7$), ..., $q7$, ..., in the lower fifth row from the top, which are in phase with pixels $p1$, $p2$, $p3$, ..., $pi$ ($3<i<7$), ..., $p7$, etc. In addition, the arrow between luminances $Lp1$ to $Lp7$ and luminances $Lq1$ to $Lq7$ indicates each time-base pixel difference $\Delta t$ between each pixel in frame t and each pixel in frame t+1.

Accordingly, in the example shown in FIG. 30, the time-base pixel difference $\Delta t$ between pixels $p1$ and $q1$ is represented by the difference between luminances $Lp1$ and $Lq1$. The time-base pixel difference $\Delta t$ between pixels $p2$ and $q2$ is represented by the difference between luminances $Lp2$ and $Lq2$. The time-base pixel difference $\Delta t$ between pixels $p3$ and $q3$ is represented by the difference between luminances $Lp3$ and $Lq3$. The time-base pixel difference $\Delta t$ between pixels $pi$ and $qi$ is represented by the difference between luminances $Lpi$ and $Lqi$. The time-base pixel difference $\Delta t$ between pixels $p7$ and $q7$ is represented by the difference between luminances $Lp7$ and $Lq7$. Differences in luminance slightly change in such a form that the curve connecting luminances $Lp1$ to $Lp7$, and the curve connecting luminances $Lq1$ to $Lq7$ have substantially identical shapes.

As described above, when pixels in a detection block are identical objects (or are identical in movement), the luminances of corresponding temporal pixels do not considerably change.

Figure 31:
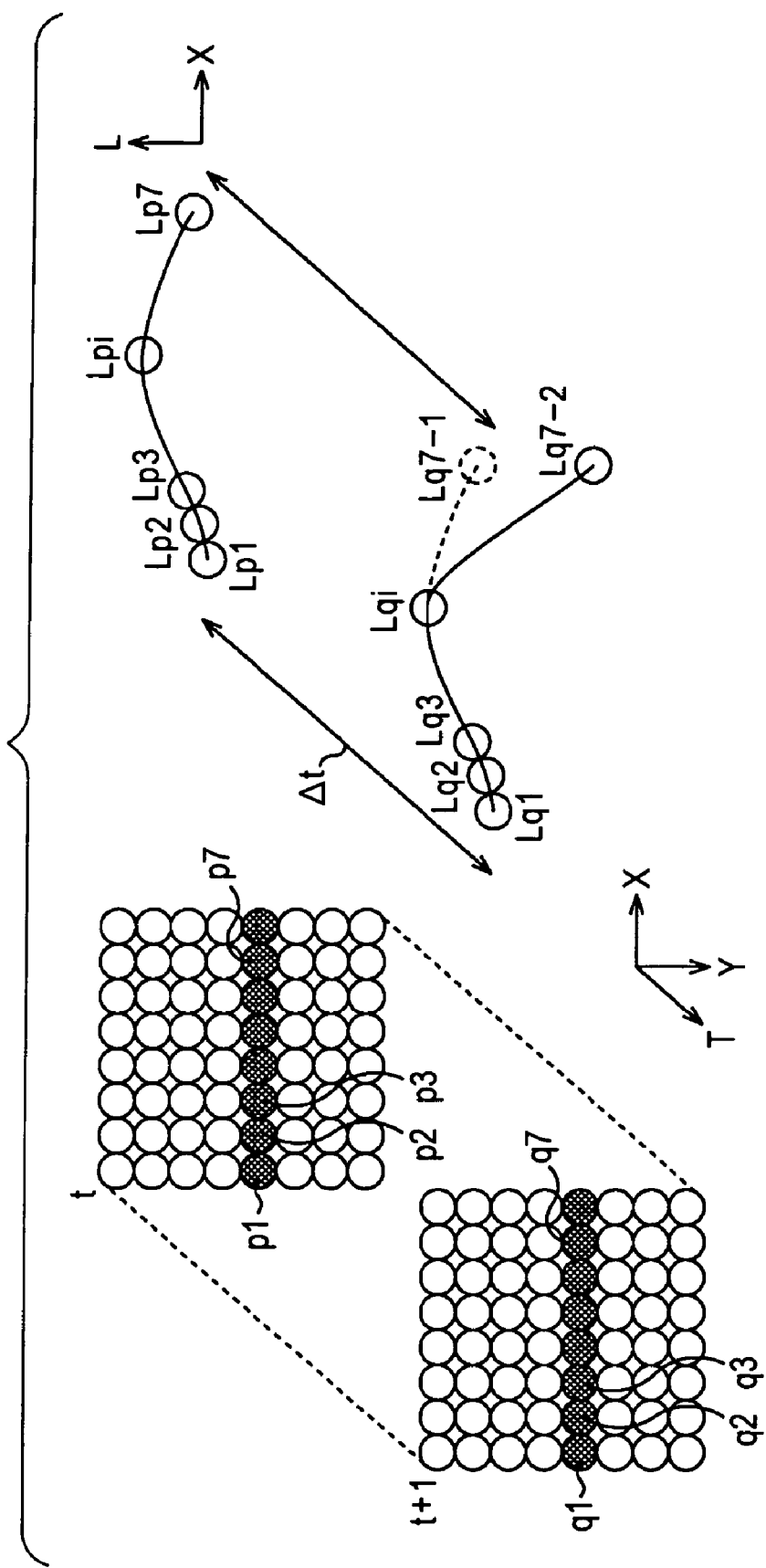
FIG. 31 is an illustration of a luminance state in a detection block having objects having different movements.

FIG. 31 is an illustration of a luminance state in a detection block in a case in which the pixels of objects having different movements exist at the same time. In FIG. 30, portions corresponding to those in FIG. 31 are denoted by corresponding reference numerals. Accordingly, a description of the portions is omitted. In the example shown in FIG. 31, pixel $p7$ in frame t differs in movement from other pixels.

For example, when pixel $p7$ in frame t is identical in movement to the other pixels, in frame t+1, the luminance of $q7$ positioned in phase with pixel $p7$ must be represented by luminance $Lq7$-1. However, since, in the example shown in FIG. 31, pixel $p7$ differs in movement from the other pixels, as is indicated by luminance $Lq7$-2, the luminance of pixel $q7$ considerably changes downward from luminance $Lq701$.

Therefore, the time-base pixel difference $\Delta t$ between pixels $p7$ and $q7$, that is, the difference between luminances $Lp7$ and $Lq7$-2, greatly changes.

As described above, for example, when, in a detection block, the above object annihilation, generation, transformation, or the like, causes a state in which pixels of object having different movements exist at the same time, there are many cases in which the luminances of corresponding pixels considerably change, and this may causes a possibility of irregularity in movement. Accordingly, the effective pixel determining unit 403 is configured to determine that pixels having a small luminance change are effective when being used in motion vector detection, and, conversely to determine that pixels having a large luminance change are not effective when being used in motion vector detection. In other words, by noting an element of the magnitude of luminance change, and determining whether a pixel is effective based on the magnitude of change in the luminance of the pixel, a pixel whose luminance slightly changes can be used for motion vector detection, and conversely, a pixel whose luminance considerably changes cannot be used for motion vector detection. This enables increased accuracy of motion vector detection.

Specifically, for each pixel in the operation block, the effective pixel determining unit 403 sets a predetermined pixel difference (threshold value) on the time-base pixel difference $\Delta t$. When the time-base pixel difference $\Delta t$ is less than the set predetermined pixel difference, it is determined that the pixel contributes to (are effective in) motion vector detection, and uses the pixel in the gradient method in the case of performing motion vector detection. When the time-base pixel difference $\Delta t$ is not less than the set predetermined pixel difference, it is determined that the pixel is regarded as having a possibility to generate irregularity in movement, and the pixel is excluded from the gradient operation in the case of performing motion vector detection. This prevents a different movement from being included, so that more stable gradient operation is executed. As a result, a probable motion vector is detected.

However, since, as described above, the gradient operation is arithmetic operation based on the least squares method, which is a statistical solution, by dividing pixels into pixels for used in the gradient operation and those that are not used in the gradient operation, the pixels for used in the gradient operation extremely decrease. If such an extremely less number of pixels is used to perform the gradient operation, the reliability of operation decreases, thus causing a possibility of a decrease in the accuracy of motion vector detection.

Figure 32:
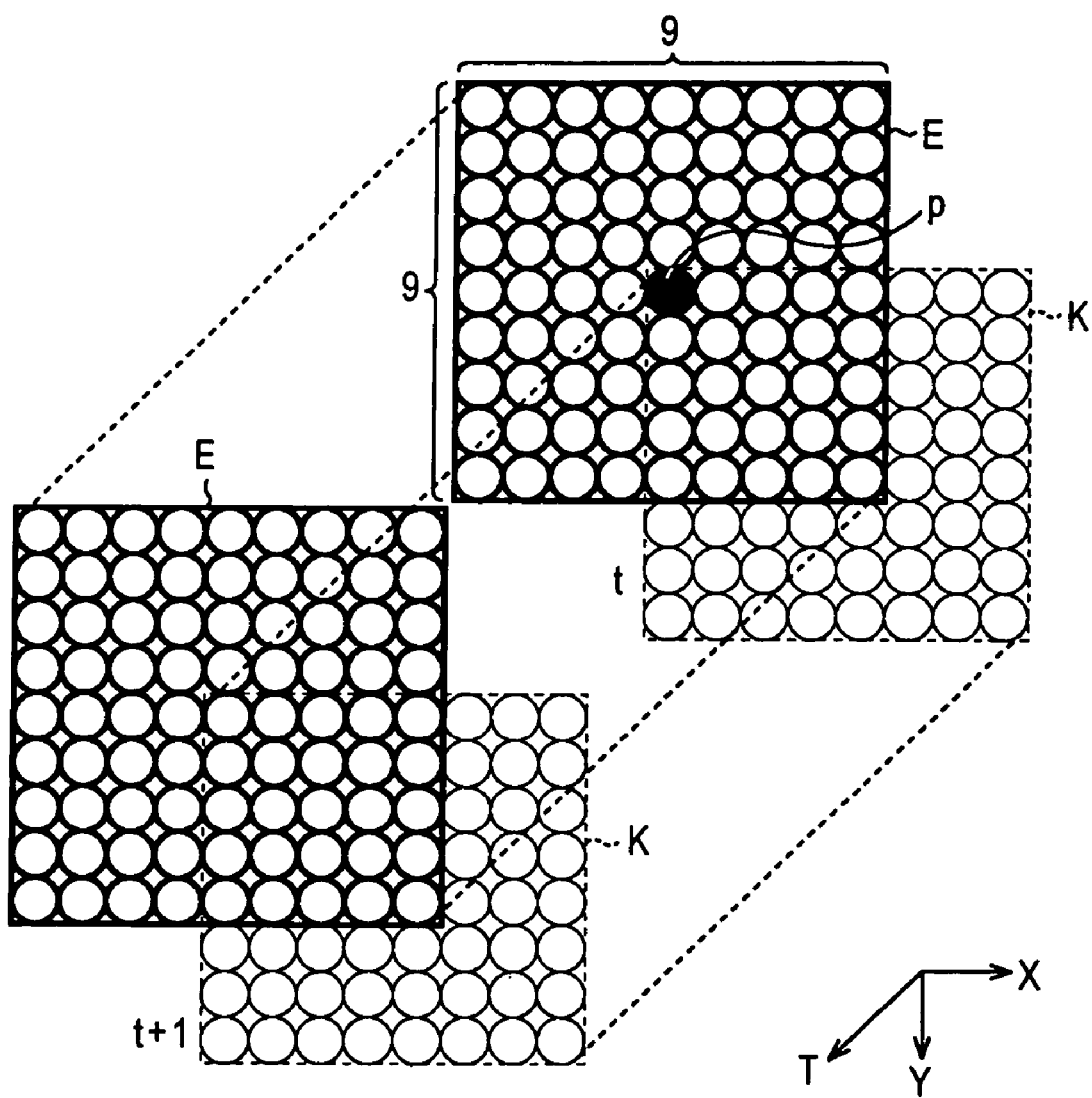
FIG. 32 is an illustration of an example of an operation block in pixel-unit processing.

Accordingly, when the number of pixels for use in the gradient operation is small, the effective pixel determining unit 403 regards the gradient operation in the processing unit of the (8-by-8-pixel) detection block as unstable, and performs processing by switching to an operation unit for each of (64) pixels in the 8-by-8-pixel block, as shown in FIG. 32.

FIG. 32 is an illustration of an example of an operation block in the pixel-unit processing. The example shown in FIG. 32 shows, when (8-by-8-pixel) detection block K in frame is switched to the pixel-unit processing, operation block E (consisting of 9 by 9 pixels in FIG. 32) for pixel p positioned at the top left end of detection block K.

In other words, when finding the motion vector of pixel p, operation block E (consisting of 9 by 9 pixels in FIG. 32) around pixel p is used. For example, when finding the motion vector of a right adjacent pixel which is right adjacent to pixel p, a 9-by-9-pixel operation block (not shown) around the right adjacent pixel with respect to pixel p is used.

Therefore, for example, even if, in detection block K, most pixels moves differently from pixel p, in detection block K (8 by 8 pixels), the number of pixels for use in the gradient operation is counted, and, if the counted number is small, the processing is switched to the pixel-unit processing. As shown in FIG. 32, operation block E in the pixel-unit processing, the gradient operation is executed.

When, as described above, by dividing pixels into pixels for used in the gradient operation and those that are not used in the gradient operation, the pixels for used in the gradient operation extremely decrease, not by stopping detection of the motion vectors of all the pixels in detection block K (8 by 8 pixels), but by switching to the pixel-unit processing and performing the gradient operation in a form in which a pixel in operation block E (9 by 9 pixels) is changed for each pixel, inclusion of pixels that are not used in the gradient operation can be prevented as much as possible, and more accurate motion vector detection can be performed depending on pixels.

Figure 33:
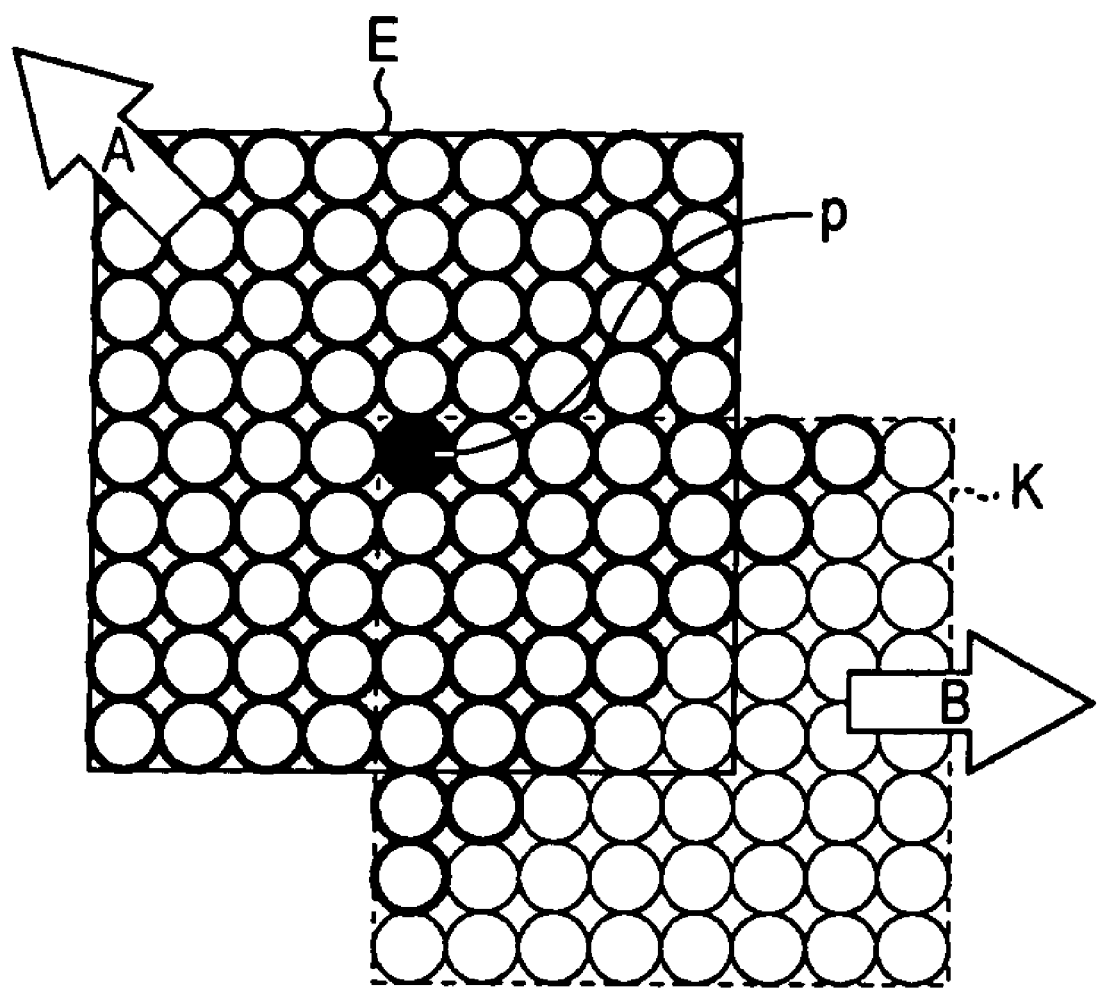
FIG. 33 is an illustration of the pixel-unit processing in the detection block shown in FIG. 29.

FIG. 33 is an illustration of an example of application of the pixel-unit processing to pixels in the detection block K (operation block) shown in FIG. 29. In the example shown in FIG. 33, pixel-unit processing is performed in the detection block K (8 by 8 pixels), which consists of pixels having two different movements, that is, the pixels (the thick circles) having the slanting upward left movement indicated by the arrow A, and the pixels (the thin circles) having the horizontal right movement indicated by the arrow B. In this case, when detecting the motion vector of the top left end detection pixel p in detection block K, which is subject to detection, operation block E (9-by-9-pixel block) around detection pixel p is used.

The pixels in operation block E have the slating upward left movement indicated by the arrow A excluding three pixels (thin circles) in the bottom right corner which have the horizontal right movement indicated by the arrow B. Similarly to the case of the block-unit processing, for each pixel in operation block E, a predetermined threshold value (pixel difference) is set on time-base pixel difference $\Delta t$. When time-base pixel difference $\Delta t$ is less than the set threshold value, it is determined that the pixel contributes to motion vector detection, and the pixel is used in the gradient operation in the case of performing motion vector detection. When time-base pixel difference $\Delta t$ is greater than the set threshold value, it is determined that the pixel has a possibility of generating irregularity in movement, and the pixel is not used in the gradient operation in the case of performing motion vector detection.

In other words, in the example in FIG. 33, in operation block E, the pixels (thick circles) other than the three pixels (thin circles) in the bottom right corner are determined to be effective in the gradient operation for detection pixel p. The effective pixels are used to execute the gradient operation. Thus, compared with the gradient operation in the block-unit processing, which is executed by using the detection block K (8 by 8 pixels) shown in FIG. 29 as an operation block, more stable gradient operation is executed, so that a probable motion vector is detected.

In the operation block for each pixel, when, by dividing pixels into pixels for used in the gradient operation and those that are not used in the gradient operation, the pixels for used in the gradient operation extremely decrease, it is determined that motion vector detection is dangerous, and the gradient operation is aborted. In other words, this is because, if it is determined that a movement having some magnitude is detected although motion vector detection is unstable, the detected motion vector may be improbable, that is, it may not match the movement of the object in the actual image. In many cases, an image generated by using the improbable motion vector to execute the subsequent processing (e.g., a vector allocating process or vector compensating process) may have visual deterioration such as discontinuous movement and occurrence of block noise.

Accordingly, when the pixels for used in the pixel-unit gradient operation extremely decrease, for example, zero vectors (i.e., stationary state) are used as the detected motion vectors. This prevents the motion vector from affecting the subsequent processing, thus suppressing large visual deterioration in the generated image.

Figure 34:
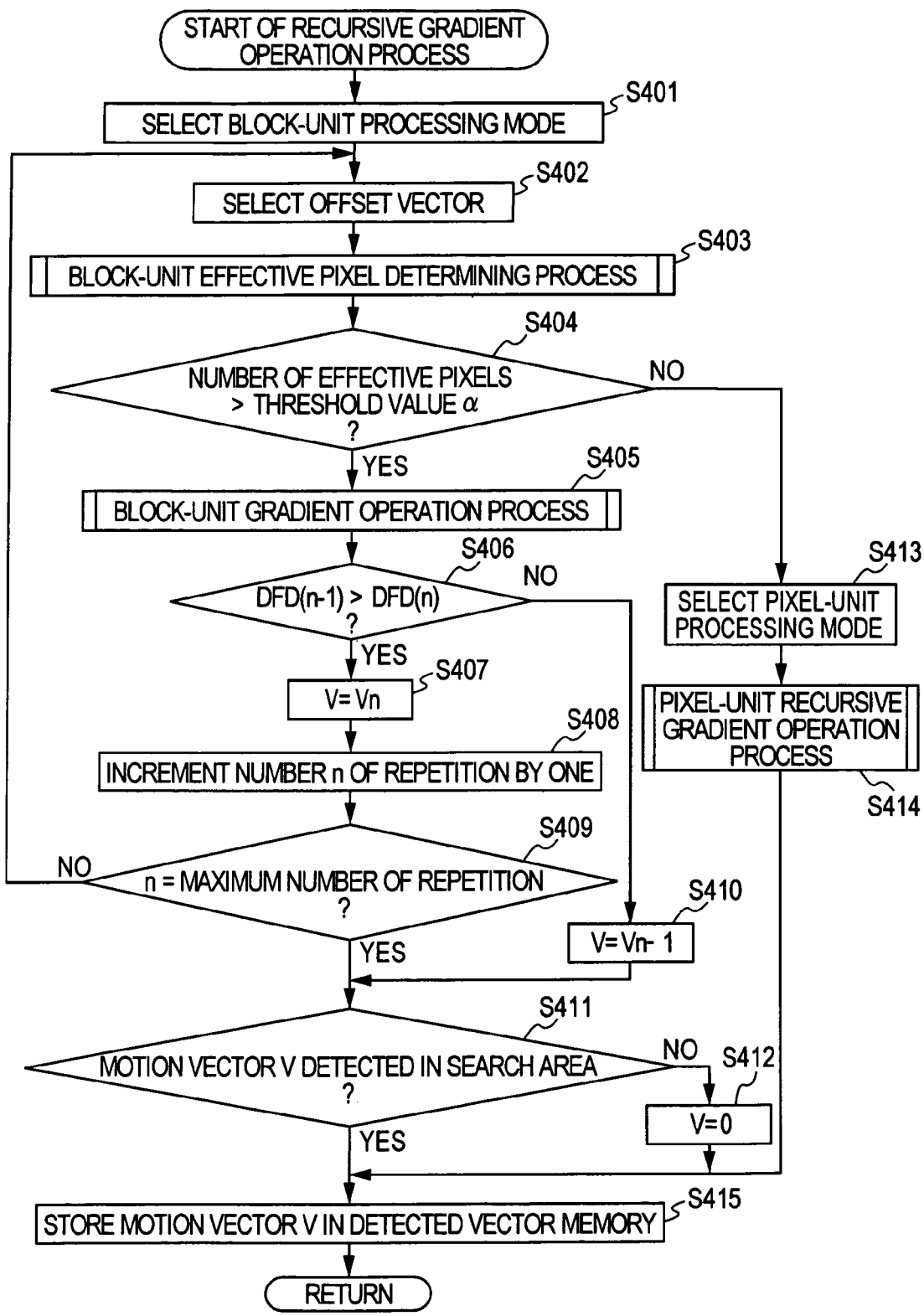
FIG. 34 is a flowchart illustrating the recursive gradient operation process.

Next, details of the recursive gradient operation are described with reference to the flowchart shown in FIG. 34. The initial vector V0 is input from the previous stage to the mode selecting unit 401.

In step S401, the mode selecting unit 401 selects the block-unit processing mode. the mode selecting unit 401 uses a detection block (operation block) as a block in frame t as a detection block (operation block), and outputs the initial vector V0 to the 402 and the vector evaluating unit 104. The process proceeds to step S402. This allows each portion of the recursive gradient operation unit 103 to execute the block-unit processing. In step S402, in response to control by the vector evaluating unit 104, the selector 402 selects the initial vector V0 input from the mode selecting unit 401 as an offset vector, and outputs the selected offset vector to the temporal pixel difference calculating unit 411 and the temporal pixel difference calculating unit 421. The process proceeds to step S403.

In step S403, the temporal pixel difference calculating unit 411 and the pixel difference determining unit 412 use (offset the initial vector V0 in this case) the selected offset vector to execute a block-unit effective pixel determining process. The process proceeds to step S404. Details of the block-unit effective pixel determining process are described with reference to FIG. 35. In the block-unit effective pixel determining process, the effective pixel counter 413 counts, in the block-unit operation block, the number of pixels in which pixel differences are determined to be smaller than a predetermined pixel difference, that is, to be effective in the gradient operation in the subsequent stage.

In step S404, the gradient operation continuation determining unit 414 determines whether the number of pixels (effective pixels) counted in the effective pixel counter 413 is greater than predetermined threshold value $\alpha$. If it is determined that the number of effective pixels is greater than predetermined threshold value $\alpha$, the gradient operation continuation determining unit 414 outputs, in units of blocks, a flag (flg=1) for allowing the gradient operation unit 404 to execute the gradient operation. The process proceeds to step S405.

In step S405, based on the flag from the gradient operation continuation determining unit 414, the gradient operation unit 404 uses the offset vector (the initial vector V0 in this case) from the selector 402 to execute the block-unit gradient operation process. The process proceeds to step S406. Details of the gradient operation process are described below with reference to FIG. 36. This gradient operation process finds motion vector Vn, and the obtained motion vector Vn is output to the vector evaluating unit 104 and the delay unit 405. The motion vector Vn is the sum (Vn=Vn−1+vn) of the motion vector vn calculated in the first gradient operation and the offset vector Vn−1. For example, motion vector V1 is the sum (V1=V0+v1) of the motion vector v1 calculated in the first gradient operation and the offset vector (the initial vector V0).

In step S406, the vector evaluating unit 104 finds an evaluated value DFD(n) of the motion vector Vn obtained in the gradient operation and an evaluated value DFD(n−1) of the motion vector Vn−1 used as the offset vector. The vector evaluating unit 104 determines whether the evaluated value DFD(n) is less than the evaluated value DFD(n−1), that is, whether the motion vector Vn obtained in the gradient operation is higher reliable than the motion vector Vn−1 used as the offset vector. Specifically, for example, in the first processing, an evaluated value DFD(1) of the obtained motion vector V1 is compared with an evaluated value DFD(0) of the initial vector V0. In the second processing, an evaluated value DFD (2) of the obtained motion vector V2 is compared with the evaluated value DFD(1) of the obtained motion vector V1.

If, in step S406, it is determined that the evaluated value DFD(n) is less than the evaluated value DFD(n−1), that is, the motion vector Vn is higher reliable than the motion vector Vn−1, in step S407, the vector evaluating unit 104 sets the calculated motion vector Vn (the motion vector V1 in the first time, the motion vector V2 in the second time) as motion vector v in the detection block. The process proceeds to step S408. In step S408, the vector evaluating unit 104 increments the number n of repetition by one before the process proceeds to step S409. In step S409, the vector evaluating unit 104 determines whether the number n of repetition has reached a set maximum number of repetition (e.g., two). If, in step S409, it is determined that the number n of repetition has not reached the set maximum number of repetition, the vector evaluating unit 104 controls the selector 402 so that the process returns to step S402 and repeats the subsequent steps.

In other words, in step S402, the motion vector V1 stored in the delay unit 405 after being output from the vector calculating unit 425 is selected as the offset vector by the selector 402. In step S403, the temporal pixel difference calculating unit 411 and the pixel difference determining unit 412 execute the block-unit effective pixel determining process by using the motion vector V1 as the offset vector, and the process repeats the subsequent steps. Therefore, the motion vector V2 calculated in step S405 is the sum (i.e., V2=V1+v2=V0+v1+v2) of the motion vector v2 calculated in the second gradient operation and the motion vector V1 used as the offset vector.

If, in step S406, it is determined that the evaluated value DFD(n) is not less than the evaluated value DFD(n−1), that is, the motion vector Vn−1 is higher reliable than the motion vector Vn, the vector evaluating unit 104 proceeds to step S410. In step S410, the motion vector Vn−1 (the initial vector V0 in the first time, the motion vector V1 in the second time) used as an offset in the gradient operation is set as the motion vector V in the detection block by the vector evaluating unit 104, and the process proceeds to step S411. If, in step S409, it is determined that the number n of repetition has reached the set maximum number of repetition, the vector evaluating unit 104 proceeds to step S411.

In step S411, the vector evaluating unit 104 determines whether the motion vector V is positioned in a search area set beforehand as a range for motion vector detection. If it is determined that the motion vector V is positioned in the search area, the vector evaluating unit 104 proceeds to step S415, and stores the motion vector V in the detected vector memory 53 in a form associated with the detection block. After that, the process ends.

In addition, if, in step S411, it is determined that the motion vector V is not positioned in the search area, the vector evaluating unit 104 proceeds to step S412 and sets the motion vector V as a zero vector. Proceeding to step S415, the vector evaluating unit 104 stores the motion vector V (zero vector) in the detected vector memory 53 and finishes the recursive gradient operation process.

If, in step S404, it is determined that the number of effective pixels in the effective pixel counter 413 is equal to or less than the predetermined threshold value α, the gradient operation continuation determining unit 414 proceeds to step S413. In step S413, the gradient operation continuation determining unit 414 controls the mode selecting unit 401 to select the pixel-unit processing mode before proceeding to step S414. This allows each portion of the recursive gradient operation unit 103 to execute processing in units of pixels. In step S414, the mode selecting unit 401 executes the pixel-unit recursive gradient operation process, and proceeds to step S415. Details of the pixel-unit recursive gradient operation process are described below with reference to FIG. 37. Since the recursive gradient operation process in units of pixels finds the motion vectors V of all the pixels in the detection block, in step S415, the vector evaluating unit 104 stores each motion vector V in the detected vector memory 53 in a form associated with each pixel in the detection block, and the recursive gradient operation process ends.

In the above-described step S406, evaluation of motion vector reliability is performed by comparing the evaluated value DFD(n) of the motion vector Vn obtained in the gradient operation process and the evaluated value DFD(n−1) of the motion vector Vn−1 used as the offset vector. Simultaneously with comparison of the evaluated values DFD, the evaluation may be also performed by determining whether the value (|vn|) of the norm of the motion vector vn (motion vector obtained before the offset vector is added) obtained in the gradient operation is less than a predetermined magnitude (e.g., 16 in the case of an 8-by-8-pixel operation block).

A norm represents the magnitude of a vector in a vector space. For example, the norm of a vector v starting from the origin (0, 0) to (x, y) is represented by the following expression:

$$|v|=\sqrt{x^2+y^2} \qquad (11)$$

In other words, In the gradient operation, in general, a highly accurate result is obtained. However, when the norm |vn| of a motion vector, obtained in the gradient operation, exceeds a predetermined magnitude, a highly accurate result for the large motion vector vn is not always obtained. Accordingly, together with the evaluated value DFD, by determining whether the norm |vn| of each motion vector, obtained in the gradient operation, exceeds a predetermined magnitude, and excluding a motion vector whose norm |vn| exceeds the predetermined magnitude, in this gradient operation, either for minute movement or for large movement, a highly accurate result can be obtained, and the accuracy of motion vector detection can be improved.

In the case of determination based on the evaluated value DFD and the norm, if, in step S406, |vn|≦16 and the evaluated value DFD(n−1)>the evaluated value DFD(n), the process proceeds to step S407, and setting is performed so that V=Vn. If, in step S406, |vn|>16 or the evaluated value DFD (n−1)<the evaluated value DFD(n), the process proceeds to step S410, and setting is performed so that V=Vn−1.

Figure 35:
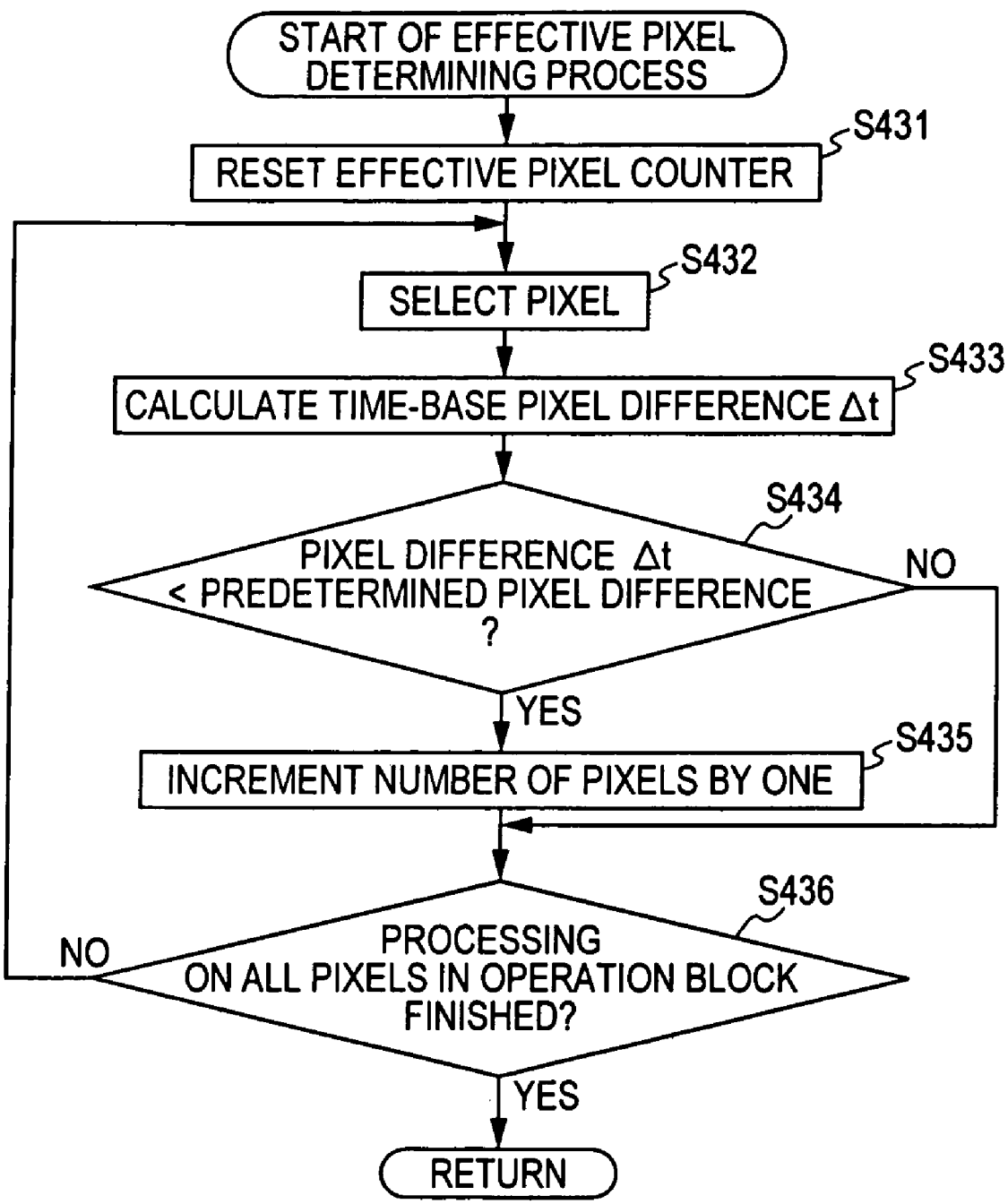
FIG. 35 is a flowchart illustrating an effective pixel determining process.

Next, details of the effective pixel determining process are described below with reference to the flowchart shown in FIG. 35. FIG. 35 shows an example of the effective pixel determining process in step S403 in FIG. 34.

When the offset vector is input from the selector 402, in step S431, the temporal pixel difference calculating unit 411 controls the pixel difference determining unit 412 to reset the effective pixel counter 413. Proceeding to step S432, the temporal pixel difference calculating unit 411 selects a pixel in a block-unit operation block, and proceeds to step S433.

Pixels are selected from the top left end pixel in raster scanning order.

In step S433, by using the offset vector, and frame t at time t and frame t+1 at time t+1 which are respectively input through the prefilters 102-2 and 102-1, time-base pixel difference Δt of the selected pixel, and outputs the calculated time-base pixel difference Δt to the pixel difference determining unit 412. The process proceeds to step S434.

In step S434, the pixel difference determining unit 412 determines whether the time-base pixel difference Δt calculated by the temporal pixel difference calculating unit 411 is less than a predetermined pixel difference, that is, whether the calculated time-base pixel difference Δt is effective in the gradient operation in the subsequent stage. If it is determined that the calculated time-base pixel difference Δt is less than the predetermined pixel difference, the process proceeds to step S435. The pixel difference determining unit 412 increments the number of effective pixels in the effective pixel counter 413 by one, and the process proceeds to step S436. If, in step S412, it is determined that the time-base pixel difference Δt is equal to or greater than the predetermined pixel difference, the pixel difference determining unit 412 determines that the time-base pixel difference Δt is not effective in the gradient operation in the subsequent stage, and skips over step S435 and proceeds to step S436.

In step S436, the temporal pixel difference calculating unit 411 determines whether processing on all the pixels in the operation block has finished. If the temporal pixel difference calculating unit 411 has determined that the processing on all the pixels in the operation block has not finished, the process returns to step S432, and selects the next pixel to repeat the subsequent steps. If, in step S436, the temporal pixel difference calculating unit 411 has determined that the processing on all the pixels in the operation block has finished, the effective pixel determining process ends before returning to step S404 in FIG. 34.

In the above process, the effective pixel counter 413 has the counted number of pixels in each of which the pixel difference Δt is less than the predetermined pixel difference and the pixel is effective in the gradient operation in the subsequent stage. Accordingly, by referring to the number of pixels of the effective pixel counter 413 in step S404 in FIG. 34, the gradient operation continuation determining unit 414 can determine whether to perform the block-unit gradient operation or whether to the pixel-unit gradient operation.

Figure 36:
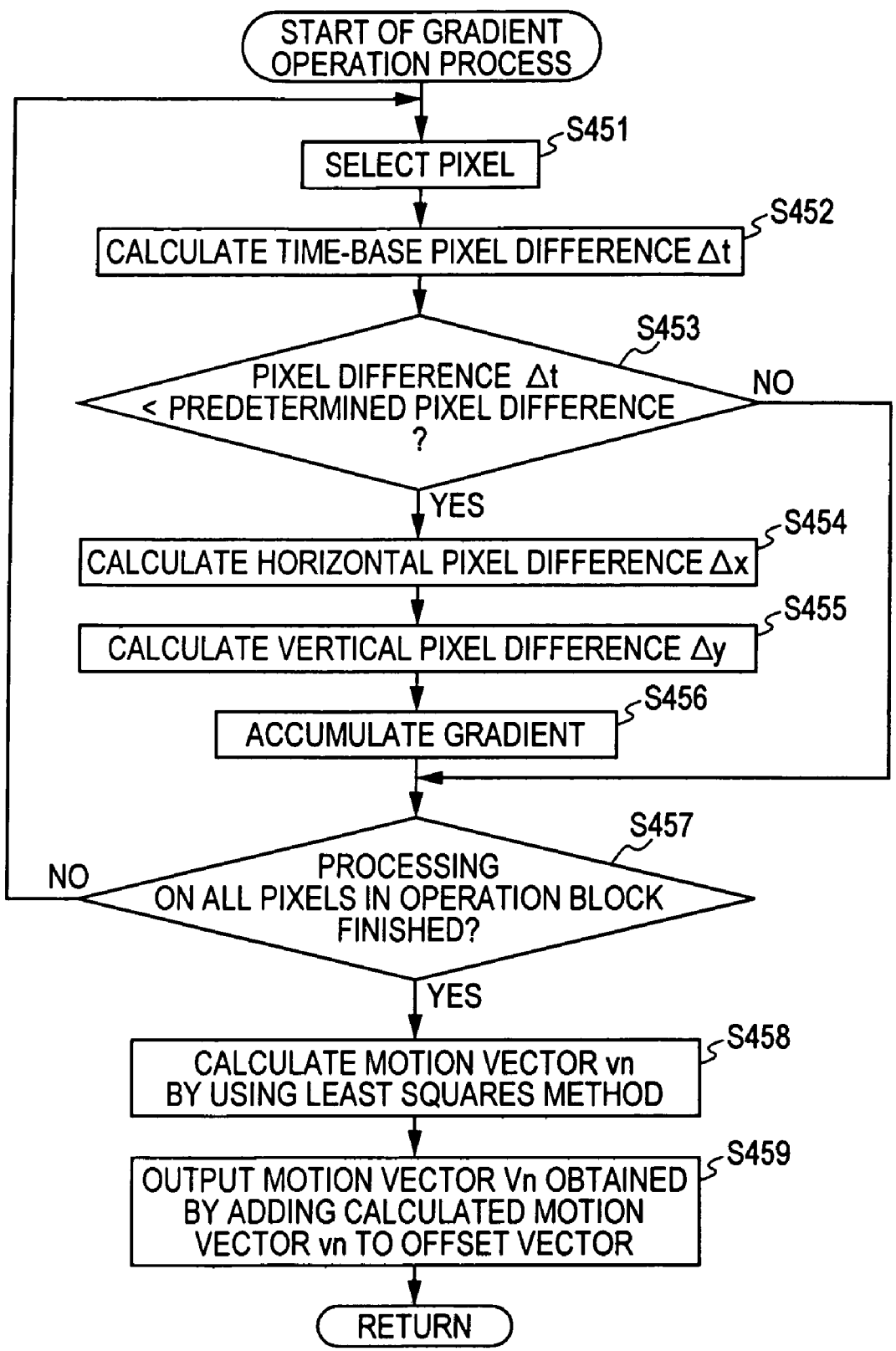
FIG. 36 is a flowchart illustrating the gradient operation process.

Next, details of the block-unit gradient operation process are described below with reference to the flowchart shown in FIG. 36. FIG. 36 shows an example of the block-unit gradient operation process in step S405 in FIG. 34. Accordingly, in the example in FIG. 36, the flag (flg=1) for executing the gradient operation is input from the gradient operation continuation determining unit 414 to the temporal pixel difference calculating unit 421.

When the flag (flg=1) is input from the gradient operation continuation determining unit 414, in step S451, the temporal pixel difference calculating unit 421 selects a pixel in the block-unit operation block and proceeds to step S452. Pixels are selected from the top left end pixel in the operation block in raster scanning order.

In step S452, by using the offset vector from the selector 402, and frame t at time t and frame t+1 at time t+1 which are respectively input through the prefilters 102-2 and 102-1, the temporal pixel difference calculating unit 421 calculates time-base pixel difference Δt of the selected pixel, and outputs the calculated time-base pixel difference Δt and the offset vector to the pixel difference determining unit 422. The process proceeds to step S453.

In step S453, the pixel difference determining unit 422 determines whether the time-base pixel difference Δt calculated by the temporal pixel difference calculating unit 421 is less than a predetermined pixel difference, that is, whether the selected pixel is effective in the gradient operation in the subsequent stage. If it is determined that the time-base pixel difference Δt is less than the predetermined pixel difference, the process proceeds to step S454, and the pixel difference determining unit 422 controls the horizontal-and-vertical pixel difference calculating unit 423 to calculate a horizontal pixel difference Δx of the pixel determined to be effective. The predetermined pixel difference in the pixel difference determining unit 422 may be either equal to or different from the predetermined pixel difference in the temporal pixel difference calculating unit 421. At this time, the pixel difference determining unit 422 outputs the calculated time-base pixel difference Δt calculated by the temporal pixel difference calculating unit 421 and the offset vector to the horizontal-and-vertical pixel difference calculating unit 423.

In step S454, by using the offset vector, and frame t at time t and frame t+1 at time t+1 which are respectively input through the prefilters 102-2 and 102-1, the horizontal-and-vertical pixel difference calculating unit 423 calculates horizontal pixel difference Δx of the pixel determined to be effective. Proceeding to step S455, the horizontal-and-vertical pixel difference calculating unit 423 calculates vertical pixel difference Δy of the pixel determined to be effective, and outputs the time-base pixel difference Δt, horizontal pixel difference Δx, and vertical pixel difference Δy to the gradient accumulation unit 424. The process proceeds to step S456.

In step S456, the gradient accumulation unit 424 accumulates the time-base pixel difference Δt, horizontal pixel difference Δx, and vertical pixel difference Δy, and outputs the accumulated result to the vector calculating unit 425. The process proceeds to step S457.

If, in step S453, it is determined that the time-base pixel difference Δt is equal to or greater than the predetermined pixel difference, the pixel difference determining unit 422 skips over steps S454 to 456 and proceeds to step S457. In other words, the pixel differences (gradient) of the pixel indicates that the pixel is not used in the gradient operation since it is not effective in the gradient operation in the subsequent stage.

In step S457, the temporal pixel difference calculating unit 421 determines whether processing on all the pixels in the operation block has finished. If it is determined that the processing on all the pixels in the operation block has not finished, the process returns to step S451, and selects the next pixel to repeat the subsequent steps. Alternatively, if, in step S457, it is determined that the processing on all the pixels in the operation block has finished, the temporal pixel difference calculating unit 421 outputs the offset vector to the vector calculating unit 425, and the process proceeds to step S458. When receiving the offset vector from the temporal pixel difference calculating unit 421, the vector calculating unit 425 calculates motion vector vn by using the gradient accumulation result from the gradient accumulation unit 424 and the least squares method in Expression (9), and proceeds to step S459. The vector calculating unit 425 calculates motion vector Vn by adding the calculated motion vector vn to the offset vector from the temporal pixel difference calculating unit 421, and outputs the calculated motion vector Vn to the vector evaluating unit 104. The gradient operation process ends and returns to step S406 in FIG. 34.

As described above, when time-base pixel difference Δt is equal to or greater than a set predetermined pixel difference, the pixel is regarded as having a possibility of generating irregularity in movement, and is thus excluded from the gradient operation in the case of motion vector detection. Thus, more stable gradient operation is executed, so that a probable motion vector is detected, thus improving the accuracy of motion vector detection.

Figure 37:
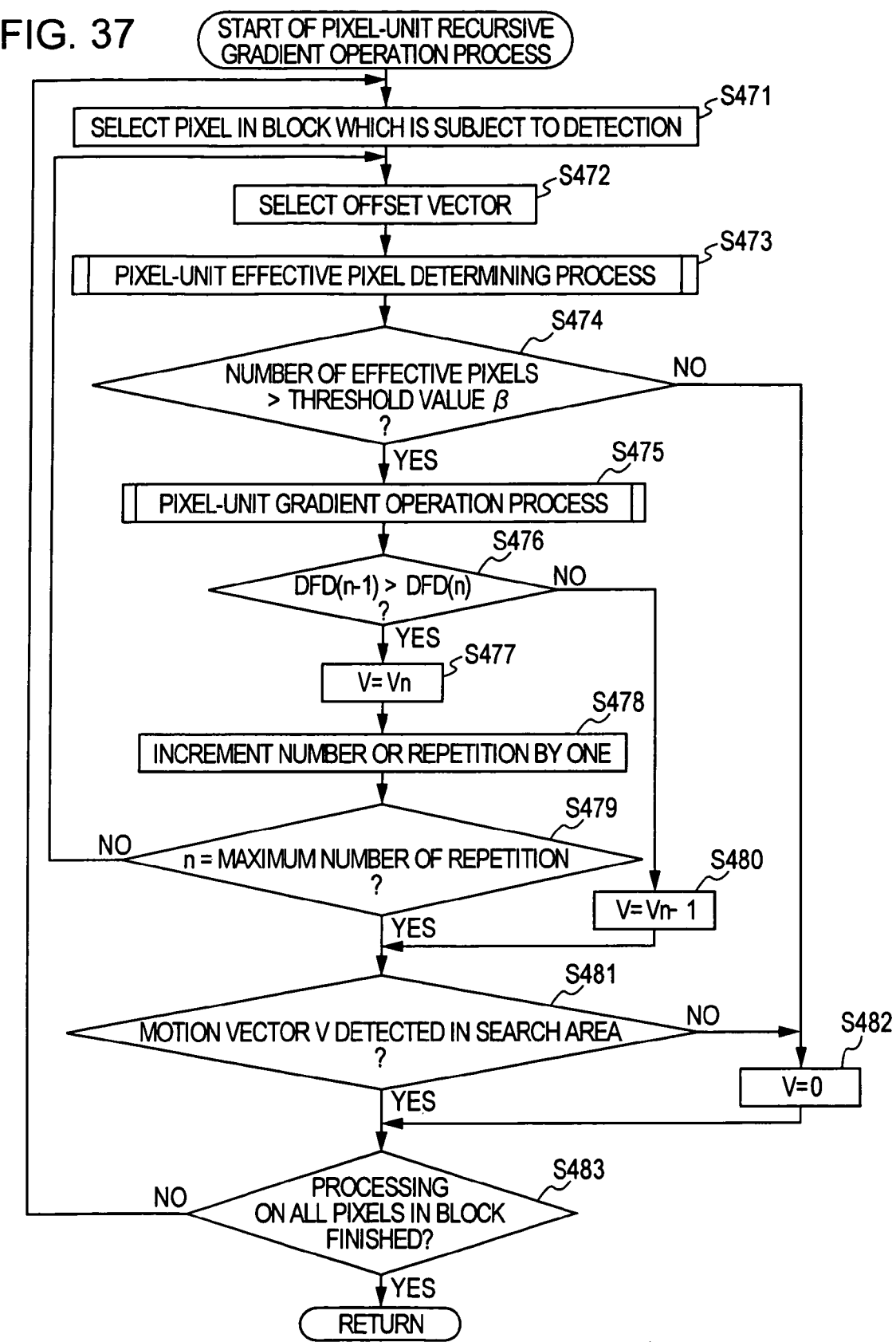
FIG. 37 is a flowchart illustrating a pixel-unit recursive gradient operation process.

Next, details of the pixel-unit recursive gradient operation process are described below with reference to the flowchart shown in FIG. 37. FIG. 37 shows an example of the pixel-unit recursive gradient operation process in step S414 in FIG. 34. This process is executed for each pixel in the detection block.

After setting the pixel-unit processing mode, in step S471, the mode selecting unit 401 selects a pixel in the detection block as a pixel which is subject to detection, and outputs the initial vector V0 of the pixel in an operation block (e.g., 9 by 9 pixels) to the selector 402 and the vector evaluating unit 104. The process proceeds to step S472. Pixels are selected from the top left end pixel in the detection block in raster scanning order. In step S472, in response to control by the vector evaluating unit 104, the selector 402 selects the initial vector V0 input from the mode selecting unit 401 as an offset vector, and outputs the selected offset vector to the temporal pixel difference calculating unit 411 and the temporal pixel difference calculating unit 421. The process proceeds to step S473.

In step S473, the temporal pixel difference calculating unit 411 and the pixel difference determining unit 412 execute the pixel-unit effective pixel determining process by using the selected offset vector (by using the initial vector V0 as an offset), and the process proceeds to step S474. A detailed description of the details of the effective pixel determining process is omitted since basically similar processing is performed, excluding that the block-unit effective pixel determining process described with reference to FIG. 5 and the operation block (block range and pixels constituting the block), which is subject to processing, differ. In the effective pixel determining process, the effective pixel counter 413 has a counted number of pixels each determined to have, in a pixel-unit operation block, the pixel difference less than the predetermined pixel difference, that is, to be effective in the gradient operation in the subsequent stage. The predetermined pixel difference for use in effective pixel determination in units of pixels may be either equal to or different from the value in the case of determination in units of blocks.

In step S474, the gradient operation continuation determining unit 414 determines whether the counted number of pixels (the number of effective pixels) in the effective pixel counter 413 is greater than a predetermined threshold value β. If it is determined that the number of effective pixels is greater than the predetermined threshold value β, the gradient operation continuation determining unit 414 outputs a flag (flg=1) for executing the gradient operation, and proceeds to step S475. Also the threshold value β may be either equal to or different from the threshold value α in the block-unit case.

In step S475, based on the flag from the gradient operation continuation determining unit 414, the gradient operation unit 404 executes the pixel-unit gradient operation process by using the offset vector (the initial vector V0) from the selector 402, and the process proceeds to step S476. A detailed description of the gradient operation process is omitted since basically similar processing is performed, excluding that the block-unit gradient operation process described with reference to FIG. 36 and the operation block (range and pixels constituting the block), which is subject to processing, differ.

This gradient operation process finds the motion vector Vn of the pixel, which is subject to detection, and outputs the obtained motion vector Vn to the vector evaluating unit 104 and the delay unit 405. The motion vector Vn is the sum (Vn=Vn−1+vn) of the motion vector vn obtained by the first gradient operation and the offset vector.

In step S476, the vector evaluating unit 104 finds an evaluated value DFD(n) of the motion vector Vn calculated by the gradient operation process and an evaluated value DFD(n−1) of the motion vector Vn−1 used as the offset, and determines whether the evaluated value DFD(n) is less than the evaluated value DFD(n−1), that is, whether the motion vector Vn calculated by the gradient operation process is higher reliable than the motion vector Vn−1 used as the offset.

If, in step S476, it is determined that he evaluated value DFD(n) is less than the evaluated value DFD(n−1), that is, the motion vector Vn is higher reliable than the motion vector Vn−1, in step S477, the calculated motion vector Vn (a motion vector V1 in the first time, motion vector v2 in the second time) is set as the motion vector V of the pixel which is subject to detection, and the process proceeds to step S478. In step S478, the vector evaluating unit 104 increments the number n of repetition by one. Proceeding to step S479, the vector evaluating unit 104 determines whether the number n of repetition has reached the maximum number of repetition (e.g., 2). If it is determined that the number n of repetition has not reached the maximum number of repetition, the vector evaluating unit 104 controls the selector 402 to return to step S472 to repeat the subsequent steps.

In other words, in step S472, the motion vector V1 stored in the delay unit 405 after being output from the vector calculating unit 425 is selected as the offset vector by the selector 402. In step S473, the temporal pixel difference calculating unit 411 and the pixel difference determining unit 412 offsets the motion vector V1, which is the offset vector, and executes the pixel-unit effective pixel determining process to repeat the subsequent steps. Thus, the motion vector V2 obtained in step S475 is the sum (V2=V0+v1+v2) of the motion vector V2 calculated in the second gradient operation and the motion vector V1 as the offset.

If, in step S476, it is determined that the evaluated value DFD(n) is greater than the evaluated value DFD(n−1), that is, the motion vector Vn−1 is higher reliable than the motion vector Vn, the process proceeds to step S480. In step S480, the motion vector Vn−1 (initial vector V0 in the first time, motion vector V1 in the second time) used as the offset in the gradient operation is set as the motion vector V in the detection block, and the process proceeds to step S481. In addition, if, in step S479, the number n of repetition has reached the maximum number of repetition, the vector evaluating unit 104 proceeds to step S481.

In step S481, the vector evaluating unit 104 determines whether the motion vector V is in a search area set beforehand as a motion vector detecting range. If it is determined that the motion vector V is in the search area, the process proceeds to step S483. If, in step S481, it is determined that the motion vector V is not in the search area, the process proceeds to step S482, and the motion vector V is set as a zero vector. The process proceeds to step S483.

If, in step S473, it is determined that the pixel of effective pixels in the effective pixel counter 413 is less than the predetermined threshold value β, the gradient operation continuation determining unit 414 outputs, to the gradient operation unit 404, a flag (flg=0) for aborting the gradient operation, and the process proceeds to step S482. The temporal pixel difference calculating unit 421 controls the vector calculating unit

425 based on the flag, and sets the motion vector V as a zero vector. The process proceeds to step S483.

In step S483, the mode selecting unit 401 determines whether processing on all the pixels in the detection block has finished. If it is determined that the processing on all the pixels in the detection block has not finished, the process returns to step S471. The next pixel in the detection block is used as a pixel which is subject to detection, and the subsequent steps are repeated. If, in step S483, it is determined that the processing on all the pixels in the detection block has finished, the mode selecting unit 401 finishes the pixel-unit recursive gradient operation process, and returns to step S415 in FIG. 34. In other words, the pixel-unit recursive gradient operation process finds the motion vectors V of all the pixels in the detection block, the process returns to step S415 in FIG. 34, and the vector evaluating unit 104 store each motion vector V in the detected vector memory 53 in a form associated with each pixel in the detection block. After that, the recursive gradient operation process ends.

In evaluation of motion vector reliability in step S476, similarly to the case of step S406, both determination based on the evaluated value DFD and determination based on the norm may be used in combination.

As described above, by using, for the gradient operation, only pixels in each of which the pixel difference in the operation block is less than the predetermined pixel difference, pixels having different movements can be excluded from a block for which arithmetic operation is to be performed, so that motion vector probability obtained by the gradient operation is improved, thus improving the accuracy of motion vector detection.

In addition, when the number of pixels, which are not used in the gradient operation since a pixel difference in the operation block is greater than a predetermined pixel difference, is greater than a predetermined threshold value, the gradient operation process is adaptively controlled. Thus, in particular, in a movement boundary between objects, the accuracy of motion vector detection can be improved, so that more probable motion vectors can be obtained.

Specifically, when the number of pixels, which are not used in the gradient operation since the pixel difference in the operation block is greater than the predetermined pixel difference, is greater than the predetermined threshold value, the block-unit mode is switched to the pixel-unit mode, an operation block is set for each pixel in a detection block, and the effective pixel determining process and the gradient operation process are performed. Thus, more accurate detection of motion vector can be performed. In addition, when the number of pixels, which are not used in the gradient operation since the pixel difference in the operation block is greater than the predetermined pixel difference, is greater than the predetermined threshold value, irregular motion vector detection can be suppressed, thus enabling more secure motion vector detection.

Next, details of the configuration of the vector allocating unit 54 are described below.

Figure 38:
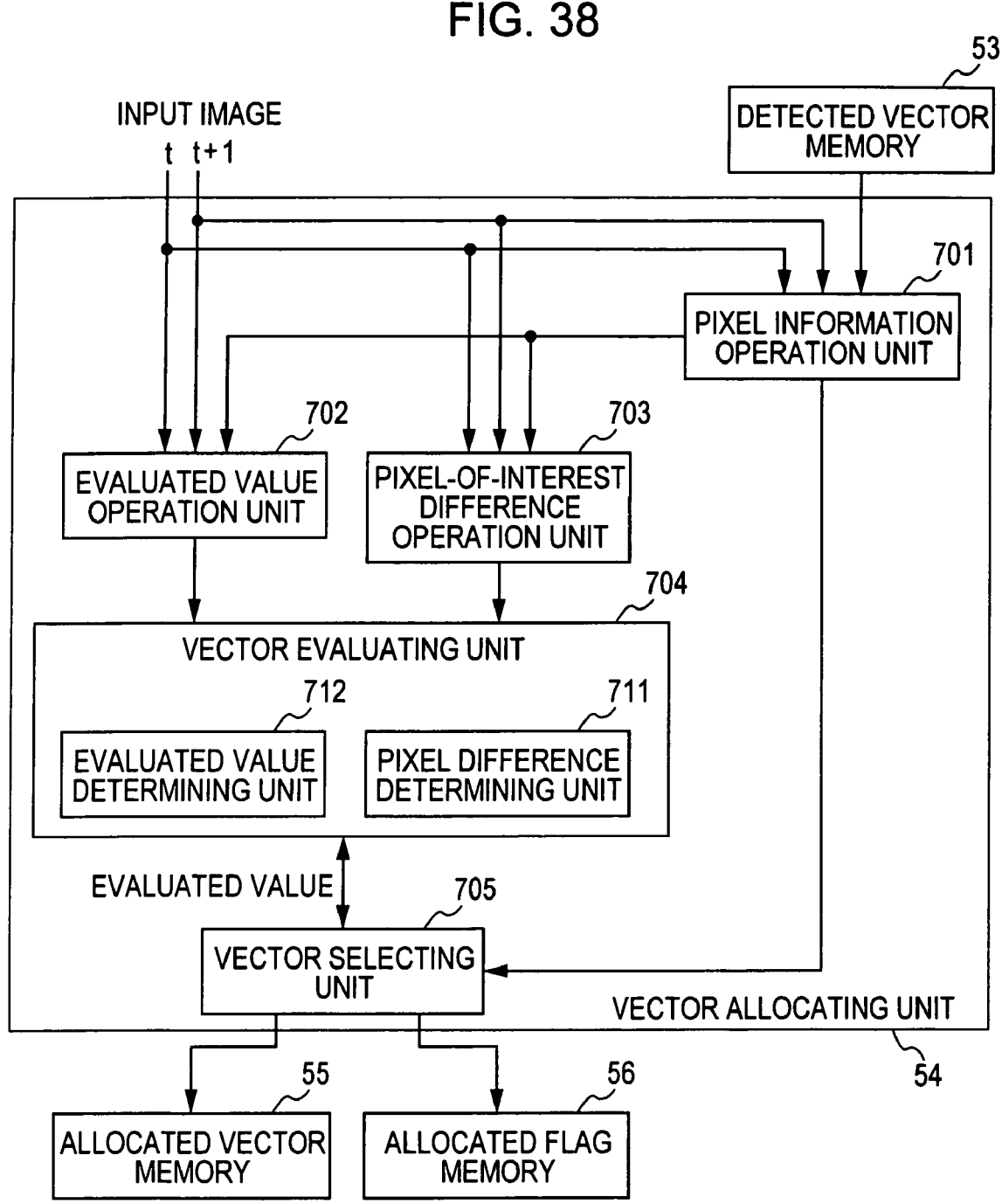
FIG. 38 is a block diagram showing the configuration of the vector allocating unit.

FIG. 38 is a block diagram showing the configuration of the vector allocating unit 54 shown in FIG. 2. In the vector allocating unit 54 having the configuration shown in FIG. 38, by using frame t at time t and frame t+1 at time t+1 of the 24P-signal image, a motion vector detected in frame t is allocated to an interpolated frame (in the allocated vector memory 55) for interpolation.

In the example shown in FIG. 38, frame t at time t and frame t+1 at time t+1 are input to a pixel information operation unit 701, an evaluated value operation unit 702, and a pixel-of-interest difference operation unit 703.

The pixel information operation unit 701 acquires motion vectors detected from pixels in frame t in the detected vector memory 53 from the top left end pixel in raster scanning order, extends each acquired motion vector in the direction of frame t+1 at the next time, and calculates a point of intersection between the extended motion vector and the interpolated frame. From the point of intersection between the calculated motion vector and the interpolated frame, the pixel information operation unit 701 sets a pixel (hereinafter also referred to as an "allocation pixel") to which the motion vector is to be allocated, and outputs the motion vector and information of the allocation pixel to a vector selecting unit 705. In addition, the pixel information operation unit 701 calculates position P in frame t and position Q in frame t+1 which are associated with the allocation pixel by the motion vector, and outputs the calculated positional information concerning frame t and frame t+1 to the evaluated value operation unit 702 and the pixel-of-interest difference operation unit 703.

When receiving, from the pixel information operation unit 701, the allocation pixel and the positional information concerning frame t and frame t+1 which are associated by the motion vector, the evaluated value operation unit 702 sets a DFD operation range (m by n pixels) around position P and a DFD operation range (m by n pixels) around position Q in order to perform operation to find evaluated values DFD at positions P and Q in frame t and t+1, and determines whether each DFD operation range is positioned in the image frame. If it is determined that each DFD operation range is positioned in the image frame, the evaluated value operation unit 702 finds evaluated value DFD of the allocation pixel for the motion vector by using the DFD operation range to perform operation, and outputs the obtained evaluated value DFD to the vector evaluating unit 704.

When receiving, from the pixel information operation unit 701, the allocation pixel and the positional information concerning frame t and frame t+1 which are associated by the motion vector, the pixel-of-interest difference operation unit 703 uses position P in frame t and position Q in frame t+1 to find the absolute value of luminance difference for the allocation pixel, and outputs the obtained absolute value of luminance difference to the vector evaluating unit 704.

The vector evaluating unit 704 includes a pixel difference determining unit 711 and an evaluated value determining unit 712. The pixel difference determining unit 711 determines whether the absolute value of luminance difference (for the allocation pixel) input from the pixel-of-interest difference operation unit 703 is less than a predetermined threshold value. If the pixel difference determining unit 711 has determined that the absolute value of luminance difference (for the allocation pixel) input from the pixel-of-interest difference operation unit 703 is less than the predetermined threshold value, the evaluated value determining unit 712 determines whether the evaluated value DFD (of the allocation pixel) input from the evaluated value operation unit 702 is less than a minimum evaluated value in a DFD table in the vector selecting unit 705. If it is determined that the evaluated value DFD (of the allocation pixel) input from the evaluated value operation unit 702 is less than a minimum evaluated value in the DFD table, the evaluated value determining unit 712 determines that the motion vector corresponding to the allocation pixel is highly reliable, and outputs the evaluated value DFD of the allocation pixel to the vector selecting unit 705.

The vector selecting unit 705 has the DFD table, which stores minimum evaluated values of pixels in the interpolated frame. For each pixel in the interpolated frame, evaluated value DFD obtained when a zero vector is allocated is stored beforehand as a minimum evaluated value of each pixel in the interface in the DFD table. When receiving the evaluated value DFD of the allocation pixel from the vector evaluating unit 704, the vector selecting unit 705 rewrites a flag of the allocation flag memory 56 into one (true) based on positional information of the allocation pixel, and rewrites the minimum evaluated value for the allocation pixel in the DFD table by the evaluated value DFD of the allocation pixel. In addition, based on the positional information of the allocation pixel from the pixel information operation unit 701, the vector selecting unit 705 allocates the motion vector from the pixel information operation unit 701 to the allocation pixel in the allocated vector memory 55.

Next, motion vector accuracy below pixel size is described below. In the DFD evaluation operation represented by Expression (1), it is common that phase p+v in frame t+1 obtained by shifting pixel position p in frame t by vector v does not actually coincide with a pixel position in frame t+1 of 24P signal, and a luminance in such a case is not defined. Accordingly, in order to perform the evaluated value DFD for motion vector v having accuracy below pixel size, a luminance in phase below pixel size must be generated by some method.

In a method corresponding thereto, the luminance of a pixel having a phase closest to phase p+v in frame t+1 obtained by shifting pixel position p in frame t by vector v is used in unchanged form. However, in this method, a component of the evaluated motion vector below pixel size is rounded. Thus, it may be said that the component of the evaluated motion vector below pixel size is discarded. Thus, the obtained evaluated value DFD has low reliability.

Figure 39:
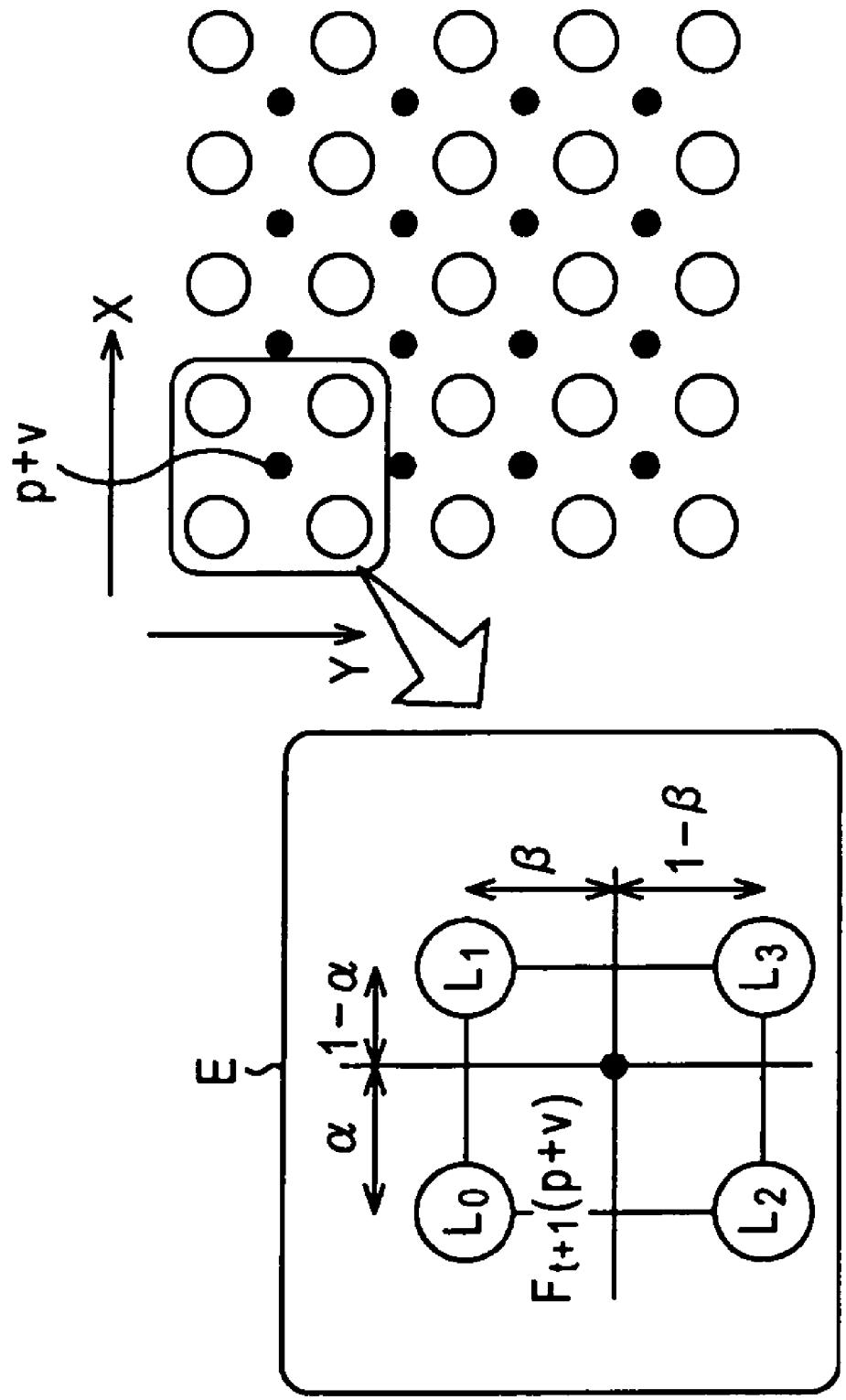
FIG. 39 is an illustration of a four-point interpolation process in the present invention.

Accordingly, the present invention uses a four-point interpolation process based on the luminances of four peripheral pixels. FIG. 39 is an illustration of the concept of the four-point interpolation process in the present invention. In FIG. 39, the arrow X indicates the horizontal direction of frame t+1, and the arrow Y indicates the vertical direction of frame t+1. In frame t+1, the white circles indicate pixel positions in frame t+1, and the black circles indicate positions below pixel size. The top left end black dot p+v and four peripheral pixels in frame t+1 are shown enlarged in window E. In window E, the alphanumerical symbols in the white circles represent the luminances of the four peripheral pixels.

Assuming that the top left end black dot p+v in frame t+1 is phase p+v of a pixel position obtained by shifting pixel position p in frame t by vector v, the luminance $F_{t+1}(p+v)$ of phase p+v is found by the sum of the reciprocal ratios of distances to the four peripheral pixels by using horizontal component α below pixel size, vertical component β below pixel size, and the luminances L0 to L4 of the four peripheral pixels in phase p+v. In other words, luminance $F_{t+1}(p+v)$ is represented by the following expression:

$$F_{t+1}(p+v) = (1-\alpha)(1-\beta)L0 + \alpha(1-\beta)L1 + (1-\alpha)\beta L2 + \alpha\beta L3 \quad (12)$$

As described above, by performing arithmetic operation for the DFD evaluation by using the luminance $F_{t+1}(p+v)$ obtained in the four-point interpolation process, the reliability of the evaluated value DFD can be prevented from decreasing without increasing a hardware implementation cost. The following description is directed to an example in which the four-point interpolation process is applied to arithmetic operations for values such as the evaluated value DFD and the absolute value of luminance difference in vector allocation. Obviously, also in operation for the above-described initial vector selecting process and vector detecting process, and operation for the evaluated value DFD in the case of vector evaluation, such as an allocation compensating process (described later), the four-point interpolation process is used.

Next, the concept of the vector allocating process is described below. By way of example, when it is assumed that an object moves at velocity v on a 24P-signal image, and it is assumed that, between two arbitrary frames, uniform velocity assumption holds concerning the movement of this object, it is possible that a new frame be interpolated. In this case, when motion vector v is extended from the 24P-signal object, a point of intersection between motion vector v and the interpolated frame is in the same object and has the same velocity v.

Therefore, by allocating a motion vector in the 24P-signal frame (hereinafter also referred to as the "original frame" in comparison with the interpolated frame) detected by the detected vector memory 53 to a point of intersection between the motion vector and a 60P-signal interpolated frame to be interpolated, the movement of each pixel in the interpolated frame can be found. Conversely, from the allocated motion vector, it can be found from which position a pixel in the interpolated frame has been moved in the 24P-signal frame.

Figure 40:
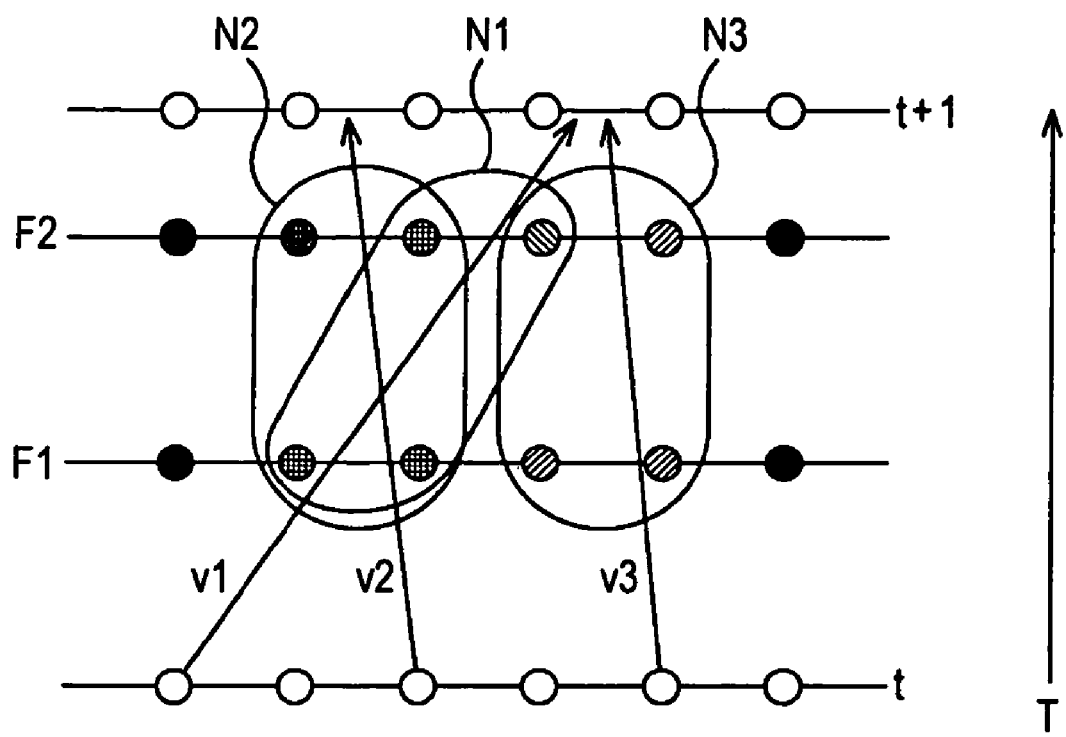
FIG. 40 is an illustration of an overview of the vector allocating process.

FIG. 40 shows, in one-dimensional form, examples of motion vectors detected in the 24P-signal original frame and pixels in the interpolated frame. In FIG. 40, for example, two interpolated frames, interpolated frame F1 at time t+0.4 and interpolated frame F2 at time t+0.8 are inserted between two frames, 24P-signal frame t at time t and 24P-signal frame t+1 at time t+1. As described above, the positions of these interpolated frames are set beforehand in the signal processing apparatus 1 based on the fact that the 60P-signal frame is disposed at a position whose time phase on the 24P signal is 0.0, 0.4, 0.8, 1.2, and 1.6.

The circles in each frame indicate pixels. The motion vectors v1, v2, and v3 detected in frame t by the vector detecting unit 52 in the previous stage are extended in the direction of frame t+1. When these motion vectors are allocated to the pixels in interpolated frames F1 and F2, a motion vector passing in the vicinity of each pixel in each interpolated frame serves as a candidate vector (hereinafter also referred to as an "allocation candidate vector") allocated to the pixel.

Therefore, motion vector v1, directed from the left end pixel in frame t to the vicinity of the fourth and fifth pixels from the left in frame t+1, passes between the second and third pixels from the left in interpolated frame F1, and passes between the third and fourth pixels from the left in interpolated frame F2. Hence, motion vector v1 serves as an allocation candidate vector to be allocated to pixels (the second and third pixels from the left in interpolated frame F1 and the third and fourth pixels from the left in interpolated frame F2) included in neighborhood N1 of points at which motion vector v1 intersects with interpolated frames F1 and F2.

Motion vector v2, directed from the third pixel from the left in frame t to a neighborhood of the second and third pixels, passes between the second and third pixels from the left interpolated frame F1, and passes between the second and third pixels from the left interpolated frame F2. Therefore, vector V2 serves as an allocation candidate vector to be allocated to pixels (the second and third pixels from the left in interpolated frame F1 and the second and third pixels from the left in interpolated frame F2) included in neighborhood N2 of points at which vector V2 intersects with interpolated frames F1 and F2.

Motion vector v3, directed from the fifth pixel from the left in frame t to a neighborhood of the fourth and fifth pixels from the left in frame t+1, passes between the fourth and fifth pixels from the left in interpolated frame F1, and passes between the fourth and fifth pixels from the left interpolated frame F2. Accordingly, motion vector V3 serves as an allocation candidate vector to be allocated to pixels (the fourth and fifth pixels from the left interpolated frame F1 and the fourth and fifth pixels from the left in interpolated frame F2) included in neighborhood N3 at which motion vector V3 intersects with interpolated frames F1 and F2.

In other words, an allocation candidate vector for the second pixel from the left interpolated frame F2 is vector V2, and Allocation candidate vectors for the second and third pixels from the left interpolated frame F1 and the third pixel from the left in interpolated frame F2 are motion vectors v1 and v2. Allocation candidate vectors for the fourth pixel from the left interpolated frame F2 are motion vectors v1 and v3, and An allocation candidate vector for the fourth and fifth pixels from the left in interpolated frame F1 and the fifth pixel from the left in interpolated frame F2 is motion vector V3.

As described above, from among motion vectors detected in the original frame, allocation candidate vectors to be allocated to pixels in interpolated frames are found. Regarding the left end pixels and the right end pixels in interpolated frames F1 and F2, vectors passing in neighborhoods are not shown. In other words, the left end pixels and the right end pixels in interpolated frames F1 and F2 have no allocation candidate vectors to be allocated. Therefore, for these pixels, the allocation compensating process is executed by the allocation compensating unit 57 in the subsequent stage, which is described later.

A motion vector detected in the original frame and pixels in a 60P-signal interpolated frame are described in detail with reference to FIG. 41. In the example shown in FIG. 41, the arrow T indicates a direction of lapse of time from frame t at time t, which is positioned on the left side of the foreground in FIG. 41, to frame t+1 at time t+1, which is positioned on the right side of the background in FIG. 41. Interpolated frame F1 is disposed at time t+post between time t and time t+1.

Figure 41:
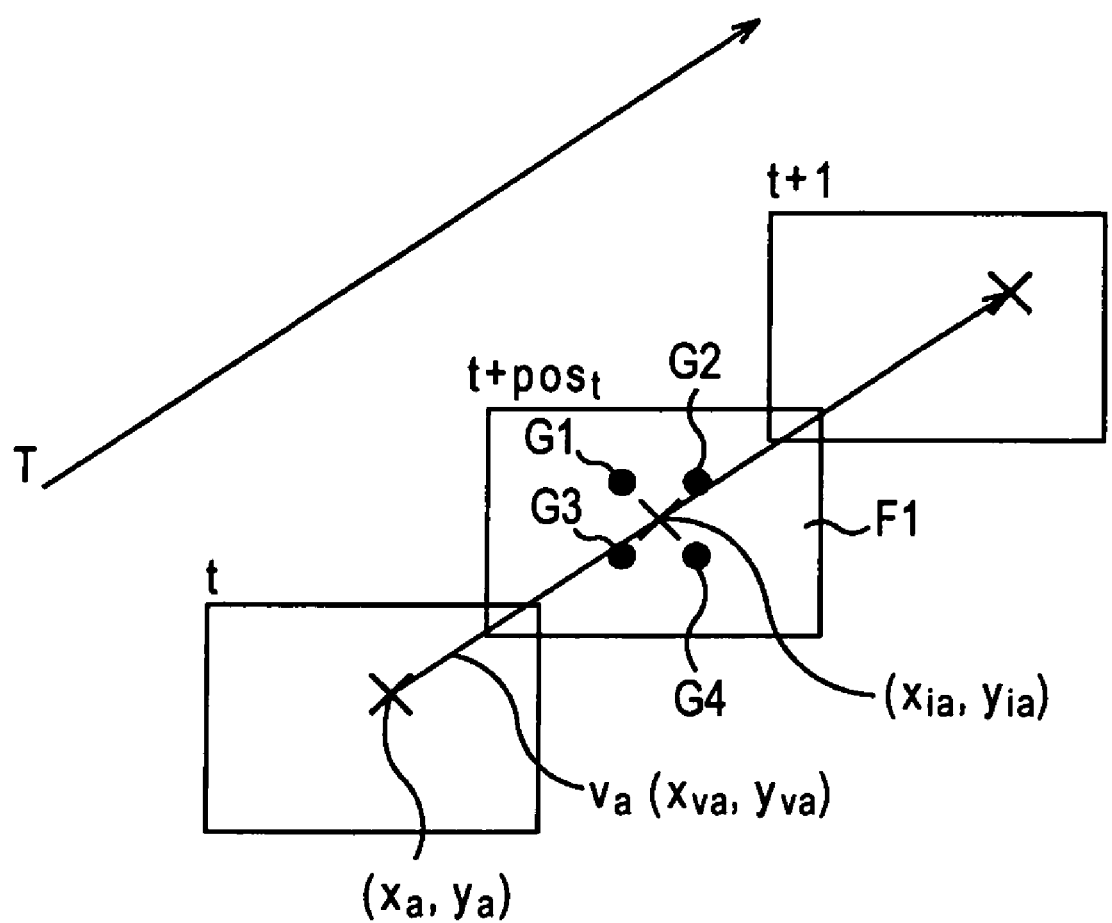
FIG. 41 is an illustration of an example of a pixel in a neighborhood of a point of intersection between a motion vector and an interpolated frame.

In the case shown in FIG. 41, motion vector $v_a(x_{va}, y_{va})$ detected at pixel $(x_a, y_a)$ in frame t is extended in the direction of frame t+1, and point $(x_{ia}, y_{ia})$ of intersection between the extended motion vector and interpolated frame F1 is calculated. The point of intersection is a point obtained such that a pixel at an end point of motion vector $v_a$ in 24P-signal frame t is moved. Thus, the point of intersection is represented by the following expressions:

$$x_{ia} = x_a + pos_t x_{va} \quad (13)$$

$$y_{ia} = y_a + pos_t y_{va} \quad (14)$$

As described above, when motion vector $v_a$ has accuracy below pixel size, the point of intersection of motion vector $v_a$ does not always coincide with the pixel position in interpolated frame F1. When both do not coincide with each other, as shown in FIG. 41, motion vector $v_a$ is allocated to four pixels G1 to G4 in a neighborhood of the point of intersection in interpolated frame F1. In other words, motion vector $v_a$ is shifted (translated) to pixels G1 to G4 in the neighborhood and are used as and allocation candidate vector to be allocated to each pixel. After that, the allocation compensating process is executed.

In such a case, one motion vector may be used as a candidate vector to be allocated to four pixels in the neighborhood. Thus, plural motion vectors are used as allocation candidate vectors depending on pixels. In this case, by calculating a point of intersection in the original frame for each motion vector between a pixel in the interpolated frame and a position in the original frame which is associated by the motion vector, and using the point of intersection, the vector allocating unit 54 finally determines a motion vector to be allocated to a pixel in the interpolated frame.

Figure 42:
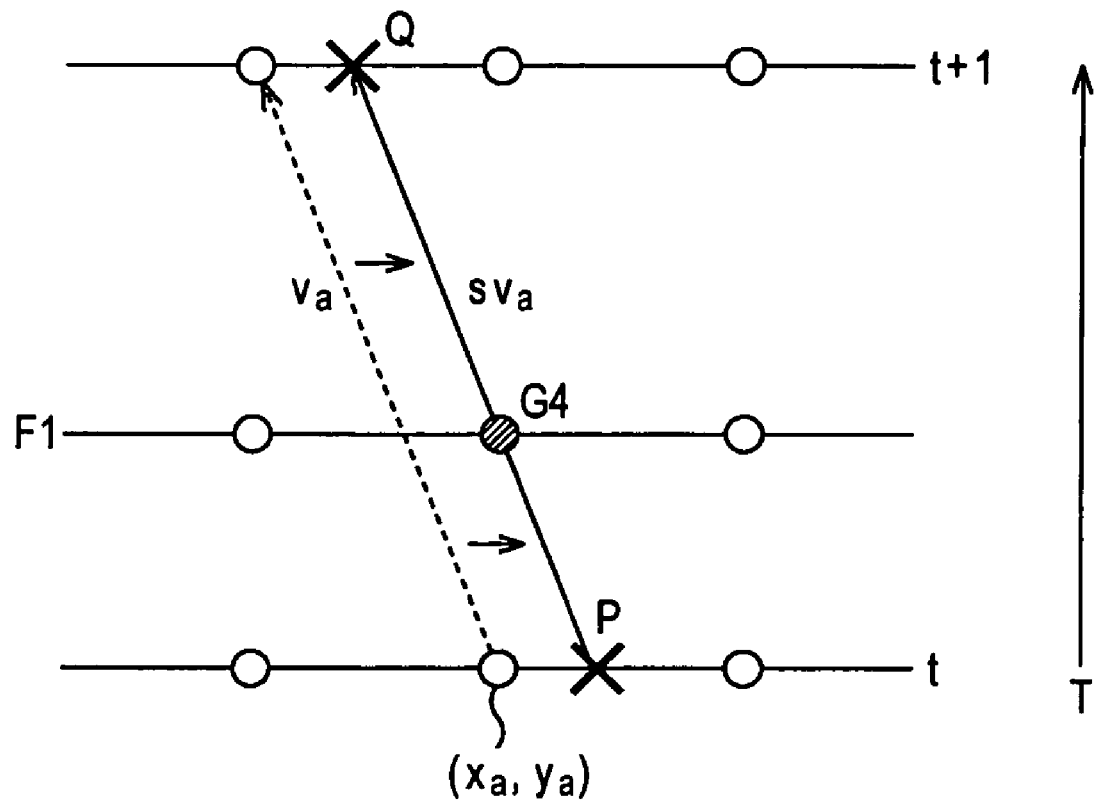
FIG. 42 is an illustration of a method for evaluating a candidate motion vector for allocation.

Motion vector evaluation by the vector allocating unit 54 is described with reference to FIG. 42. FIG. 42 shows, in one-dimensional form from the bottom, frame t at time t, interpolated frame F1 at time t+post, and frame t+1 at time t+1, which are shown in FIG. 41.

In the example shown in FIG. 42, motion vector $sv_a$ is obtained such that motion vector $v_a$ detected in pixel $(x_a, y_a)$ in frame t is shifted (translated) as an allocation candidate vector for neighboring pixel G4 to pixel G4. In FIG. 42, points of intersection of motion vector $sv_a$ (obtained such that motion vector $v_a$ detected in pixel $(x_a, y_a)$ in frame t is shifted) with frame t and frame t+1 are indicated by reference letters P and Q, respectively.

In first evaluation, the vector allocating unit 54 firstly finds DFD operation ranges around points P and Q, and determines whether the obtained the DFD operation ranges exceed the image frame. Accordingly, if the obtained the DFD operation ranges around points P and Q exceed the image frame, motion vector $sv_a$ is excluded from candidate vectors.

In addition, when points P and Q belong to different objects, the luminance $F_t(P)$ of point P and the luminance $F_{t+1}(Q)$ of point Q have a large difference. Accordingly, in second evaluation of motion vector $sv_a$, the vector allocating unit 54 finds the absolute value dp of luminance difference at pixel G4 by using points P and Q, and determines whether the absolute value dp of luminance difference is greater than a predetermined value. If it is determined that the absolute value dp of luminance difference is greater than the predetermined value, it is determined that motion vector $sv_a$ at pixel G4 has low reliability, and motion vector $sv_a$ is excluded from candidate vectors. The absolute value dp of luminance difference is represented by the following expression:

$$dp = |F_t(P) - F_{t+1}(Q)| \quad (15)$$

In third evaluation, the vector allocating unit 54 performs evaluation based on the absolute value of difference representing a correlation value on the DFD operation ranges around points P and Q. In other words, the vector allocating unit 54 finds an evaluated value DFD of motion vector $sv_a$ at pixel G4 by using the DFD operation ranges around pixels P and Q, and determines whether the obtained evaluated value DFD is less than the minimum evaluated value in the evaluated value DFD table. The vector allocating unit 54 allocates, to pixel G4, a motion vector detected by the above evaluation, whose evaluated value DFD is the minimum, among the obtained evaluated values DFD.

As described above, a motion vector as an allocation candidate vector at a pixel in an interpolated frame is evaluated by using not only an evaluated value DFD of an allocation pixel which is subject to allocation, but also the absolute value of luminance difference at the allocation pixel. Thus, a probable motion vector can be allocated to the allocation vector compared with the case of the related art of only using the evaluated value DFD. This results in improvement in accuracy of vector allocation.

As described above, in order to evaluate a motion vector as an allocation candidate vector at a pixel in an interpolated frame, a position in the original frame which is associated by the motion vector is used, with a pixel in the interpolated frame used as a reference. However, when finding the absolute value dp of luminance difference and evaluated value DFD, a point of intersection between the motion vector and the original frame may not coincide with the pixel position in the original frame because the motion vector as an allocation candidate vector is extended with the pixel position as a reference. Thus, it is impossible to find the pixel value if this state remains unchanged. In this case, the four-point interpolation process described with reference to FIG. 39 is executed.

Figure 43:
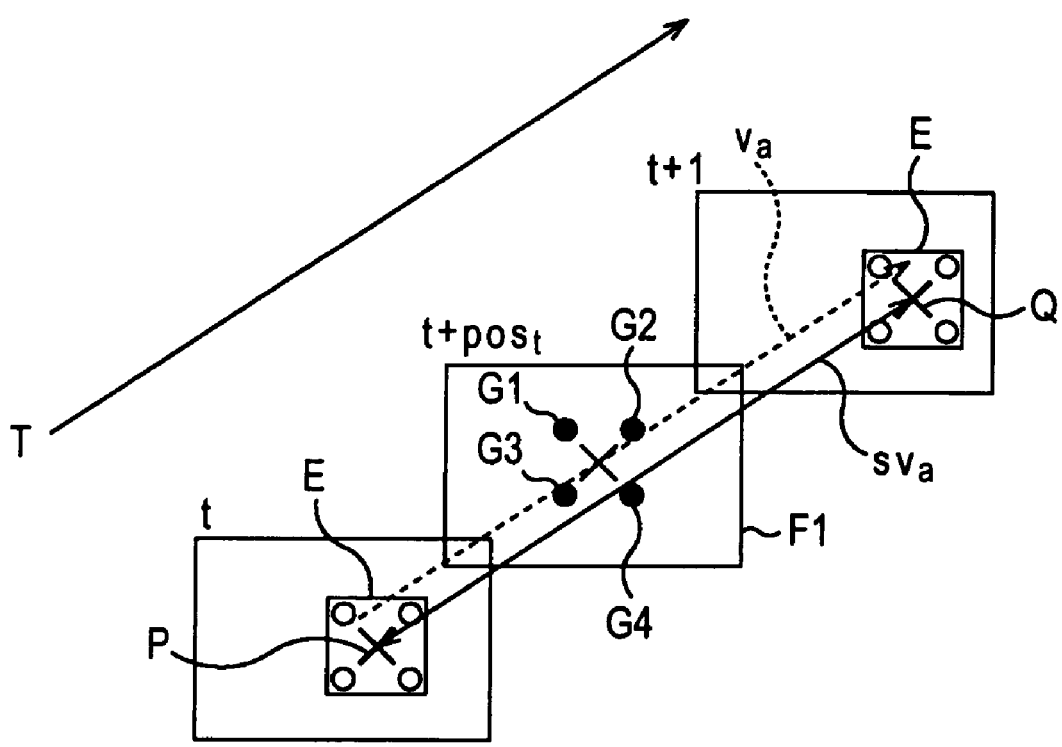
FIG. 43 is an illustration of an example of four-point interpolation in vector allocation.

FIG. 43 shows an example of four-point interpolation in the vector allocating process. In FIG. 43, portions corresponding to those shown in FIGS. 41 and 42 are denoted by corresponding reference symbols, and a repeated description of the corresponding portions is omitted.

In the example shown in FIG. 43, motion vector $sv_a$ is extended, with pixel position G4 in interpolated frame F1 used as a reference. Thus, point P of intersection between motion vector $sv_a$ and frame t does not coincide with a pixel position (while circle) in frame t, and, in addition, point Q of intersection between motion vector $sv_a$ and frame t+1 does not coincide with a pixel position (white circle) in frame t+1. Therefore, in frame t and frame t+1, by using four pixels (the white circles in frame t and frame t+1) in each of neighborhoods around points P and Q of intersection, the above-described four-point interpolation operation is performed to find pixel values at points P and Q of intersection.

Since, as described above, in the vector allocating process of the present invention, pixel values at points P and Q of intersection obtained by the four-point interpolation process are used to calculate the absolute value dp of luminance difference and evaluated value DFD, the absolute value dp of luminance difference and evaluated value DFD can be found with accuracy higher than that in the method of the related art that rounds components below pixel size.

Next, details of the vector allocating process are described below with reference to the flowchart shown in FIG. 44. Frame t at time t, which is the 24P-signal original frame, and frame t+1 at time t+1 are input to the pixel information operation unit 701, the evaluated value operation unit 702, and the pixel-of-interest difference operation unit 703.

When receiving the original frame, in step S701, the pixel information operation unit 701 controls the vector selecting unit 705 to initialize the allocation flag in the allocation flag memory 56 into zero (false), and proceeds to step S702. In step S702, the pixel information operation unit 701 controls the vector selecting unit 705 to initialize the allocation flag in the allocated vector memory 55 into a zero vector, and proceeds to step S703. As a result, a zero vector is allocated to a pixel having no motion vector allocated.

In step S703, the pixel information operation unit 701 controls the evaluated value operation unit 702 to calculate evaluated value DFD0 for each of all pixels in the interpolated frame by using the zero vector, and controls the vector selecting unit 705 to store, in the DFD table, the calculated evaluated value DFD0 for the zero vector as a minimum evaluated value for each pixel in the interpolated frame. The process proceeds to step S704. In other words, in step S703, the evaluated value operation unit 702 uses the zero vector to calculate evaluated value DFD0 for all the pixels in the interpolated frame, and outputs the calculated evaluated value DFD0 to the vector selecting unit 705 through the vector evaluating unit 704. The vector selecting unit 705 stores the evaluated value DFD0 input through the vector evaluating unit 704 as the minimum evaluated value of a corresponding pixel in the DFD table.

In step S704, the pixel information operation unit 701 selects a pixel from the original frame in the detected vector memory 53, and proceeds to step S705. In this case, pixels are selected from the left end pixel in raster scanning order.

In step S705, the pixel information operation unit 701 performs a pixel position operation process, and proceeds to step S706. Details of the pixel position operation process are described with reference to FIG. 45. In this pixel position operation process, an allocation pixel in the interpolated frame to which the motion vector detected at the pixel selected in step S704 is calculated, and a pixel position in the original frame which is associated by the motion vector is calculated, with the calculated allocation pixel used as a reference.

In step S706, the pixel information operation unit 701 selects the calculated allocation pixel, and outputs the selected allocation pixel and its motion vector to the vector selecting unit 705 before proceeding to step S707. At the same time, the pixel information operation unit 701 outputs, to the evaluated value operation unit 702 and the pixel-of-interest difference operation unit 703, information of the pixel position in the original frame which is associated by the motion vector. In step S706, when plural allocation pixels exist, the pixel information operation unit 701 selects the pixels from the left end pixel.

In step S707, the pixel information operation unit 701 executes an allocated vector evaluating process and proceeds to step S708. Details of the allocated vector evaluating process are described later with reference to FIG. 46. In the allocated vector evaluating process, evaluated value DFD of the motion vector and the absolute value of luminance difference at the allocation pixel are found, and the reliability of the motion vector at the allocation pixel is determined. After the determination, the motion vector in the allocated vector memory 55 is rewritten by a motion vector that is determined to be highly reliable.

In step S708, the pixel information operation unit 701 determines whether processing on all the allocation pixels has finished. If it is determined that the processing on all the allocation pixels has not finished, the pixel information operation unit 701 returns to step S706, selects the next allocation pixel, and repeats the subsequent steps.

If, in step S708, it is determined that the processing on all the allocation pixels has finished, in step S709, the pixel information operation unit 701 determines whether processing on all the pixels in the original frame in the detected vector memory 53 has finished. If, in step S709, it is determined that the processing on all the pixels in the original frame in the detected vector memory 53 has not finished, the pixel information operation unit 701 returns to step S704 and selects the next pixel to repeat the subsequent steps. If, in step S709, it is determined that the processing on all the pixels in the original frame in the detected vector memory 53 has finished, the pixel information operation unit 701 finishes the vector allocating process.

Next, details of the pixel position operation process are described below with reference to the flowchart shown in FIG. 45. FIG. 45 shows an example of the pixel position operation process in step S705 in FIG. 44.

In step S721, the pixel information operation unit 701 acquires, from the detected vector memory 53, the motion vector detected at the pixel selected in step S704, and proceeds to step S722. Since the motion vector of the selected pixel is a zero vector, a zero vector is stored as an initial value beforehand in the allocated vector memory 55, the subsequent steps S722 to S724, and the steps S706 to S708 of FIG. 44 are skipped over, and the process proceeds to step S709.

In step S722, the pixel information operation unit 701 calculates a point of intersection between the acquired motion vector and the interpolated frame. Specifically, the pixel information operation unit 701 extends the acquired motion vector in the direction of the next frame t+1, calculates a point of intersection between the extended motion vector and the interpolated frame, and proceeds to step S723.

In step S723, the pixel information operation unit 701 sets an allocation pixel from the point of intersection calculated based on the motion vector and the interpolated frame, and proceeds to step S724. When the point of intersection coincides with the pixel position in the interpolated frame, the pixel information operation unit 701 sets the point of intersection as the allocation pixel. Alternatively, when the point of intersection does not coincide with the pixel position in the interpolated frame, four pixels in a neighborhood of the point of intersection in the interpolated frame are set as allocation pixels by the pixel information operation unit 701, as described above.

In step S724, by using each allocation pixel as a reference, the pixel information operation unit 701 calculates a pixel position in the original frame which is associated by the acquired motion vector. The pixel position is required for the evaluated value operation unit 702 and the pixel-of-interest difference operation unit 703 to find evaluated value DFD and the absolute value of luminance difference. Specifically, in step S724, the pixel information operation unit 701 shift (translates) the acquired motion vector to the set allocation pixel, finds the position of the point of intersection between the shifted motion vector and the position in the original frame, and finishes the pixel position operation process. The process returns to step S706 in FIG. 43.

Figure 46:
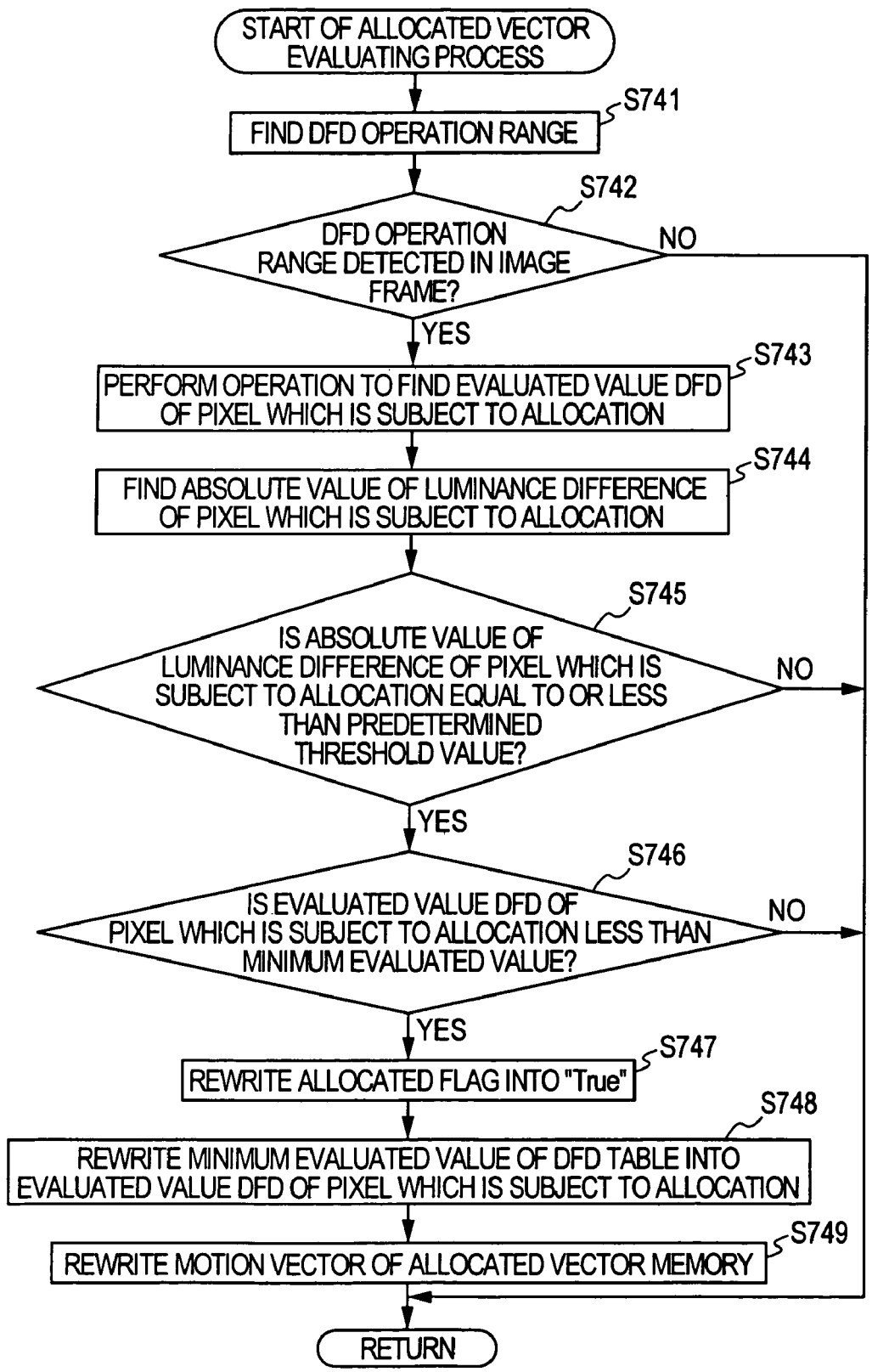
FIG. 46 is a flowchart illustrating an allocated vector evaluating process.

Next, details of the allocated vector evaluating process are described below with reference to the flowchart shown in FIG. 46. FIG. 46 shows an example of the allocated vector evaluating process in step S707 in FIG. 44.

Figure 44:
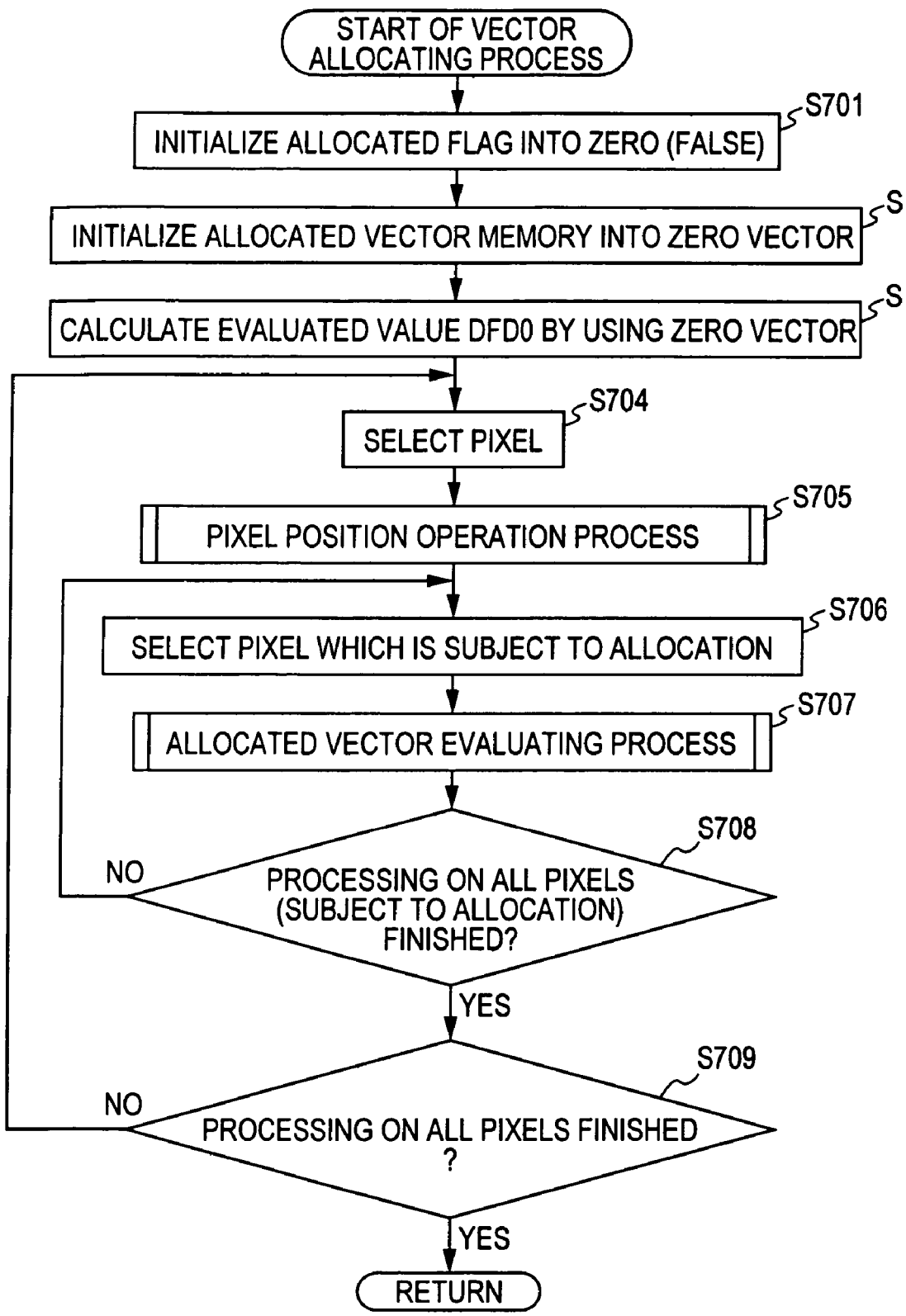
FIG. 44 is a flowchart illustrating a vector allocating process.
Figure 45:
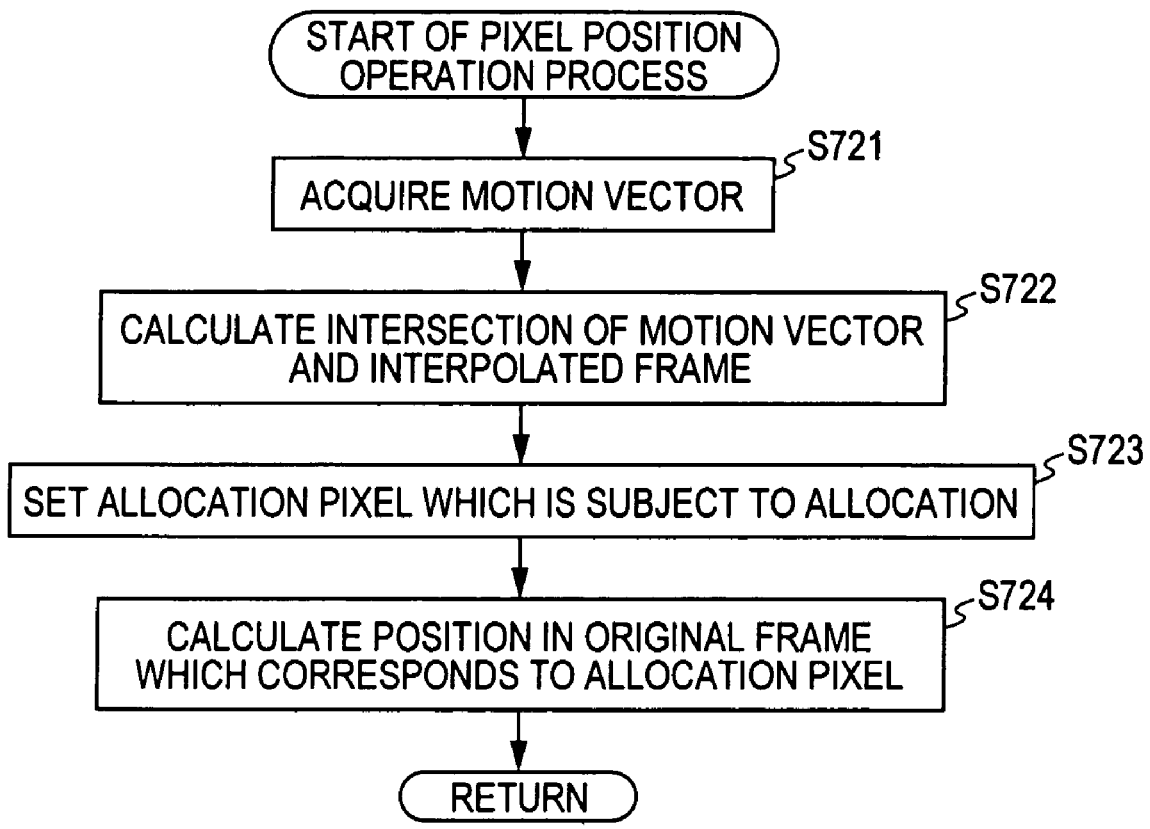
FIG. 45 is a flowchart illustrating a pixel position operation process.

In step S706 in FIG. 44, by using the selected allocation pixel as a reference, the pixel position in the original frame which is associated by its motion vector is found by the pixel information operation unit 701. Information of the position in the original frame is input to the evaluated value operation unit 702 and the pixel-of-interest difference operation unit 703.

When receiving the information of the position in the original frame from the pixel information operation unit 701, in step S741, in order to find evaluated value DFD of the motion vector at the allocation pixel, the evaluated value operation unit 702 finds DFD operation ranges (m by n pixels) around frame t and frame t+1, and proceeds to step S742. In step S742, the evaluated value operation unit 702 determines substrate the obtained DFD operation ranges are in the image frame. If, in step S742, it is determined that the DFD operation ranges exceed the image frame, the evaluated value operation unit 702 determines that the motion vector does not serve as an allocation candidate vector to be allocated to an allocation pixel. Accordingly, steps S743 to S749 are skipped over, and the allocated vector evaluating process is finished before returning to step S708 in FIG. 44.

If, in step S742, it is determined that each obtained DFD operation range is in the image frame, the evaluated value operation unit 702 proceeds to step S743. In step S743, by using the DFD operation range determined to be in the image frame, the evaluated value operation unit 702 performs operation to find the evaluated value DFD of the allocation pixel, and outputs the obtained evaluated value DFD to the evaluated value determining unit 712 before proceeding to step S744. If, at this time, the position in the original frame is a position other than pixel position, by using the above-described four-point interpolation process to find the luminance of the point of intersection in the original frame, the evaluated value DFD of the allocation pixel is obtained.

When receiving the position in the original frame from the pixel information operation unit 701, in step S744, the pixel-of-interest difference operation unit 703 finds the absolute value dp of luminance difference at the allocation pixel, and outputs the obtained absolute value dp of luminance difference to the pixel difference determining unit 711. The process proceeds to step S745. Also in this case, when the position in the original frame is a position other than pixel position, by using the above-described four-point interpolation process to find the luminance of the point of intersection in the original frame, the pixel-of-interest difference operation unit 703 calculates the absolute value dp of luminance difference at the allocation pixel.

If, in step S745, the pixel difference determining unit 711 determines whether the absolute value dp of luminance difference of the allocation pixel from the pixel-of-interest difference operation unit 703 is equal to or less than a predetermined threshold value. If it is determined that the absolute value dp of luminance difference of the allocation pixel is equal to or less than the predetermined threshold value, the pixel difference determining unit 711 determines that points of intersection in frame t and frame t+1 are likely to respectively belong to different objects, that is, the pixel difference determining unit 711 determines that the motion vector has low reliability at the allocation pixel and does not serve as an allocation candidate vector for allocation to the allocation pixel. Accordingly, steps S746 to S749 are skipped over, and the allocated vector evaluating process is finished before returning to step S708 in FIG. 44.

If, in step S745, the pixel difference determining unit 711 has determined that the absolute value dp of luminance difference is less than the predetermined threshold value, the process proceeds to step S746. In step S746, by referring to the DFD table in the vector selecting unit 705, the evaluated value determining unit 712 determines whether the evaluated value DFD from the evaluated value operation unit 702 is less than the minimum evaluated value (the evaluated value DFD0 for the zero vector) of the allocation pixel stored in the DFD table. If it is determined that the evaluated value DFD of the allocation pixel from the evaluated value operation unit 702 is equal to or greater than the minimum evaluated value of the allocation pixel stored in the DFD table, the evaluated value determining unit 712 determines that the motion vector has low reliability at the allocation pixel. Accordingly, steps S747 to S749 are skipped over, and the allocated vector evaluating process is finished before returning to step S708 in FIG. 44.

Alternatively, if, in step S746, it is determined that the evaluated value DFD of the allocation pixel from the evaluated value operation unit 702 is less than the minimum evaluated value of the allocation pixel stored in the DFD table, the evaluated value determining unit 712 determines that, among motion vectors that have been compared, the motion vector has the highest reliability based on the evaluated value DFD, and outputs, to the vector selecting unit 705, the evaluated value DFD of the allocation pixel determined to have the highest reliability. The process proceeds to step S747.

When receiving the evaluated value DFD of the allocation pixel from the evaluated value determining unit 712, in step S747, the vector selecting unit 705 rewrites the allocation flag for the allocation pixel in the allocation flag memory 56 into one (true), and proceeds to step S748. In step S748, the vector selecting unit 705 rewrites the minimum evaluated value, to which the allocation pixel in the DFD table corresponds, into the evaluated value DFD determined to have the highest reliability, and proceeds to step S749.

The selected allocation pixel and its motion vector are input from the pixel information operation unit 701 to the vector selecting unit 705 in step S706. Therefore, in step S749, the vector selecting unit 705 rewrites the motion vector allocated to the allocation pixel in the allocated vector memory 55 by a motion vector corresponding to the evaluated value DFD determined to have the highest reliability, and finishes the allocated vector evaluating process before returning to step S708 in FIG. 44.

As described above, when a motion vector to be allocated to an allocation pixel in an interpolated frame is selected, not only evaluated value DFD, but also the absolute value of luminance difference of the allocation pixel, which is obtained based on a position in the original frame associated by a motion vector, are separately treated and evaluated. Thus, compared with the case of the related art of only using evaluated value DFD, from among allocation candidate vectors, a most probable motion vector is selected and allocated to the allocation pixel. This improves vector allocating accuracy, thus suppressing image discontinuity, etc., generated in an image interpolating process in the subsequent stage, so that image quality can be improved.

In addition, since, in the case of finding evaluated value DFD and the absolute value of luminance difference, when requiring a pixel value at a position other than pixel position, the pixel value is calculated by linear interpolation based on distances to four pixels in a neighborhood of the position, processing with accuracy for the position can be performed. Moreover, compared with the method of the related art that rounds components of positions other pixel position, the absolute value dp of luminance difference and evaluated value DFD can be found with higher accuracy. This makes it possible to allocate, among allocation candidate vectors, a most probable motion vector to a pixel of interest. In other words, the accuracy of the vector allocating process is improved.

In addition, after the evaluated value DFD based on a zero vector is stored as an initial value beforehand, while motion vectors are sequentially being processed, when evaluated value DFD based on a motion vector serves as the minimum evaluated value at that time, the minimum evaluated value in the DFD table and the motion vectors allocated in the allocated vector memory 55 are updated as required. Thus, time and resources can be efficiently used.

Next, details of the configuration of the allocation compensating unit 57 are described below.

Figure 47:
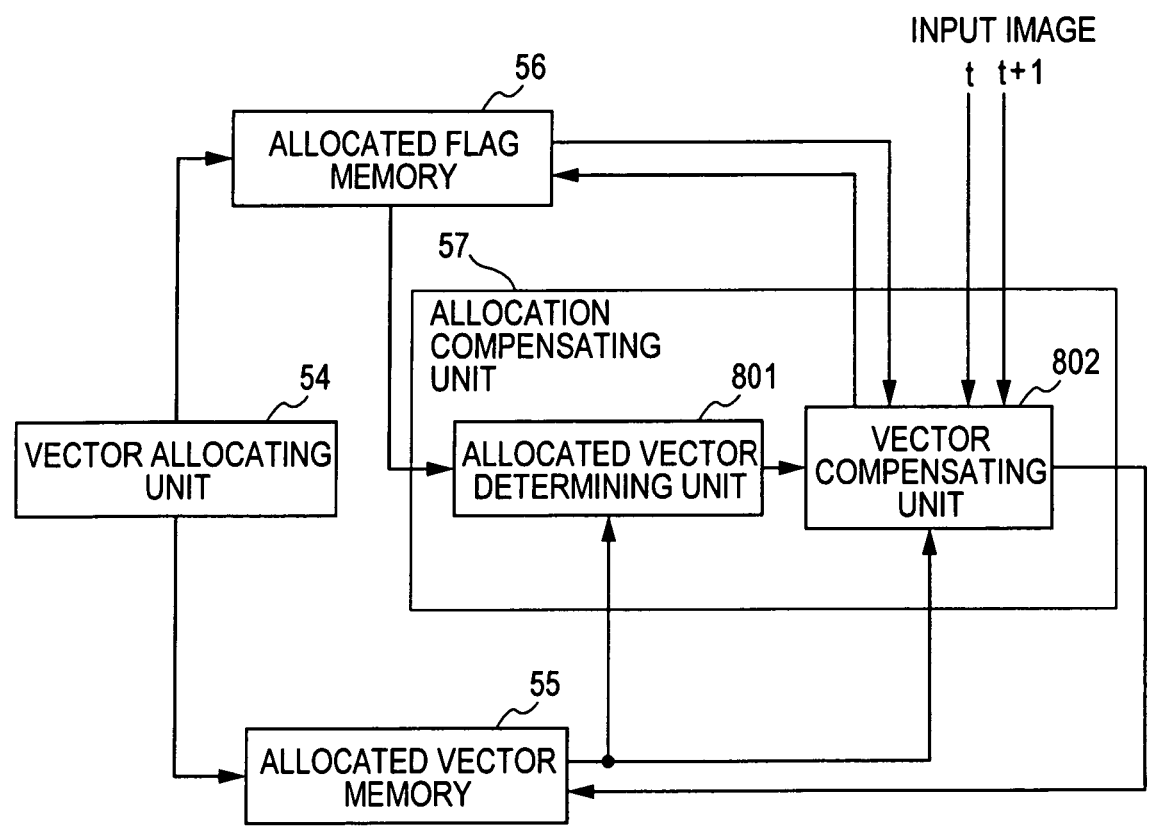
FIG. 47 is a block diagram showing the configuration of an allocation compensating unit.

FIG. 47 is a block diagram showing the configuration of the allocation compensating unit 57. The allocation compensating unit 57, whose configuration is shown in FIG. 47, includes an allocated vector determining unit 801 and a vector compensating unit 802. The allocation compensating unit 57 allocates, to a pixel in the 60P-signal interpolated frame to which no motion vector is allocated by the vector allocating unit 54, the motion vector of a peripheral pixel around the pixel.

The motion vector is allocated to a pixel in the interpolated frame in the allocated vector memory 55 by the vector allocating unit 54. In addition, one (true) is written in the allocation flag in the allocation flag memory 56 for the pixel to which a motion vector is allocated by the vector allocating unit 54, and zero (false) is written in the allocation flag in the allocation flag memory 56 for the pixel to which no motion vector is allocated.

By referring to the allocation flag in the allocation flag memory 56, the allocated vector determining unit 801 determines whether a motion vector is allocated to a pixel of interest by the vector allocating unit 54. The allocated vector determining unit 801 selects a pixel of interest to which no motion vector is allocated by the vector allocating unit 54, and controls, for the selected pixel of interest, the vector compensating unit 802 to select and allocate the motion vectors of peripheral pixels to the interpolated frame in the allocated vector memory 55.

The vector compensating unit 802 acquires, from the allocated vector memory 55, the motion vectors allocated to the peripheral pixels around the pixel of interest. By using the input frame t at time t and the input frame t+1 at time t+1 to find evaluated values DFD of the acquired motion vectors, and comparing the obtained evaluated values DFD, the vector compensating unit 802 allocates, to the pixel of interest in the allocated vector memory 55, a motion vector having the highest reliability based on the evaluated value DFD among the motion vectors allocated to the peripheral pixels around the pixel of interest. In addition, the vector compensating unit 802 uses one (true) to rewrite the allocation flag for the pixel of interest to which the motion vector is allocated.

Figure 48:
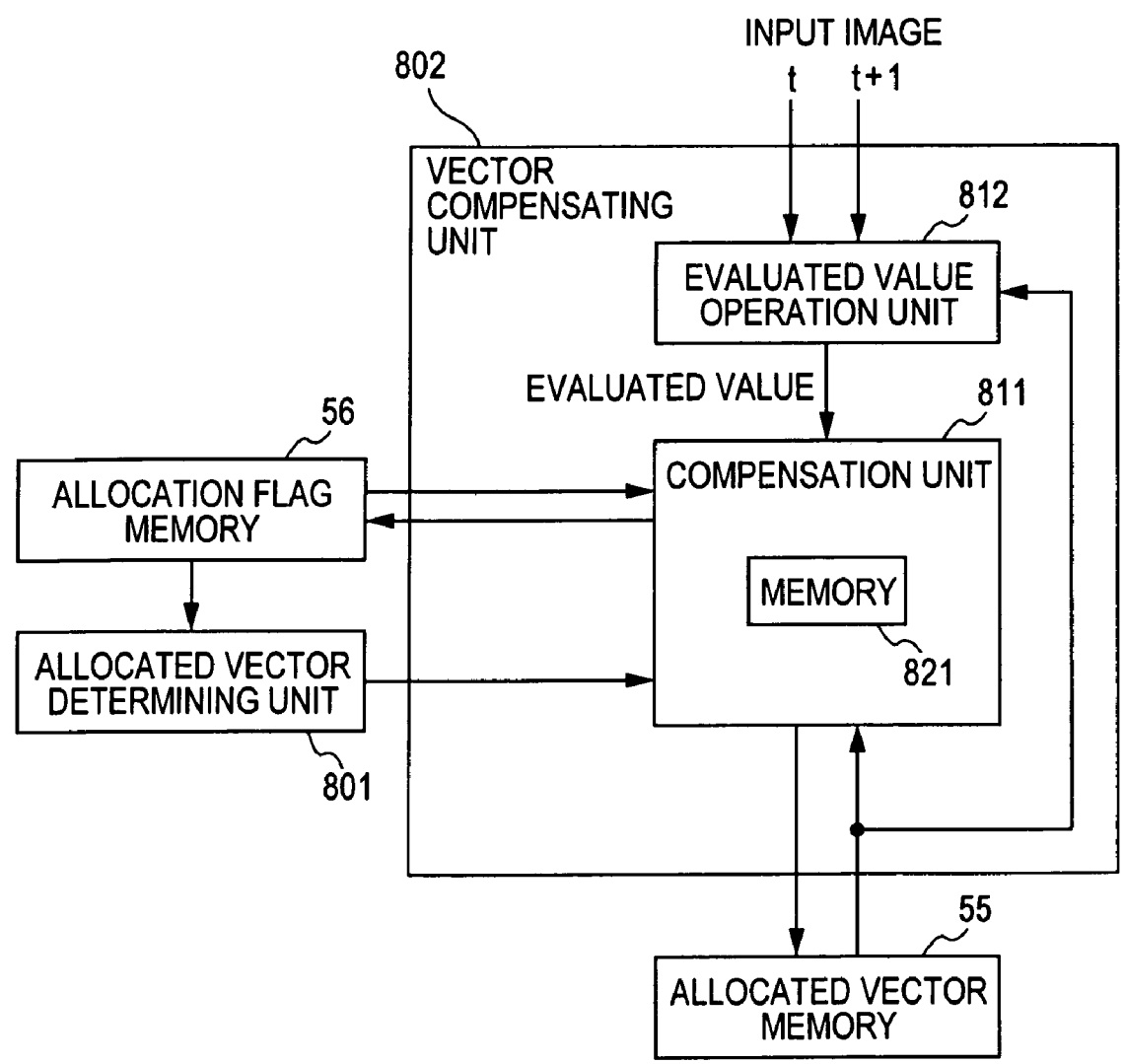
FIG. 48 is a block diagram showing the configuration of the allocation compensating unit.

FIG. 48 is a block diagram showing the configuration of the vector compensating unit 802. The vector compensating unit 802 shown in FIG. 48 includes a compensation unit 811 and an evaluated value operation unit 812.

The compensation unit 811 includes a memory 821 for storing the minimum evaluated value DFD and the motion vector for the minimum evaluated value DFD as candidate vectors (hereinafter also referred to as "compensating candidate vectors"). The memory 821 stores an evaluated value DFD of a zero vector as the minimum evaluated value and as the initial value of the selected pixel of interest selected by the allocated vector determining unit 801, and stores the zero vector as a compensating candidate vector. By referring to the allocation flag memory 56, the compensation unit 811 determines whether there are the motion vectors of peripheral pixels around the pixel of interest, acquires the motion vectors allocated to the peripheral pixels from the allocated vector memory 55, and controls the evaluated value operation unit 812 to calculate evaluated values DFD of the motion vectors.

The compensation unit 811 determines whether each evaluated value DFD calculated by the evaluated value operation unit 812 is less than the minimum evaluated value stored in the memory 821. If it is determined that the calculated evaluated value DFD is less than the minimum evaluated value, the compensation unit 811 rewrites the compensating candidate vector and minimum evaluated value stored in the memory 821 by the calculated evaluated value DFD and is motion vector. Finally, the motion vector (compensating candidate vector) of the peripheral pixel determined to have the least evaluated value DFD is allocated as the motion vector of a pixel of interest to the pixel of interest in the allocated vector memory 55. The compensation unit 811 uses one (true) to rewrite the allocation flag in the allocation flag memory 56 for the pixel of interest to which the motion vector is allocated.

After acquiring the motion vectors of the peripheral pixels from the allocated vector memory 55, the evaluated value operation unit 812 calculates the evaluated values DFD of the motion vectors from the allocated vector memory 55 by using frame t (at time t) and frame t+1 (at time t+1) of the input 24P-signal image, and outputs the calculated evaluated values DFD to the compensation unit 811.

Figure 49:
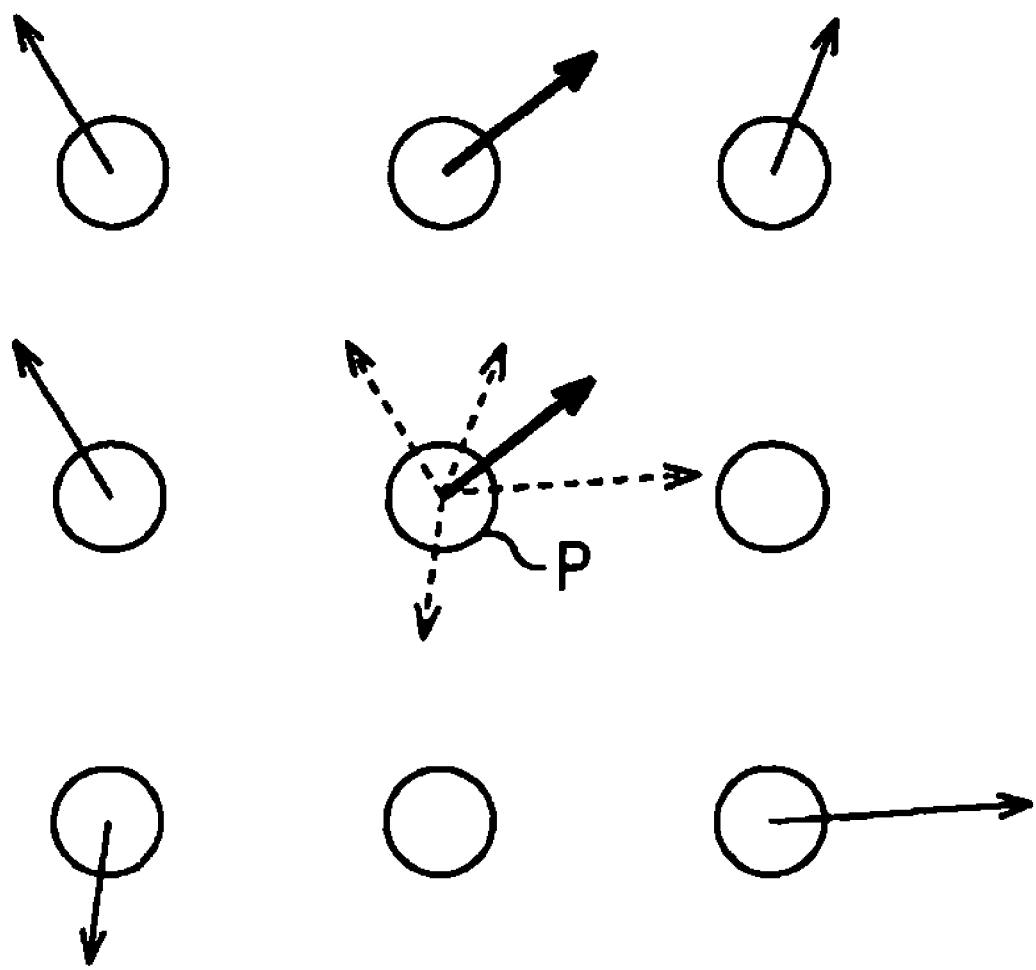
FIG. 49 is an illustration of the principle of an allocation compensating process.

FIG. 49 is an illustration of the principle of the allocation compensating process. In the example shown in FIG. 49, pixels in the interpolated frame are shown. The arrows extending from the pixels indicate motion vectors allocated to the pixels. The pixels having no arrows indicate pixels to which no motion vectors are allocated.

From among the motion vectors allocated to the peripheral pixels in a neighborhood of pixel P of interest, a motion vector having the highest reliability based on the evaluated value DFD is selected and allocated to the center pixel P of interest to which no motion vector is allocated by the vector allocating unit 54. In the example shown in FIG. 49, the motion vector (indicated by the thick arrow) of the pixel is selected and allocated to pixel P of interest. This is a process that is executed based on movement correlation, which is described below.

Figure 50:
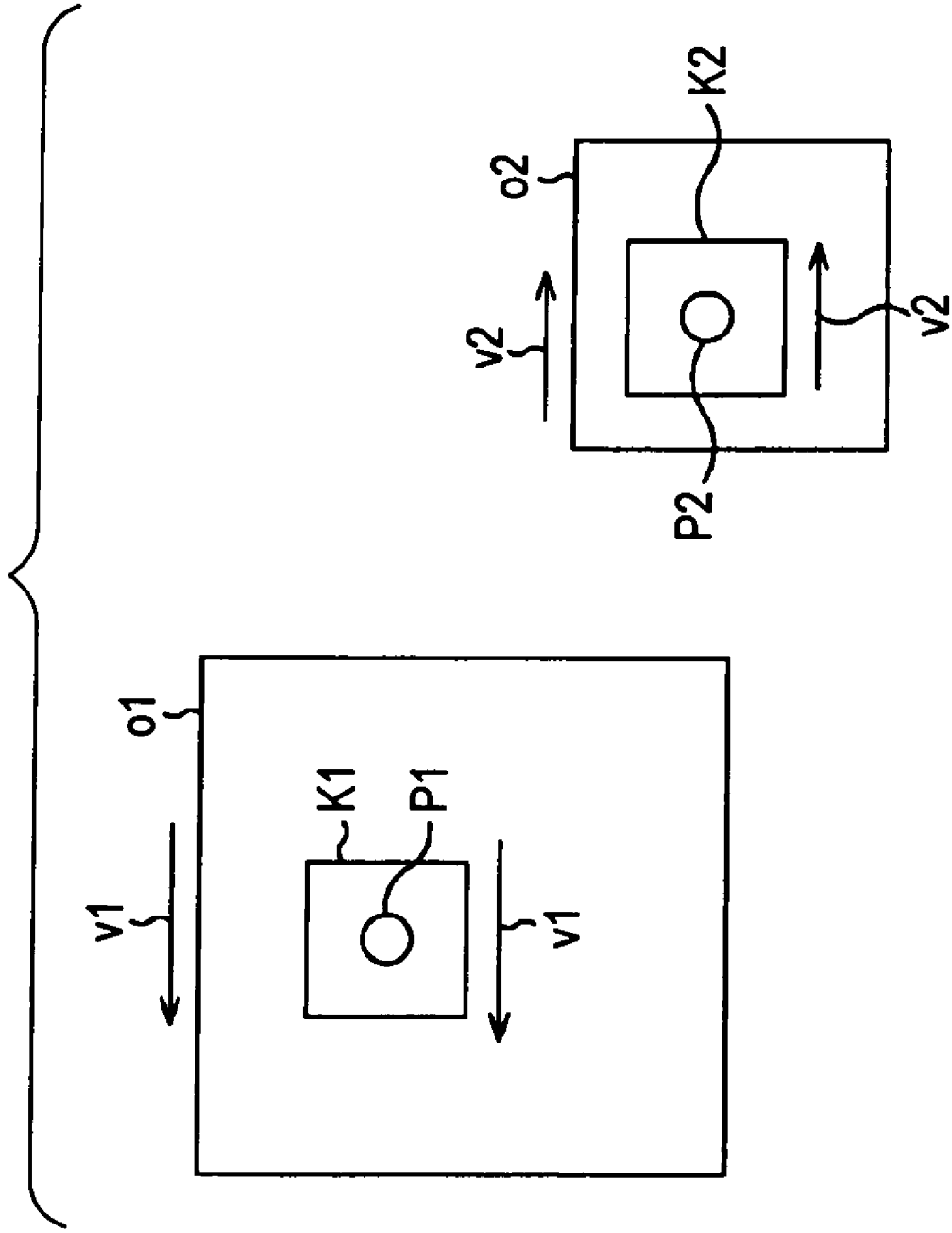
FIG. 50 is an illustration of the principle of movement correlation.
Figure 51:
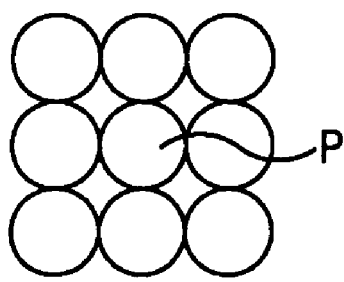
FIG. 51 is an illustration of an example of the configuration of peripheral pixels around a pixel of interest.

FIG. 50 is an illustration of the principle of movement correlation. In the example shown in FIG. 50, object O1 moves with movement v1 in a frame, and object O2 moves with movement v2 in a frame. Pixel P1 of interest and its neighborhood K1 which belong to object O1 have movement v1 substantially identical to that of object O1. In addition, pixel P2 of interest and its neighborhood K2 which belong to object O2 have movement v2 substantially identical to that of object O2.

As described above, movement correlation represents the fact that, in many cases, in a space (the same frame) in the same single time, the movements of pixels belonging to an object are substantially identical. Therefore, for a pixel to which a motion vector fails to be allocated, by using the existence of such movement correlation in the space (the same frame) in the same time, a motion vector corresponding to the pixel is selected from among the motion vectors of peripheral pixels. This also applies to temporal correlation although its description is omitted.

Next, a motion vector compensating process that is executed based on movement correlation is described below with reference to FIGS. 51 to 57. Specifically, in the motion vector compensating process, from the motion vectors of peripheral pixels, a motion vector is selected and used for compensation as the motion vector of a pixel of interest. In the example shown in FIG. 51, the white circles indicate pixels in an interpolated frame. Eight peripheral pixels are shown around pixel P of interest whose motion vector is to be found. The motion vector of pixel P of interest is found by referring to the motion vectors of the eight peripheral pixels.

Figure 52:
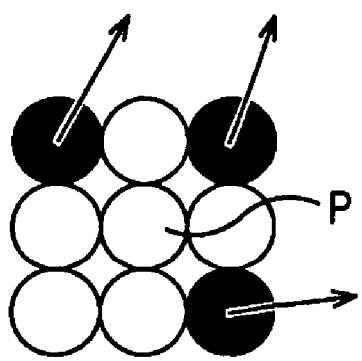
FIG. 52 is an illustration of an example of a compensating candidate vector for the motion vector of a pixel of interest.

In the example shown in FIG. 52, among eight peripheral pixels around pixel P of interest, the top left, top right, and bottom right pixels (indicated by the block circles) have motion vectors (indicated by the arrows) obtained by processing in the previous stage (e.g., the above-described vector allocating process). In other words, in this case, the top left, top right, and bottom right pixels serve as compensating candidate vectors for pixel P of interest. Since, in a frame, motion vectors are found from the top left end pixel in the frame in raster scanning order, there is a possibility that, among the eight peripheral pixels, pixels whose motion vectors are not found may exist. Such motion vectors cannot be used as compensating candidate vectors.

Figure 53:
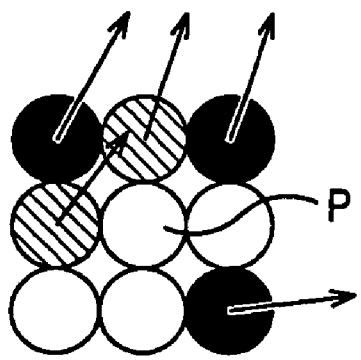
FIG. 53 is an illustration of an example of a compensating candidate vector for the motion vector of a pixel of interest.

As indicated by the example shown in FIG. 53, among the eight peripheral pixels, in addition to the pixels (black circles) having the motion vectors found by the processing in the previous stage, pixels (indicated by the hatched circles) having motion vectors found by this process also exist. In other words, in this process, results obtained by this process in the previous stage are also used. Accordingly, in the example shown in FIG. 53, compensating candidate vectors for pixel P of interest are composed of the motion vectors of the pixels (black circles), whose motion vectors have already existed, and the motion vectors of the pixels (the hatched circles), which have the motion vectors found by this process in the previous stage.

Figure 54:
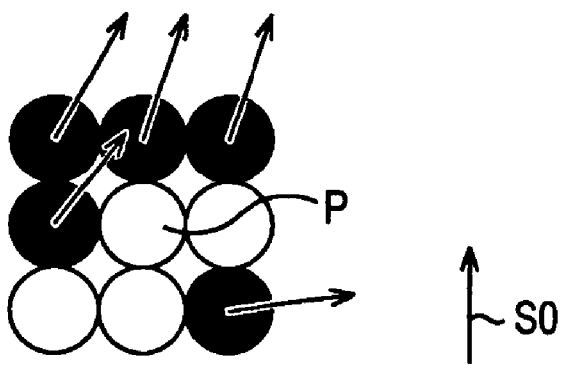
FIG. 54 is an illustration of an example of a compensating candidate vector for the motion vector of a pixel of interest.

In addition, as indicated by the example shown in FIG. 54, zero vector S0 (stationary vector) in which the amount of movement is zero can be also used as a compensating candidate vector. In the example shown in FIG. 53, the pixels which have the motion vectors found by this process and the pixels whose motion vectors have already existed are separately shown. However, both are identical in having motion vectors. Accordingly, in FIGS. 54 to 57, it is deemed that also the pixels having the motion vectors found by this process are included in the pixels (black circles) whose motion vectors have already existed. Therefore, in the example shown in FIG. 54, the compensating candidate vectors for pixel P of interest are composed of the pixels (black circles) whose motion vectors have already existed and zero vector S0.

Figure 55:
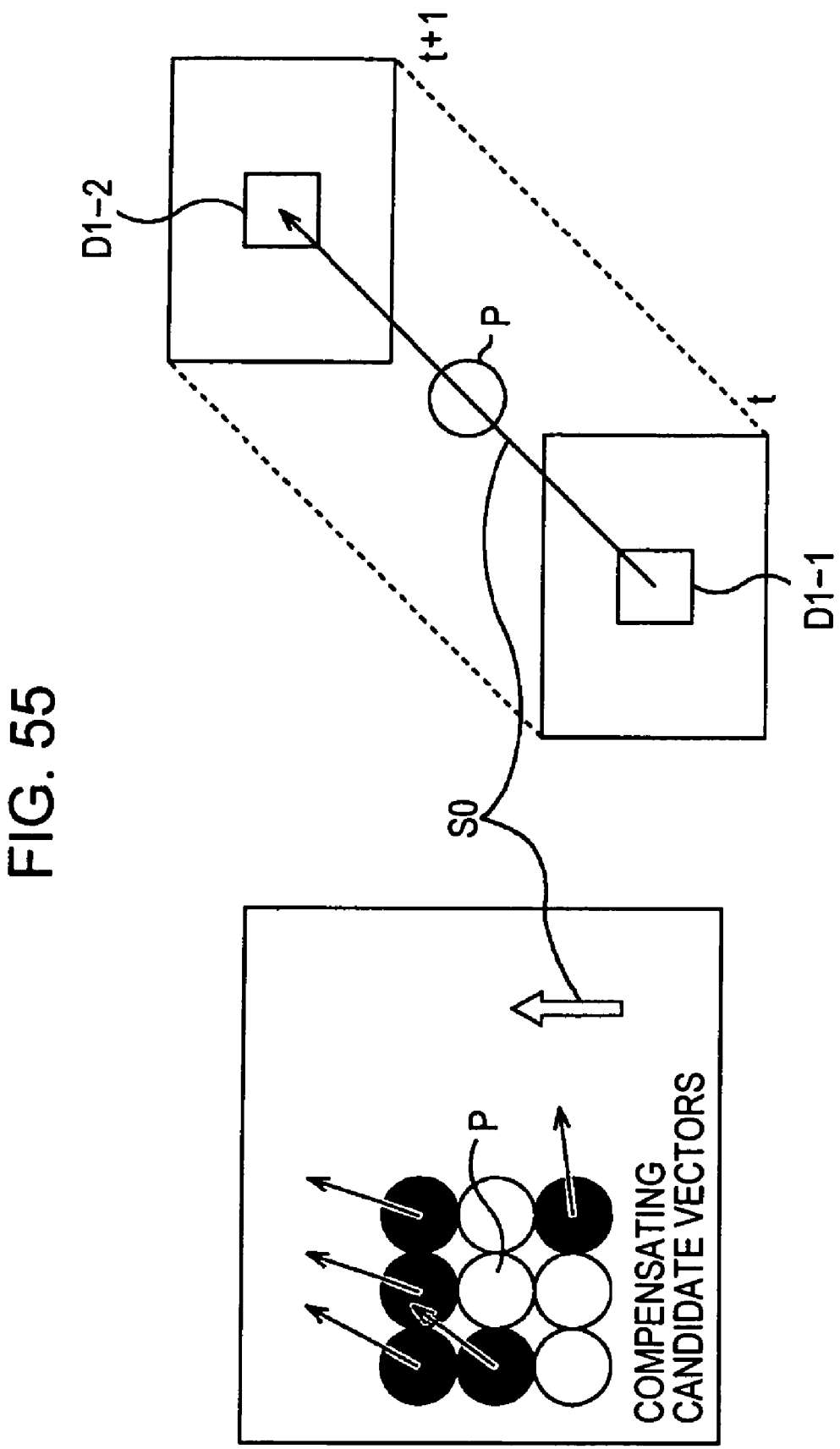
FIG. 55 is an illustration of an example of evaluation of a compensating candidate vector.
Figure 56:
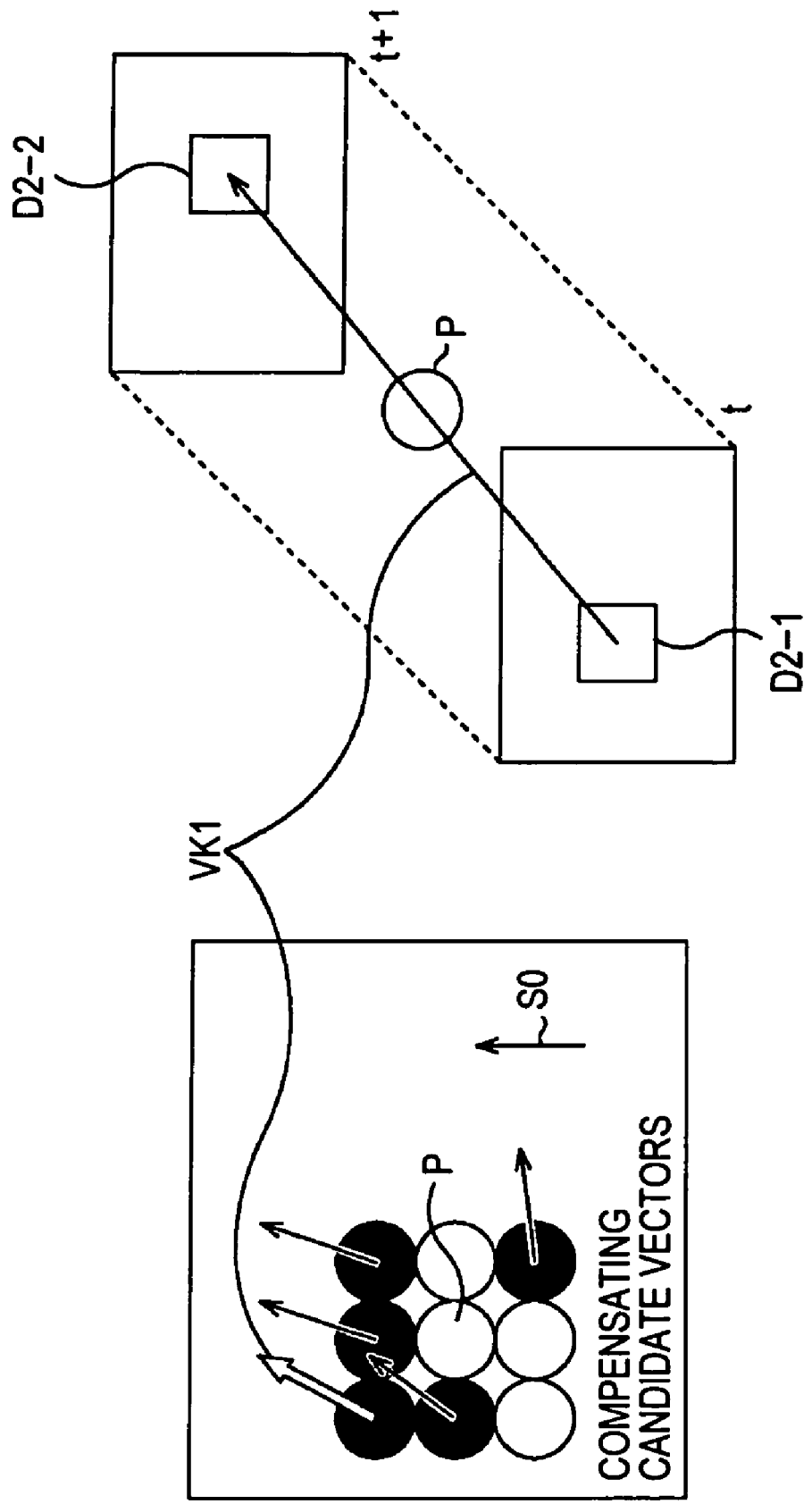
FIG. 56 is an illustration of an example of evaluation of a compensating candidate vector.
Figure 57:
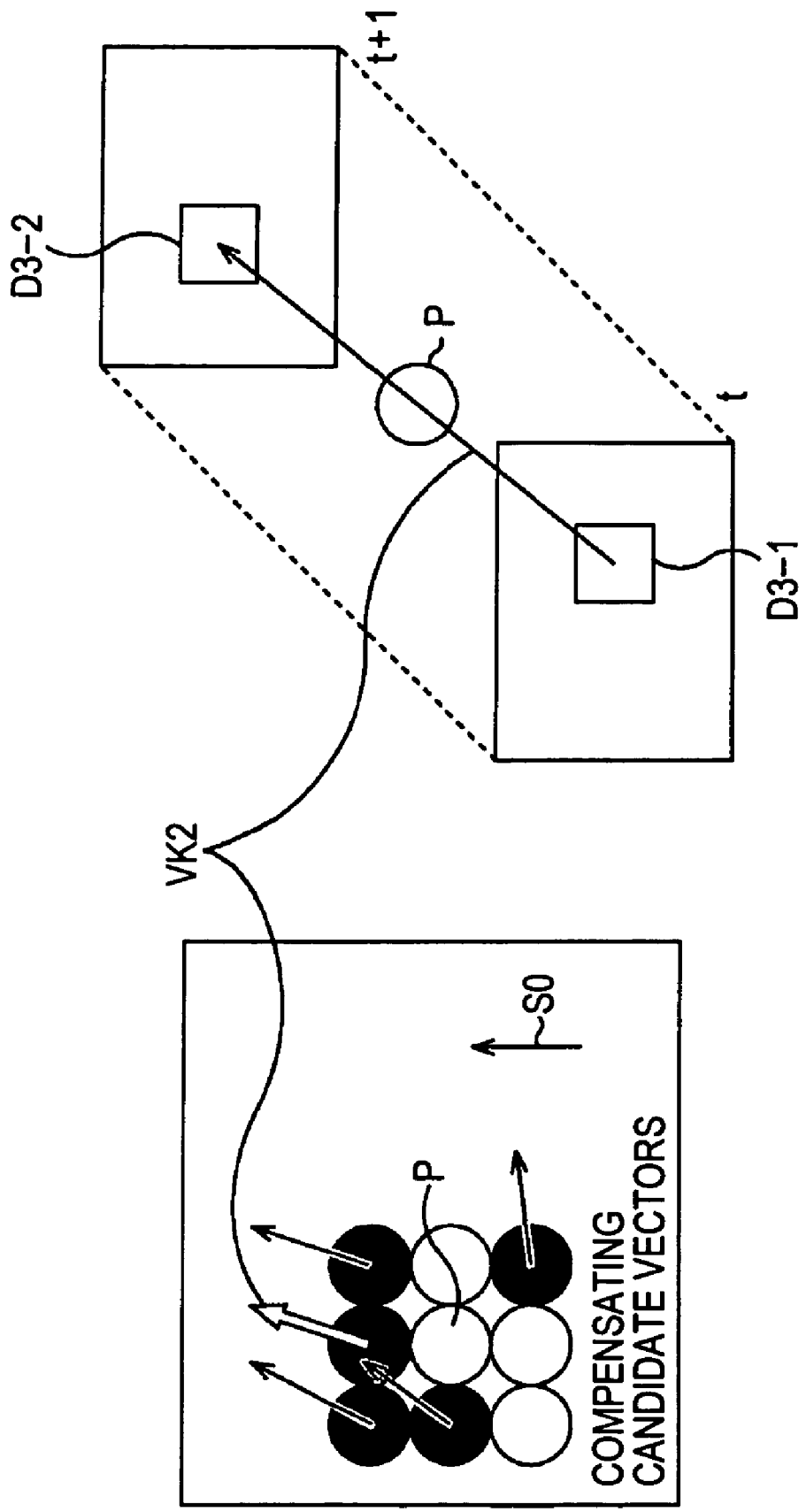
FIG. 57 is an illustration of an example of evaluation of a compensating candidate vector.

In order to compare the reliabilities (probabilities) of the compensating candidate vectors formed as described above, evaluated value DFD for motion vector evaluation is found as shown in FIGS. 55 to 57. FIG. 55 shows that zero vector S0 is used as a compensating candidate vector. FIG. 56 shows that the top left pixel VK1 among eight peripheral pixels is used as a compensating candidate vector. FIG. 57 shows that the top center pixel VK2 among eight peripheral pixels is used as a compensating candidate vector.

In the example shown in FIG. 55, from the compensating candidate vectors for pixel P of interest, which are shown on the left side of FIG. 55, zero vector S0 is selected and evaluated value DFD of the selected zero vector S0 is found. In other words, evaluated value DFD of zero vector S0 is found such that, in frame t and frame t+1 of the 24P-signal image with pixel P of interest (60P-signal interpolated frame) provided therebetween, by using pixel P of interest in the interpolated frame, a point of intersection with which the selected zero vector S0 is associated is found, DFD operation ranges D1-1 and D1-2 formed by predetermined m-by-n-pixel ranges are calculated with the point of intersection as the center, and the calculated DFD operation ranges D1-1 and D1-2 are used to perform operation based on Expression (1).

In the example shown in FIG. 56, from compensating candidate vectors for pixel P of interest, shown on the left side of FIG. 56, the motion vector VK1 of the top left pixel of the eight peripheral pixels is selected, and evaluated value DFD of the motion vector VK1 selected. In other words, evaluated value DFD of the motion vector VK1 of the top left pixel of the eight peripheral pixels is found such that, in frame t and frame t+1 with pixel P of interest (in the interpolated frame) provided therebetween, by using pixel P of interest as a reference, a point of intersection with which the selected motion vector VK1 is associated is found, DFD operation ranges D2-1 and D2-2 formed by predetermined m-by-n-pixel ranges are calculated with the point of intersection as the center, and the calculated DFD operation ranges D2-1 and D2-2 are used to perform operation based on Expression (1).

In the example shown in FIG. 57, from compensating candidate vectors for pixel P of interest, shown on the left side of FIG. 57, the motion vector VK2 of the top center pixel of the eight peripheral pixels is selected, and evaluated value DFD of the motion vector VK2 selected. In other words, evaluated value DFD of the motion vector VK2 of the top center pixel of the peripheral pixels is found such that, in frame t and frame t+1 with pixel P of interest (in the interpolated frame) provided therebetween, by using pixel P of interest as a reference, a point of intersection with which the selected motion vector VK2 is associated is found, DFD operation ranges D3-1 and D3-2 formed by predetermined m-by-n-pixel ranges are calculated with the point of intersection as the center, and the calculated DFD operation ranges D3-1 and D3-2 are used to perform operation based on Expression (1).

For the other compensating candidate vectors shown on the left side of FIG. 57, basically identical processing is performed. Accordingly, its description is omitted. As described above, evaluated values DFD of all the compensating candidate vectors for the peripheral pixels around pixel P of interest are found, the obtained evaluated values DFD are compared with one another, and among the obtained evaluated values DFD, a compensating candidate vector having the minimum evaluated value DFD is selected as a probable motion vector having the highest reliability which is to be allocated to the pixel P of interest, as shown in FIG. 58.

Figure 58:
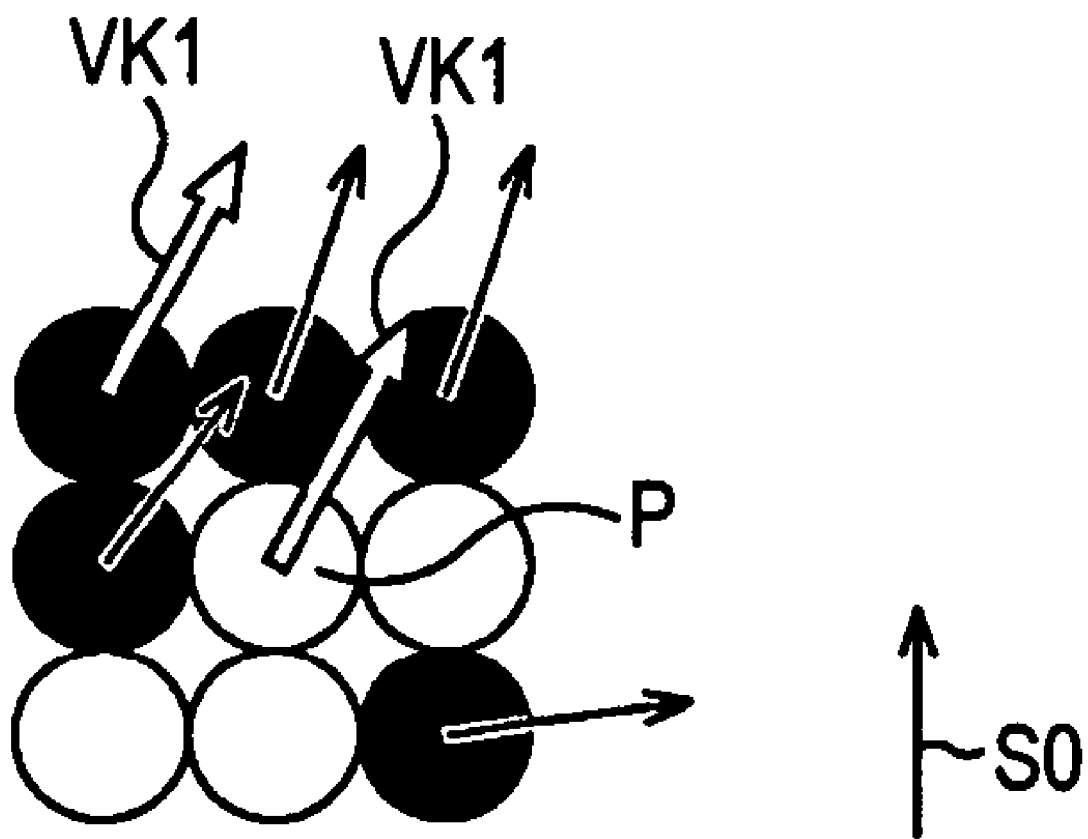
FIG. 58 is an illustration of an example of selecting a compensating candidate vector as the motion vector of a pixel of interest.

In the example shown in FIG. 58, it is determined that, from among compensating candidate vectors of peripheral pixels for pixel P of interest, evaluated value DFD for the motion vector VK1 of the top left pixel of the eight peripheral pixels is the least, and motion vector VK1 is allocated to the motion vector of pixel P of interest.

As described above, the motion vector of a pixel to which a motion vector cannot be allocated by the vector allocating unit 54 is compensated from the motion vectors of peripheral pixels by using movement correlation. Thus, irregularity in movement can be suppressed compared with a case in which no motion vector is allocated, for example, a case in which a zero vector is allocated. In addition, the motion vector of the pixel compensated in this manner can be also used again as a compensating candidate vector for another pixel. In other words, not only motion vectors in a spatial neighborhood, but also motion vectors in a temporal neighborhood can be used as compensating candidate vectors. For pixels that substantially identically move in an object, vectors having substantially identical movements are selected, so that stable motion vectors having reduced errors can be obtained. This improves the accuracy of vector allocation.

Figure 59:
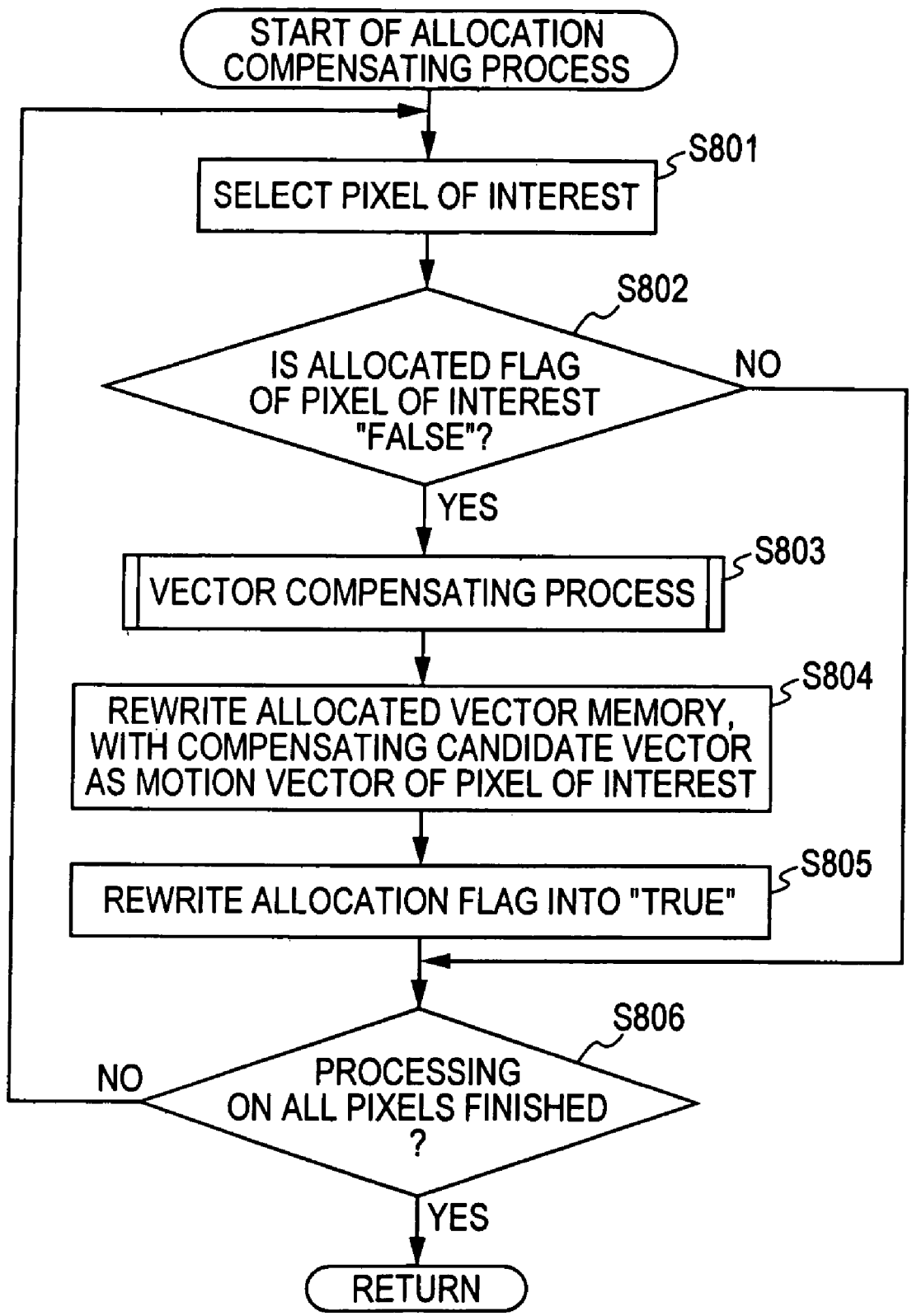
FIG. 59 is a flowchart illustrating an allocation compensating process.

Next, details of the allocation compensating process are described below with reference to the flowchart shown in FIG. 59.

A motion vector is allocated to a pixel in the interpolated frame in the allocated vector memory 55 by the vector allocating unit 54 in the previous stage. In the allocation flag in the allocation flag memory 56 for each pixel to which a motion vector is allocated by the vector allocating unit 54, one (true) is written. In the allocation flag in the allocation flag memory 56 for each pixel to which no motion vector is allocated, zero (false) is written.

In step S801, the allocated vector determining unit 801 selects a pixel in the interpolated frame in the allocation flag memory 56 as a pixel of interest, and proceeds to step S802. The allocated vector determining unit 801 selects pixels from the top left end pixel in raster scanning order.

In step S802, the allocated vector determining unit 801 determines whether the allocation flag in the allocation flag memory 56 for the pixel of interest is zero (false). If it is determined that the allocation flag in the allocation flag memory 56 for the pixel of interest is zero (false), the allocated vector determining unit 801 determines that no motion vector is allocated. Proceeding to step S803, the allocated vector determining unit 801 controls the compensation unit 811 to execute the vector compensating process, and proceeds to step S804. Details of the vector compensating process are described later with reference to FIG. 60. In the vector compensating process, from the motion vectors allocated to peripheral pixels, a motion vector having the minimum evaluated value DFD is stored as a compensating candidate vector in the memory 821.

In step S804, the compensation unit 811 allocates the compensating candidate vector in the memory 821 as the motion vector of the pixel of interest to the allocated vector memory 55, and proceeds to step S805. The compensation unit 811 rewrites the allocation flag for the pixel of interest in the allocation flag memory 56, and the process proceeds to step S806.

If, in step S802, it is determined that the allocation flag in the allocation flag memory 56 for the pixel of interest is one (true), the allocated vector determining unit 801 determines that a motion vector has been allocated to the pixel of interest, and proceeds to step S806, skipping over steps S803 to S805.

In step S806, the allocated vector determining unit 801 determines whether processing on all the pixels in the interpolated frame in the allocation flag memory 56 has finished. If it is determined that the processing on all the pixels has not finished, the process returns to step S801, and selects the next pixel in the interpolated frame in the allocation flag memory 56. The subsequent steps are executed. If, in step S806, it is determined that the processing on all the pixels in the interpolated frame in the allocation flag memory 56 has finished, the allocation compensating process ends.

Next, details of the vector compensating process are described below with reference to the flowchart shown in FIG. 60. FIG. 60 shows an example of the vector compensating process in step S803 in FIG. 59.

In step S821, the compensation unit 811 controls the evaluated value operation unit 812 to calculate evaluated value DFD0 by using a zero vector, and the process proceeds to step S822. Specifically, in step S821, by using frame t at time t and frame t+1 at time t+1, which are input, as described above with reference to, for example, FIG. 55, the evaluated value operation unit 812 calculates evaluated value DFD0 in the case of using a zero vector, and outputs the calculated evaluated value DFD0 to the compensation unit 811.

In step S822, the compensation unit 811 stores evaluated value DFD0 as the minimum evaluated value in the memory 821. Proceeding to step S823, the compensation unit 811 stores a zero vector as a compensating candidate vector in the memory 821. In step S824, the compensation unit 811 selects one peripheral pixel from among eight peripheral pixels around the pixel of interest selected by the allocated vector determining unit 801, and proceeds to step S825. At this time, the compensation unit 811 selects the eight peripheral pixels from the top left end pixel in raster scanning order.

In step S825, by referring to the allocation flag memory 56, the compensation unit 811 determines whether the selected peripheral pixel has a motion vector. If the allocation flag in the allocation flag memory 56 for the peripheral pixel is one (true), in step S825, the compensation unit 811 determines that the motion vector allocated to the selected peripheral pixel exists. Proceeding to step S826, the compensation unit 811 acquires the motion vector of the peripheral pixel from the allocated vector memory 55, and the process proceeds to step S827. Then, the motion vector of the peripheral pixel is output from the allocated vector memory 55 also to the evaluated value operation unit 812.

When receiving the motion vector of the peripheral pixel from the allocated vector memory 55, in step S827, by using frame t at time t and frame t+1 at time t+1, which are input, the evaluated value operation unit 812 calculates evaluated value DFD of the motion vector from the allocated vector memory 55, and outputs the calculated evaluated value DFD to the compensation unit 811. The process proceeds to step S828.

When receiving evaluated value DFD from the evaluated value operation unit 812, in step S828, the compensation unit 811 determines whether evaluated value DFD is less than the minimum evaluated value of the pixel of interest stored in the memory 821. If it is determined that evaluated value DFD is less than the minimum evaluated value stored in the memory 821, the compensation unit 811 proceeds to step S829 and rewrites the minimum evaluated value in the memory 821 by the evaluated value DFD determined to be less than the minimum evaluated value. Proceeding to step S830, the compensation unit 811 rewrites the compensating candidate vector in the memory 821 by the motion vector for the minimum evaluated value. The process proceeds to step S831.

If, in step S825, the allocation flag in the allocation flag memory 56 for the peripheral pixel is zero (false), the compensation unit 811 determines that the selected peripheral pixel has no allocated motion vector, and proceeds to step S831, skipping over steps S826 to S830. In addition, if, in step S828, it is determined that evaluated value DFD is equal to or greater than the minimum evaluated value of the pixel of interest stored in the memory 821, the compensation unit 811 proceeds to step S831, skipping over steps S829 and S830.

In step S831, the compensation unit 811 determines whether processing on all the eight peripheral pixels around the pixel of interest has finished. If it is determined that the processing on all the eight peripheral pixels around the pixel of interest has not finished, the compensation unit 811 returns to step S824 and selects the next peripheral pixel to repeat the subsequent steps. If, in step S831, it is determined that the processing on all the eight peripheral pixels around the pixel of interest has finished, the vector compensating process is finished before returning to step S804 in FIG. 59.

As described above, for a pixel to which a motion vector fails to be allocated by the vector allocating process, by using movement correlation, from the motion vectors of peripheral pixels around the pixel, a probable motion vector having the highest reliability based on evaluated value DFD can be obtained. Accordingly, compared with a case in which a zero vector or the like is allocated since a motion vector cannot be allocated, the accuracy of vector allocation is improved, thus suppressing image discontinuity generated in the image interpolating process.

The allocation flag for a pixel to which a motion vector is allocated by the above-described allocation compensating process is rewritten by one (true), and the motion vector allocated by the allocation compensating process is used as a compensating candidate vector for the next pixel. Thus, for pixels that substantially identically move, motion vectors having substantially identical movements are selected, so that stable motion vectors having reduced errors can be obtained. As a result, block noise, powdery noise, etc., generated in image in the subsequent stage, are reduced to improve image quality.

In addition, for a pixel whose motion vector is to be found, by calculating evaluated value DFD beforehand for a zero vector, and storing the calculated evaluated value DFD as the minimum evaluated value in memory, time and resources can be efficiently used compared with the case of calculating evaluated values DFD of all compensating candidate vectors, and selecting the least evaluated value DFD from among the calculated evaluated values DFD.

In the above description, the vector compensating process is performed for pixels to which motion vectors are not allocated by the vector allocating unit 54. However, for pixels whose motion vectors are not found by some process, such as pixels (in which zero vectors are detected) that are not detected by the vector detecting unit 52, the vector compensating process may be performed. Moreover, the vector compensating process may be performed for pixels in each of which a detected motion vector or an allocated motion vector is not probable (has low reliability).

Although, in the description of the foregoing embodiment, evaluated value DFD, which is the sum of the absolute values of differences, is used as an evaluated value for motion vector selection, the evaluated value is not limited to evaluated value DFD, but another type of value may be used if the reliability of the motion vector can be evaluated.

In addition, although the foregoing embodiment describes that the block for performing each process consists of, for example, 8 by 8 pixels, and 9 by 9 pixels, these are examples, and the number of pixels constituting the block for performing each process is not limited to the above numbers of pixels.

Furthermore, although the foregoing embodiment has been described by exemplifying signal conversion from the 24P signal to 60P signal, the present invention may be applied to, for example, interlaced signal conversion and other frame rate conversion as moving-image frame frequency conversion.

The above-described consecutive processes can be executed either by hardware or by software. When the consecutive processes are executed by software, programs constituting the software are installed from a program storage medium to, for example, a computer built into dedicated hardware, or a multipurpose personal computer in which, by installing various types of programs, various types of functions can be executed.

Program storage media for storing programs which are installed into a computer and, which are made executable by the computer, include, as shown in FIG. 1, removable recording media (package media) including the magnetic disk 31 (including a flexible disk), the optical disk 32 (CD-ROM (compact disk read only memory, DVD (digital versatile disk)), the magneto-optical disk 33 (including MD (Mini-Disc)), and the semiconductor memory 34, and the ROM 12 for temporarily or eternally storing programs.

In this specification, the steps shown in the flowcharts include, not only processing steps performed in a time-series manner in accordance with the order given, but also processing steps which are executed in parallel or separately if not always executed in a time-series manner.

The present application contains subject matter related to Japanese patent application no. JP 2004-116010, filed in the Japanese Patent Office on Apr. 9, 2004, the entire contents of which are hereby incorporated herein by reference.

What is claimed is:

1. An image processing apparatus comprising:
    initial vector selecting means for selecting an initial vector used as an initial value for a gradient method for detecting a motion vector in a block of interest in a present frame;
    motion vector detecting means for using the gradient method to detect the motion vector in the block of interest by using the initial vector selected by said initial vector selecting means;
    shifted initial vector setting means for setting, as a shifted initial vector, a shifted motion vector having an initial point at the block of interest in said present frame being identical in position to a terminal point of the motion vector detected by said motion vector detecting means in a past frame with respect to said present frame; and
    candidate vector setting means for setting the shifted initial vector set by said shifted initial vector setting means as one of candidate vectors for selecting the initial vector in the block of interest by said initial vector selecting means; and
    wherein said shifted motion vector is identical in magnitude and in orientation to the motion vector detected by said motion vector detecting means; and
    wherein, in said candidate vector setting means, motion vectors in a predetermined peripheral block around the block of interest, detected in said present frame or said past frame, are set as candidate vectors for selecting the initial vector, and wherein for each candidate (1) vector type indicating whether the vector is detected in said present frame or detected in said past frame is set and (2) a priority is set, and the priority is set such that motion vectors in blocks nearer the block of interest have a higher priority, and among plural motion vectors in blocks at a same distance from the block of interest, vectors detected in said present frame have higher priority than vectors detected in said past frame.

2. The image signal processing apparatus according to claim 1,
wherein said motion vector is a motion vector having an initial point at said block of interest in said present frame, and said initial vector selecting means selects an initial vector having an initial point at said block of interest in said present frame.

3. The image processing apparatus according to claim 1, wherein said shifted initial vector setting means comprises:
block operation means for finding the block in said present frame identical in position to a terminal block including the terminal at the terminal point of the motion vector detected by said motion vector detecting means;
reliability comparing means for comparing, in the block found by said block operation means, reliabilities of the motion vector detected by said motion vector detecting means; and
shifted initial vector selecting means for selecting, as the shifted initial vector for a block in said present frame, a motion vector identical in magnitude and orientation to one motion vector determined by said reliability comparing means to have a highest reliability.

4. The image processing apparatus according to claim 1, further comprising evaluated value operation means for calculating evaluated values representing reliabilities of the candidate vectors set by said candidate vector setting means,
wherein said initial vector selecting means selects the initial vector for the block of interest in said present frame based on the evaluated values in said past frame calculated by said evaluated value operation means.

5. The image processing apparatus according to claim 1, further comprising:
allocating means for allocating the motion vector detected by said motion vector detecting means to pixels in an interpolated frame between the frames; and
pixel-value interpolation generating means for performing interpolation to generate the values of the pixels in the interpolated frame based on the motion vector allocated by said allocating means.

6. An image processing method comprising:
an initial vector selecting step of, in an initial vector selector, selecting an initial vector used as an initial value for a gradient method for detecting a motion vector in a block of interest in a present frame;
a motion vector detecting step of, in the motion vector detector, using the gradient method to detect the motion vector in the block of interest by using the initial vector selected in the initial vector selecting step;
a shifted initial vector setting step of, in a shifted initial vector setting unit, setting, as a shifted initial vector, a shifted motion vector having an initial point at the block of interest in said present frame being identical in position to a terminal point of the motion vector detected in the motion vector detecting step in a past frame with respect to said present frame; and
a candidate vector setting step of, in a candidate vector, setting unit, setting the shifted initial vector set in the shifted initial vector setting step as one of candidate vectors for selecting the initial vector in the block of interest in the initial vector selecting step,
wherein said shifted motion vector is identical in magnitude and in orientation to the motion vector detected in said motion vector detecting step,
wherein, in said candidate vector setting step, motion vectors in a predetermined peripheral block around the block of interest, detected in said present frame or said past frame, are set as candidate vectors for selecting the initial vector, and wherein for each candidate (1) vector type indicating whether the vector is detected in said present frame or detected in said past frame is set and (2) a priority is set, and the priority is set such that motion vectors in blocks nearer the block of interest have a higher priority, and among plural motion vectors in blocks at a same distance from the block of interest, vectors detected in said present frame have higher priority than vectors detected in said past frame.

7. A recording medium having a program recorded thereon, the program comprising:
an initial vector selecting step of selecting an initial vector used as an initial value for a gradient method for detecting a motion vector in a block of interest in a present frame;
a motion vector detecting step of using the gradient method to detect the motion vector in the block of interest by using the initial vector selected in the initial vector selecting step;
a shifted initial vector setting step of setting, as a shifted initial vector, a shifted motion vector having an initial point at the block of interest in said present frame being identical in position to a terminal point of the motion vector detected in the motion vector detecting step in a past frame with respect to said present frame; and
a candidate vector setting step of setting the shifted initial vector set in the shifted initial vector setting step as one of candidate vectors for selecting the initial vectors in the block of interest in the initial vector selecting step,
wherein said shifted motion vector is identical in magnitude and in orientation to the motion vector detected by said motion vector detecting step,
wherein, in said candidate vector setting means, motion vectors in a predetermined peripheral block around the block of interest, detected in said present frame or said past frame, are set as candidate vectors for selecting the initial vector, and wherein for each candidate (1) vector type indicating whether the vector is detected in said present frame or detected in said past frame is set and (2) a priority is set, and the priority is set such that motion vectors in blocks nearer the block of interest have a higher priority, and among plural motion vectors in blocks at a same distance from the block of interest, vectors detected in said present frame have higher priority than vectors detected in said past frame.

8. An image processing apparatus comprising:
an initial vector selector configured to select an initial vector used as an initial value for a gradient method for detecting a motion vector in a block of interest in a present frame;
a motion vector detector configured to use the gradient method to detect the motion vector in the block of interest by using the initial vector selected by said initial vector selector;
a shifted initial vector setting unit configured to set, as a shifted initial vector, a shifted motion vector having an initial point at the block of interest in said present frame being identical in position to a terminal point of the motion vector detected by said motion vector detector in a past frame with respect to said present frame; and
a candidate vector setting unit configured to set the shifted initial vector set by said shifted initial vector setting device as one of candidate vectors for selecting the initial vector in the block of interest by said initial vector selector; and wherein said shifted motion vector is identical in magnitude and in orientation to the motion vector detected by said motion vector detector, wherein, in said candidate vector setting unit, motion vectors in a predetermined peripheral block around the block of interest, detected in said present frame or said past frame, are set as candidate vectors for selecting the initial vector, and wherein for each candidate (1) vector type indicating whether the vector is detected in said present frame or detected in said past frame is set and (2) a priority is set, and the priority is set such that motion vectors in blocks nearer the block of interest have a higher priority, and among plural motion vectors in blocks at a same distance from the block of interest, vectors detected in said present frame have higher priority than vectors detected in said past frame.

* * * * *